US012509482B2

(12) United States Patent
Sutton

(10) Patent No.: US 12,509,482 B2
(45) Date of Patent: Dec. 30, 2025

(54) 3'-KETOGLYCOSIDE COMPOUND FOR THE SLOW RELEASE OF A VOLATILE ALCOHOL

(71) Applicant: GLYCOSCIENCE, S.L., Derio (ES)

(72) Inventor: Peter William Sutton, Sant Cugat del Vallès (ES)

(73) Assignee: GLYCOSCIENCE, S.L., Derio (ES)

( * ) Notice: Subject to any disclaimer, the term of this patent is extended or adjusted under 35 U.S.C. 154(b) by 602 days.

(21) Appl. No.: 17/798,397

(22) PCT Filed: Feb. 10, 2021

(86) PCT No.: PCT/EP2021/053207
§ 371 (c)(1),
(2) Date: Aug. 9, 2022

(87) PCT Pub. No.: WO2021/160670
PCT Pub. Date: Aug. 19, 2021

(65) Prior Publication Data
US 2023/0183284 A1 Jun. 15, 2023

(30) Foreign Application Priority Data
Feb. 13, 2020 (EP) .................................. 20382103

(51) Int. Cl.
| | | |
|---|---|---|
| C07H 15/207 | (2006.01) | |
| A01N 31/02 | (2006.01) | |
| A01N 31/04 | (2006.01) | |
| A01N 31/08 | (2006.01) | |
| A01N 31/16 | (2006.01) | |
| A01N 33/22 | (2006.01) | |
| A01N 43/40 | (2006.01) | |
| A01P 17/00 | (2006.01) | |
| C07H 15/10 | (2006.01) | |
| C07H 15/18 | (2006.01) | |
| C07H 15/203 | (2006.01) | |
| C07H 15/26 | (2006.01) | |

(52) U.S. Cl.
CPC .......... *C07H 15/207* (2013.01); *A01N 31/02* (2013.01); *A01N 31/04* (2013.01); *A01N 31/08* (2013.01); *A01N 31/16* (2013.01); *A01N 33/22* (2013.01); *A01N 43/40* (2013.01); *A01P 17/00* (2021.08); *C07H 15/10* (2013.01); *C07H 15/18* (2013.01); *C07H 15/203* (2013.01); *C07H 15/26* (2013.01)

(58) Field of Classification Search
None
See application file for complete search history.

(56) References Cited

FOREIGN PATENT DOCUMENTS

| | | |
|---|---|---|
| JP | 1989213291 A | 8/1989 |
| JP | 6113877 A | 4/1994 |
| JP | 06-336401 A | 12/1994 |
| JP | 8188589 A | 7/1996 |
| JP | 3631298 A | 2/1997 |
| JP | 10139793 A | 5/1998 |
| JP | 2000-096078 A | 4/2000 |
| JP | 200096078 A | 4/2000 |
| JP | 2000281697 A | 10/2000 |
| WO | 99/00377 A1 | 1/1999 |
| WO | 2013/191549 A1 | 12/2013 |
| WO | WO-2014202416 A1 * | 12/2014 ............ A61K 8/602 |

OTHER PUBLICATIONS

Niek N. H. M. Eisink et al., "Regioselective Carbohydrate Oxidations: A Nuclear Magnetic Resonance (NMR) Study on Selectivity, Rate, and Side-Product Formation", ACS Catalysis, 2017, pp. 1438-1445, vol. 7.
Ji Zhang et al., "Regioselective Manipulation of GlcNAc Provides Allosamine, Lividosamine, and Related Compound", The Journal of Organic Chemistry, pp. 516-525, 2019, vol. 84.
Lennart Kenne et al., "Alkaline Degradation of Methyl 2,4,6-Tri-O-methyl-α- and -β-D-ribo-hexosid-3-ulose. Part II. Isolation and Characterization of Degradation Products", Acta Chemica Scandinavica, 1973, pp. 2797-2801, vol. 27.
Wilson C. Ho et al., "Pd-Catalyzed Aerobic Oxidation Reactions: Strategies To Increase Catalyst Lifetimes", Journal of The American Society, 2018, pp. 748-757, vol. 140.
John S. Brimacombe et al., "The reaction of derivatives of methyl 2,3-O-benzylidene-α-L-rhamnopyranoside with butyl-lithium", Carbohydrate Research, 1982, pp. C10-C13, vol. 100.
Vernon G. S. Box et al., "Methyl 2-O-acetyl-4-O-benzoyl-α-D-ribo-hexopyranosid-3-ulose", Carbohydrate Research, 1982, pp. 308-311, vol. 102.
John S. Brimacombe et al., "The synthesis of derivatives of 3-amino-2,3,6-trideoxy-3-C-methyl-L-xylo-hexopyranose, the novel branched-chain amino sugar of antibiotic A35512B", Carbohydrate Research, 1982, pp. C1-C3, vol. 105.
Birgit Gering et al., "Iridoid glycosides from Penstemon Confertus", Phytochemistry, 1987, pp. 3011-3013, vol. 26, No. 11.
Brent Mann et al., "Synthesis of α-2-Deoxyglycosides by Acid-Mediated Conjugate Addition", Journal of Carbohydrate Chemistry, 2005, pp. 161-168, vol. 24.
Hui-Chang Lin et al., "Microwave-assisted stereoselective α-2-deoxyglycosylation of hex-1-en-3-uloses", Tetrahedron Letters, 2009, pp. 7327-7329, vol. 50.
International Search Report for PCT/EP2021/053207 dated Jun. 7, 2021.
Written Opinion for PCT/EP2021/053207 dated Jun. 7, 2021.
European Search Report for EP 20 38 2103 dated Aug. 20, 2020.

* cited by examiner

*Primary Examiner* — Traviss C Mcintosh, III
(74) *Attorney, Agent, or Firm* — Haynes and Boone, LLP

(57) ABSTRACT

The present invention relates to a 3'-ketoglycoside compound defined by formula (I) and its use for controlled release of alcohols, in particular alcohols showing an insect repellent effect. It relates also to a process for preparing the 3'-ketoglycoside compound of formula (I). It further relates to a composition comprising a 3'-ketoglycoside compound of formula (I). It relates also to the use of a 3'-ketoglycoside compound of formula (I) for the controlled release of alcohols. It related also to a method of use of such composition.

7 Claims, No Drawings

3'-KETOGLYCOSIDE COMPOUND FOR THE SLOW RELEASE OF A VOLATILE ALCOHOL

CROSS REFERENCE TO RELATED APPLICATIONS

This application is a National Stage of International Application No. PCT/EP2021/053207 filed Feb. 10, 2021, claiming priority based on European Patent Application No. 20382103.8 filed Feb. 13, 2020.

TECHNICAL FIELD

The present invention relates to a 3'-ketoglycoside compound and its use for the controlled release of alcohols, in particular its use for the controlled release of alcohols having an insect repellent effect.

BACKGROUND ART

Land and air-borne arthropods represent the most common vectors for the transmission of disease to humans. Due to increasing global temperatures, there has been an expansion in the number of regions affected by these diseases as they become suitable habitats for their respective vectors.

One method of combating bites from these insects is to use insect repellents. The active ingredients currently used in most commercially available topical insect repellents are spatial repellents. There are several approved synthetic topical insect repellents on the market including DEET, Picaridin and IR3535, but none of them is ideal. For example, DEET has a pungent odour, leaves a waxy feel and can dissolve plastics and synthetic fabrics. Furthermore, there is a public perception that these synthetic molecules are harmful to the health resulting in a rapidly growing market for natural alternatives.

A wide range of natural molecules are known to provide an insect repellent effect, but the majority are too volatile and provide protection for only a very short time-period. In fact, p-menthane-3,8-diol (PMD), which is active against a wide variety of insects, is the only natural insect repellent recognized by the World Health Organisation, being sufficiently high boiling to allow slow evaporation over a number of hours.

Commercial repellent products typically have an effective duration of between 4 and 6 hours after each application. However, as the insect species of concern in a given environment are displaced by other invasive species, established commercially available repellent products may no longer provide suitable protection. Using one non-limiting example, commercially available topical insect repellents have been designed to combat mosquitos that bite in the morning or evening where a short duration of action is suitable. With the unprecedented expansion in the population of the daytime feeding *Aedes* species of mosquito (commonly known as the Asian tiger mosquito), responsible for the transmission of Zika, Dengue and Chikingunya viruses, multiple applications of currently available repellents and formulations are required. Due to busy lifestyles, periodic repellent application is easily forgotten until bitten, leaving the user open to disease contraction. To mitigate this issue, traditional repellent products containing increased concentrations of active ingredient can be applied, but increased exposure can lead to multiple issues such as toxicity and irritancy.

Spatial repellents are volatile molecules that, upon evaporation, provide a protective zone above the skin that prevents mosquitos from landing and/or biting through complex mechanisms that are not fully understood. Each active ingredient has a minimum effective evaporation rate (MEER). A rate of evaporation above this threshold results in non-productive loss, reducing the time-period during which the repellent is effective, after which the concentration is no longer sufficient to meet the MEER.

The development of insect repellent products that allow the controlled release of their active ingredients could overcome many issues related to current ones by increasing duration whilst at the same time reducing the concentration of active ingredient required. Due to the lower quantity of active ingredient required, this would result in additional benefits such as reduction in smell, reduced irritancy and avoidance of the greasy feel often associated with such products.

Furthermore, such methods would be attractive because they would potentially allow other natural repellents, which cannot currently be used due to their higher volatility, to be employed which is important as a wider range of viable repellent molecules could reduce incidents of resistance.

Two main technical solutions have been disclosed in the art for the slow release of insect repellents: entrapment approach and precursor approach.

In the entrapment approach, slow release of the insect repellent is obtained by entrapment, for example, within microcapsules (e.g., EP-A-0348550), liposheres (EP-A-0502119), polymer (U.S. Pat. No. 4,774,082) or copolymer (U.S. Pat. No. 6,180,127) matrices from which the active ingredient is slowly released over time from the surface of interest following application of the repellent product to the whole surface or, as in the case of repellent bracelets, to a zone of the body.

In the precursor approach, altering the physicochemical characteristics of the active ingredient by preparation of a prodrug or conjugation to an appropriate carrier molecule offers an alternative method of controlled release, where the active ingredient is released by environmental mechanisms which can prolong the time during which the MEER is maintained whilst at the same time avoiding the need to apply a large excess of the active ingredient.

The use of precursors, such as prodrugs and conjugates, is well-known in the pharmaceutical field. Regarding insect repellent actives, the conjugation of volatile insect repellent molecules to compounds that reduce the water solubility, such as fatty acids (US-A-2004/014811), the preparation of water-soluble ester and ether prodrugs (EP-A-2439188), five and six-membered ring cyclic acetals as insect repellent precursors (WO-A-99/00377), hydrosoluble conjugates to one or more sugar rests (JP-A-2000-096078, JP-A-H01-213291), conjugates to polycarboxylic acids or polyols to improve water solubility (WO-A-2016/071521), conjugates to hyaluronic acid (WO-A-2016/071521), conjugates to crystalline carriers (WO-A-2010/144755), or conjugates to crosslinked, polymeric gel composition (U.S. Pat. No. 6,846,491) have been disclosed.

Such prior art methods show disadvantages regarding the effective slow release application of insect repellent. Both alkyl and aryl O-glycopyranosides and glucuronides can be broken down on the skin to deliver volatile alcohol fragrance ingredients, but the rate is insufficient for spatial insect repellent applications (i.e., release rate required for fragrancies on skin is $ng/min/cm^2$, compared to $\mu g/min/cm^2$ for repellents). Furthermore, the microbiota composition varies with skin zone (Grice et al. Science, 2009, 324, 1190) and age (Capone et al., J. Invest. Dermatol., 2011, 131, 2026-2032). For example, Ikemoto et al., *Flavour Fragr. J.*; 2002, 17, 452-455, found that a range of glycosides could be broken down by microorganisms present on the skin, but that their selectivities were different according to the aglycone used. The same group went on to demonstrate an in vivo difference in rate using different subjects (Ikemoto et al., Flavour Fragr. J., 2003, 18, 45-47). A similar effect is found for glucuronides, with enzymes from different microorganisms demonstrating a very different substrate pattern (US-A-2016/0137952).

Despite the various proposals available in the state of the art, there is still a need to have new compounds to be used as slow release insect repellents, which show suitable water solubility and sufficient release rate of the active to perform the repellent effect.

OBJECT OF THE INVENTION

The object of the present invention is a 3'-ketoglycoside compound of formula (I).

Another aspect of the invention is a process for preparing the 3'-ketoglycoside compound of formula (I).

Another aspect of the invention is a composition comprising a 3'-ketoglycoside compound of formula (I).

Another aspect of the invention is the use of a 3'-ketoglycoside compound of formula (I) for the controlled release of alcohols.

Another aspect of the invention is a method of use of compounds of formula (I).

DETAILED DESCRIPTION OF THE INVENTION

The object of the present invention is a 3'-ketoglycoside compound of formula (I)

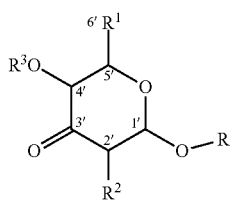

(I)

wherein
the stereochemistry at positions 1', 2', 4' and 5' is independently selected from the α- or β-configuration; the sugar moiety is preferably selected from the group consisting of glucose, galactose, allose, altrose, mannose, gulose, idose, talose, fucose, xylose, N-acetylglucosamine and 2-deoxyglucose; more preferably from D-glucose, D-galactose, D-allose, D-altrose, D-mannose, D-gulose, D-idose, D-tallose and D-N-acetylglucosamine and D-2-deoxyglucose; yet more preferably D-glucose, D-N-acetylglucosamine and D-2-deoxyglucose;

R represents substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl; wherein R is derived from an alcohol of formula R—OH having an initial boiling point less than or equal to 350° C. at a standard pressure of 101.3 kPa; preferably R is the rest of an alcohol of formula R—OH selected from the group consisting of 4-allyl-2-methoxyphenol (eugenol), 3-benzyl-3-pentanol, 4-cyclohexyl-2-methylbutan-2-ol, 2-cyclohexylpropanol, decanol, 9-decenol, (2,4-dimethylcyclohex-3-enyl)methanol, (2,4-dimethylcyclohexyl)methanol, 2-(1,1-dimethylethyl)-4-methylcyclohexanol, 2,6-dimethylheptan-2-ol, 3,7-dimethyl-7-hydroxyoctanal, 2,5-dimethyl-2-indanmethanol, 3,7-dimethyl-1,6-nonadien-3-ol, 6,8-dimethylnonan-2-ol, 4,8-dimethyl-7-nonen-2-ol, (E)-3,7-dimethyl-2,6-octadienol (geraniol), (Z)-3,7-dimethyl-2,6-octadienol (nerol), 3,7-dimethyl-3,6-octadienol, 3,7-dimethyl-1,6-octadien-3-ol (linalool), 3,7-dimethyloctane-1,7-diol (hydroxycitronellol), 3,7-dimethyloctanol, 2,6-dimethyloctan-2-ol (tetrahydromyrcenol), 3,7-dimethyloctan-3-ol, 3,7-dimethylocten-3-ol, 3,7-dimethyloct-6-enol (citronellol), 3,7-dimethyloct-7-enol, 2,6-dimethyloct-7-en-2-ol (dihydromyrcenol), (E)-3,3-dimethyl-5-(2,2,3-trimethyl-3-cyclopenten-1-yl)-4-penten-2-ol, dodecanol, 2-ethoxy-5-(1-propenyl)phenol, 2-ethyl-1-hexanol, ethyl 3-hydroxy hexanoate, 4-ethyl-2-methoxyphenol, 6-ethyl-3-methyl-5-octenol, 5-ethylnonan-2-ol, 2-ethyl-4-(2,2,3-trimethylcyclopent-3-enyl)but-2-enol, 1-heptanol, hexan-2-ol, 3-hexenol, 4-hexenol, 3-hydroxybutan-2-one, 4-hydroxy-3-ethoxybenzaldehyde (ethylvanillin), 4-hydroxy-3-methoxybenzaldehyde (vanillin), 4-(4-hydroxy-3-methoxyphenyl)butan-2-one, 2-(hydroxymethyl)nonan-2-one, 4-(4-hydroxy-1-phenyl)butan-2-one (raspberry ketone), 4-isopropyl-1-benzenemethanol, 4-isopropylcyclohexanol, 1-(4-isopropyl-1-cyclohexyl)ethanol, (4-isopropyl-1-cyclohexyl)methanol, 2-isopropyl-5-methylphenol, 5-isopropyl-2-methylphenol, (4-isopropylphenyl) methanol, 7-p-menthanol, p-menthan-3-ol (menthol), p-menthan-8-ol, p-menthen-4-ol, p-menthen-8-ol, p-menth-8-enol, p-menth-8-en-2-ol, p-menth-8-en-3-ol, 4-methoxy-1-benzenmethanol, 7-methoxy-3,7-dimethyloctan-2-ol, 2-methoxy-4-methylphenol, 2-methoxyphenol (Guaiacol), 2-methoxy-2-phenylethanol, (4-methoxyphenyl)methanol (anisyl alcohol), 2-methoxy-4-(1-propenyl)phenol (isoeugenol), 2-methoxy-4-propyl-1-cyclohexanol, 2-methoxy-4-propylphenol, 2-methoxy-4-vinylphenol, 3-(4-methylcyclohex-3-enyl)butanol, 4-methyl-3-decenol, 4-methyl-3-decen-5-ol, 4-(1-methylethyl)cyclohexylmethanol, 2-methyl-4-phenylbutan-2-ol, 3-methyl-4-phenylbutan-2-ol, 1-(4-methylphenyl)ethanol, 2-(2-methylphenyl)ethanol, 2-methyl-4-phenylpentanol, 2-methyl-5-phenylpentanol, 3-methyl-5-phenylpentanol, 4-methyl-1-phenylpentan-2-ol, 2-methyl-1-phenylpropan-2-ol, 2-(4-methyl phenyl)propan-2-ol, 3-methyl-5-(2,2,3-trimethyl-3-cyclopenten-1-yl)-4-penten-2-ol, 2-(2-methyl propyl)-4-hydroxy-4-methyl-tetrahydropyrane, 2-methyl-4-(2,3,3-trimethyl-2-cyclopenten-1-yl)-2-butenol, 3-methyl-5-(2,2,3-trimethyl-3-cyclopenten-1-yl)pentan-2-ol, 2-methyl-4-(2,2,3-trimethyl-3-cyclopenten-1-yl)pent-4-enol, 3-methyl-5-(2,2,3-trimethylcyclopentyl-3-enyl)pent-4-en-2-ol, 2,6-nonadienol, 1-nonanol, 6-nonenol, 1,2,3,4,4a,5,8,8a-octahydro-2,2,6,8-tetramethyl-1-naphthalenol, octahydro-2,5,5-trimethyl-2-naphthalenol, octan-2-ol, octan-3-ol, 1-octen-3-ol, 3,4,5,6,6-pentamethylheptan-2-ol, 2-pentyl-1-cyclopentanol, perhydro-4,8a-dimethyl-4a-naphthalenol, 2-phenoxyethanol, 4-phenylbutan-2-ol, 4-phenyl-3-buten-2-ol, 1-phenylethanol, 2-phenylethanol, 1-phenylhexan-2-ol, 1-phenylpentan-2-ol, 2-phenylpropanol, 2-phenylpropanol, 3-phenylpropanol, 1-phenylpropan-2-ol, 3-phenyl-2-propenol, 2-tert-butylcyclohexanol, 4-tert-butylcyclohexanol, 1-(2-tert-butyl-cyclohexyloxy)butan-2-ol, 2-tert-butyl-4-methyl-1-cyclohexanol, tetrahydro-2-isobutyl-4-methyl(2H)pyran-4-ol, 2-(tetrahydro-5-methyl-5-vinyl-2-furyl)propan-2-ol, 1-(2,2,3,6-tetramethylcyclohex-1-yl)hexan-3-ol, 2,4,6,8-tetramethylnonan-1-ol, 3,6,7-tetramethylnonan-1-ol, 2,6,10,10-tetramethyl-1-oxaspiro[4.5]decan-6-ol, 2,6,6,8-tetramethyltricyclo[5.3.1.0(1,5)]undecan-8-ol (cedrenol), (+)-(1R,2R)-1,3,3-trimethylbicyclo[2.2.1]heptan-2endo-ol (fenchol), (+)-(1R,2S)-1,7,7-trimethylbicyclo[2.2.1]heptan-2-ol (borneol), 2,6,6-trimethylbicyclo[3.1.1]heptan-3-ol, 3-(5,5,6-trimethylbicyclo[2.2.1]hept-2-yl)cyclohexanol, 4-(5,5,6-trimethylbicyclo[2.2.1]hept-2-yl)cyclohexanol, 3,3,5-trimethylcyclohexanol, 4-(2,6,6-trimethyl-2-cyclohexen-1-yl)butan-2-ol, 4-(2,6,6-trimethyl-1-cyclohexen-1-yl)-3-buten-2-ol (beta-ionol), (E)-4-(2,6,6-trimethyl-2-cyclohexen-1-yl)-3-buten-2-ol (alpha-ionol), (2,4,6-trimethylcyclohex-3-enyl)methanol, 1-(2,2,6-trimethyl-1-cyclohexyl)hexan-3-ol, 5-(2,2,3-trimethyl-3-cyclopentenyl)-3-methylpentan-2-ol, 4,7,9-trimethyldecan-2-ol, 4,6,8-trimethyldecan-2-ol, 3,8,9-trimethyldecan-2-ol, 3,7,11-trimethyl-2,6,10-dodecatrienol (farnesol), 3,7,11-trimethyl-1,6,10-dodecatrien-3-ol (nerolidol), 3,3,5-trimethylhexanol, undecanol, undecan-2-ol, 10-undecenol, (6E)-N-[(4-hydroxy-3-methoxyphenyl)methyl]-8-methylnon-6-enamide (capsaicin), 2-Isopropyl-5-methylphenol (thymol), 5-isopropyl-2-methylphenol (carvacrol), 2-(4-methylcyclohex-3-en-1-yl)propan-2-ol (α-terpineol), p-allylphenol (chavicol), 2H-1,3-Benzodioxol-5-ol (sesamol), butan-2-yl 2-(2-hydroxyethyl)piperidine-1-carboxylate (picaridin) and 2-(2-hydroxypropan-2-yl)-5-methylcyclohexan-1-ol (p-menthane-3,8-diol, PMD); more preferably selected from 4-allyl-2-methoxyphenol (eugenol), (E)-3,7-dimethyl-2,6-octadienol (geraniol), (Z)-3,7-dimethyl-2,6-octadienol (nerol), 3,7-dimethyl-1,6-octadien-3-ol (linalool), 3,7-dimethyloct-6-enol (citronellol), 4-hydroxy-3-ethoxybenzaldehyde (ethylvanillin), 4-hydroxy-3-methoxybenzaldehyde (vanillin), 4-(4-hydroxy-1-phenyl)butan-2-one (raspberry ketone), p-menthan-3-ol (menthol), (4-methoxyphenyl)methanol (anisyl alcohol), 2-isopropyl-5-methylphenol (thymol), 5-isopropyl-2-methylphenol (carvacrol), 2-(4-methylcyclohex-3-en-1-yl)propan-2-ol (α-terpineol), butan-2-yl 2-(2-hydroxyethyl)piperidine-1-carboxylate (picaridin) and 2-(2-hydroxypropan-2-yl)-5-methylcyclohexan-1-ol (p-menthane-3,8-diol, PMD); and more preferably selected from E-3,7-dimethyl-2,6-octadienol (geraniol), 2-methoxy-4-(2-propenyl)phenol (eugenol), butan-2-yl 2-(2-hydroxyethyl)piperidine-1-carboxylate (picaridin), 5-methyl-2-(propan-2-yl)cyclohexan-1-ol (menthol), 2-methyl-5-propan-2-ylphenol (carvacrol) and 2-(2-hydroxypropan-2-yl)-5-methylcyclohexan-1-ol (p-menthane-3,8-diol, PMD);

$R^1$ represents H, $CH_3$, $CH_2OH$, $CH_2OR^4$, $CH_2OCOR^4$, $CH_2OCOOR^4$, $CH_2OCONHR^4$, $CH_2OCONR^4_2$, $CH_2NHR^4$, $CH_2NR^4_2$, $CO_2X$, $CO_2R^4$, $CONH_2$, $CONHR^4$, $CONR^4_2$, $CH_2OPO_3X_2$, $CH_2OPO_3XR^4$, $CH_2OPO_3R^4_2$, $CH_2OPO_2XNHR^4$, $CH_2OPO(NHR^4)_2$, $CH_2OPO_2XR^4$, $CH_2OPOR^4_2$, $CH_2OSO_3X$, $CH_2OSO_3R^4$ or $CH_2OSO_2R^4$, where X represents hydrogen, an alkali metal ion, ammonium ion, or an organic counterion, and $R^4$ represents substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl; preferably $R^1$ is $CH_2OH$, $CH_2OSO_3X$, $CH_2OCOR^4$ or $CO_2R^4$, and more preferably $CH_2OH$;

$R^2$ represents H, OH, $OR^4$, $OCOR^4$, $OCO_2R^4$, $OCONHR^4$, $OCONR^4_2$, $NH_2$, $NHR^4$, $NR^4_2$, $NHCOR^4$, $NHOR^4$, $OPO_3X_2$, $OPO_3XR^4$, $OPO_3R^4_2$, $OPO_2XNHR_4$, $OPO(NHR_4)_2$, $OPO_2XR^4$, $OPOR^4_2$, $OSO_3X$, $OSO_3R^4$ or $OSO_2R^4$, where $R^4$ is as defined above; preferably $R^2$ is OH, $NHCOR^4$, H or $OCOR^4$, and more preferably $R^2$ is OH, $NHCOR^4$, or H;

$R^3$ is H or $R^4$—Z, where $R^4$ is as defined above, and Z represents a single bond or a functional group selected from ester, amine, amide, carbonate or carbamate; preferably $R^3$ is H;

with the proviso that compound of formula (I) does not encompass the compounds when R is the rest of an alcohol of formula R—OH selected from the group consisting of methanol, ethanol, propan-1-ol, isopropanol, 2-(hydroxymethyl)but-2-ene-1,4-diol, 4-methoxyphenol, n-octanol (1-octanol), 2-propenyl alcohol (allyl alcohol), benzyl alcohol, phenol, 4-nitrophenol, 4-(3-hydroxybutyl)phenol, allyl 2-(hydroxymethyl)benzoate, benzyl 2-(hydroxymethyl)benzoate, 4-hydroxyphenol, 2-(hydroxymethyl)phenol, 1H-indol-3-ol, 4-(2-hydroxyethyl)benzene-1,2-diol, 2-(trimethylsilyl)ethan-1-ol, 5-(hydroxymethyl)furan-2-carbaldehyde, tert-butyldimethylsilanol, cyclohexanol, n-hexanol (1-hexanol), prop-2-yn-1-ol, pent-4-en-1-ol, p-cresol, 4,7-bis(hydroxymethyl)-1,4a,5,6,7,7a-hexahydrocyclopenta[c]pyran-1-yl 3-methylbutanoate, and 4,7-bis(hydroxymethyl)-1,4a,5,7a-tetrahydrocyclopenta[c]pyran-1-yl 3-methylbutanoate, 7-methyl-5,6,7,7a-tetrahydrocyclopenta[c]pyran-1,4a,5,7 (1H)-tetraol, 1,4a,5-trihydroxy-7-methyl-1,4a,5,6,7,7a-hexahydrocyclopenta[c]pyran-7-yl acetate, 1,4a,5-trihydroxy-7-methyl-1,4a,5,6,7,7a-hexahydrocyclopenta[c]pyran-7-yl cinnamate and (2,3-dimethylbutan-2-yl) dimethylsilanol.

The authors of the present invention have developed a 3'-ketoglycoside compound of formula (I), which can release alcohols on surfaces, such as human skin, both in the absence and presence of microbiota on human skin but also bacteria found in the environment. Surprisingly, compounds of the invention are able to release an effective concentration of a volatile alcohol to act as insect repellent over a period greater than observed by the delivery of the free repellent alcohol, which usually lasts at least 24 hours. Particularly suitable alcohols are, for example, geraniol, eugenol, picaridin, menthol, carvacrol and PMD.

In the present description, as well as in the claims, the singular forms "a", "an" and "the" include the plural reference unless the context clearly indicates otherwise. The ranges defined by the preposition "between" include also the two ends thereof. According to the IUPAC, the term "moiety" is used to signify part of a molecule.

3'-ketoglycoside

3'-ketoglycoside of the present invention are constituted by a sugar moiety and an alcohol rest R, derived from an alcohol of formula R—OH, as shown below:

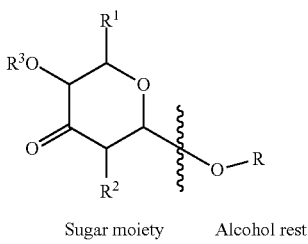

Sugar moiety        Alcohol rest

In the description, compound of formula (I) can be also named as 3'-ketoglycopyranoside or 3'-keto-O-glycopyranoside.

The keto form of the 3'-ketoglycoside can equilibrate to the hydrated form as shown below:

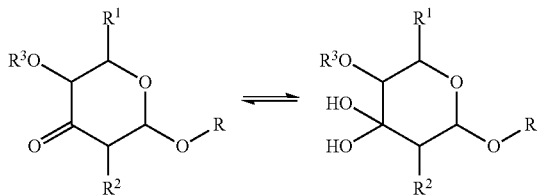

Compounds of formula (I) contain the R group attached to the sugar moiety via either a β-glycosidic linkage or an α-glycosidic linkage.

The 3'-ketoglycoside compound may also form imine, oxime, hemiacetal, hemiaminal, bisulfite adduct or similar adducts in the presence of alternative nucleophiles that might be commonly present in a given formulation (polysaccharides, such as chitosan; sodium bisulfite, etc.) and which would be expected to further modulate its physicochemical properties such as stability.

Sugar Moiety

The stereochemistry at positions 1', 2', 4' and 5' of the sugar moiety represented in formula (I) is independently selected from the α- or β-configuration. The sugar moiety is preferably selected from the group consisting of glucose, galactose, allose, altrose, mannose, gulose, idose, tallose, fucose, xylose, N-acetylglucosamine and 2-deoxyglucose; more preferably from D-glucose, D-galactose, D-allose, D-altrose, D-mannose, D-gulose, D-idose, D-tallose, D-N-acetylglucosamine and D-2-deoxyglucose; and yet more preferably D-glucose, D-N-acetylglucosamine and D-2-deoxyglucose.

In a more preferred embodiment, the sugar moiety is D-glucose.

In another preferred embodiment, the sugar moiety is selected from D-N-acetylglucosamine and D-2-deoxyglucose.

In a preferred embodiment, $R^1$ is $CH_2OH$, $CH_2OSO_3X$, $CH_2OCOR^4$ or $CO_2R^4$, more preferably $R^1$ is $CH_2OH$.

In a preferred embodiment, $R^2$ is OH, $NHCOR^4$, H or $OCOR^4$.

In a preferred embodiment, $R^2$ is OH.

In a preferred embodiment, $R^2$ is $NHCOR^4$ or H.

In a preferred embodiment, $R^3$ is H.

In a preferred embodiment, compound of formula (I) is selected from a β-3'-ketoglucoside, α-3'-ketoglucoside, β-3'-keto-N-acetylglucosaminoside and 2'-deoxy-3'-ketoglucoside.

In a more preferred embodiment, compound of formula (I) is selected from a β-3'-ketoglucoside and a α-3'-ketoglucoside.

In another preferred embodiment, compound of formula (I) is selected from β-3'-keto-N-acetylglucosaminoside and 2'-deoxy-3'-ketoglucoside.

Alcohol Rest

In compound of formula (I), R represents substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl; wherein preferably R is derived from an alcohol of formula R—OH having an initial boiling point less than or equal to 350° C. at a standard pressure of 101.3 kPa; more preferably R is the rest of an alcohol of formula R—OH selected from the group consisting of 4-allyl-2-methoxyphenol (eugenol), 3-benzyl-3-pentanol, 4-cyclohexyl-2-methylbutan-2-ol, 2-cyclohexylpropanol, decanol, 9-decenol, (2,4-dimethylcyclohex-3-enyl)methanol, (2,4-dimethylcyclohexyl)methanol, 2-(1,1-dimethylethyl)-4-methylcyclohexanol, 2,6-dimethylheptan-2-ol, 3,7-dimethyl-7-hydroxyoctanal, 2,5-dimethyl-2-indanmethanol, 3,7-dimethyl-1,6-nonadien-3-ol, 6,8-dimethylnonan-2-ol, 4,8-dimethyl-7-nonen-2-ol, (E)-3,7-dimethyl-2,6-octadienol (geraniol), (Z)-3,7-dimethyl-2,6-octadienol (nerol), 3,7-dimethyl-3,6-octadienol, 3,7-dimethyl-1,6-octadien-3-ol (linalool), 3,7-dimethyloctane-1,7-diol (hydroxycitronellol), 3,7-dimethyloctanol, 2,6-dimethyloctan-2-ol (tetrahydromyrcenol), 3,7-dimethyloctan-3-ol, 3,7-dimethylocten-3-ol, 3,7-dimethyloct-6-enol (citronellol), 3,7-dimethyloct-7-enol, 2,6-dimethyloct-7-en-2-ol (dihydromyrcenol), (E)-3,3-dimethyl-5-(2,2,3-trimethyl-3-cyclopenten-1-yl)-4-penten-2-ol, dodecanol, 2-ethoxy-5-(1-propenyl)phenol, 2-ethyl-1-hexanol, ethyl 3-hydroxy hexanoate, 4-ethyl-2-methoxyphenol, 6-ethyl-3-methyl-5-octenol, 5-ethylnonan-2-ol, 2-ethyl-4-(2,2,3-trimethylcyclopent-3-enyl)but-2-enol, 1-heptanol, hexan-2-ol, 3-hexenol, 4-hexenol, 3-hydroxybutan-2-one, 4-hydroxy-3-ethoxybenzaldehyde (ethylvanillin), 4-hydroxy-3-methoxybenzaldehyde (vanillin), 4-(4-hydroxy-3-methoxyphenyl)butan-2-one, 2-(hydroxymethyl)nonan-2-one, 4-(4-hydroxy-1-phenyl)butan-2-one (raspberry ketone), 4-isopropyl-1-benzenemethanol, 4-isopropylcyclohexanol, 1-(4-isopropyl-1-cyclohexyl)ethanol, (4-isopropyl-1-cyclohexyl)methanol, 2-isopropyl-5-methylphenol, 5-isopropyl-2-methylphenol, (4-isopropylphenyl)methanol, 7-p-menthanol, p-menthan-3-ol (menthol), p-menthan-8-ol, p-menthen-4-ol, p-menthen-8-ol, p-menth-8-enol, p-menth-8-en-2-ol, p-menth-8-en-3-ol, 4-methoxy-1-benzenmethanol, 7-methoxy-3,7-dimethyloctan-2-ol, 2-methoxy-4-methylphenol, 2-methoxyphenol (Guaiacol), 2-methoxy-2-phenylethanol, (4-methoxyphenyl)methanol (anisyl alcohol), 2-methoxy-4-(1-propenyl)phenol (isoeugenol), 2-methoxy-4-propyl-1-cyclohexanol, 2-methoxy-4-propylphenol, 2-methoxy-4-vinylphenol, 3-(4-methylcyclohex-3-enyl)butanol, 4-methyl-3-decenol, 4-methyl-3-decen-5-ol, 4-(1-methylethyl)cyclohexylmethanol, 2-methyl-4-phenylbutan-2-ol, 3-methyl-4-phenylbutan-2-ol, 1-(4-methylphenyl)ethanol, 2-(2-methylphenyl)ethanol, 2-methyl-4-phenylpentanol, 2-methyl-5-phenylpentanol, 3-methyl-5-phenylpentanol, 4-methyl-1-phenylpentan-2-ol, 2-methyl-1-phenylpropan-2-ol, 2-(4-methyl phenyl)propan-2-ol, 3-methyl-5-(2,2,3-trimethyl-3-cyclopenten-1-yl)-4-penten-2-ol, 2-(2-methyl propyl)-4-hydroxy-4-methyl-tetrahydropyrane, 2-methyl-4-(2,3,3-trimethyl-2-cyclopenten-1-yl)-2-butenol, 3-methyl-5-(2,2,3-trimethyl-3-cyclopenten-1-yl)pentan-2-ol, 2-methyl-4-(2,2,3-trimethyl-3-cyclopenten-1- yl)pent-4-enol, 3-methyl-5-(2,2,3-trimethylcyclopentyl-3-enyl)pent-4-en-2-ol, 2,6-nonadienol, 1-nonanol, 6-nonenol, 1,2,3,4,4a,5,8,8a-octahydro-2,2,6,8-tetramethyl-1-naphthalenol, octahydro-2,5,5-trimethyl-2-naphthalenol, octan-2-ol, octan-3-ol, 1-octen-3-ol, 3,4,5,6,6-pentamethylheptan-2-ol, 2-pentyl-1-cyclopentanol, perhydro-4,8a-dimethyl-4a-naphthalenol, 2-phenoxyethanol, 4-phenylbutan-2-ol, 4-phenyl-3-buten-2-ol, 1-phenylethanol, 2-phenylethanol, 1-phenylhexan-2-ol, 1-phenylpentan-2-ol, 2-phenylpropanol, 2-phenylpropanol, 3-phenylpropanol, 1-phenylpropan-2-ol, 3-phenyl-2-propenol, 2-tert-butylcyclohexanol, 4-tert-butylcyclohexanol, 1-(2-tert-butyl-cyclohexyloxy)butan-2-ol, 2-tert-butyl-4-methyl-1-cyclohexanol, tetrahydro-2-isobutyl-4-methyl(2H)pyran-4-ol, 2-(tetrahydro-5-methyl-5-vinyl-2-furyl)propan-2-ol, 1-(2,2,3,6-tetramethylcyclohex-1-yl)hexan-3-ol, 2,4,6,8-tetramethylnonan-1-ol, 3,6,7-tetramethylnonan-1-ol, 2,6,10,10-tetramethyl-1-oxaspiro[4.5]decan-6-ol, 2,6,6,8-tetramethyltricyclo[5.3.1.0(1,5)]undecan-8-ol (cedrenol), (+)-(1R,2R)-1,3,3-trimethylbicyclo[2.2.1]heptan-2endo-ol (fenchol), (+)-(1R, 2S)-1,7,7-trimethylbicyclo[2.2.1]heptan-2-ol (borneol), 2,6, 6-trimethylbicyclo[3.1.1]heptan-3-ol, 3-(5,5,6-trimethylbicyclo[2.2.1]hept-2-yl)cyclohexanol, 4-(5,5,6-trimethylbicyclo[2.2.1]hept-2-yl)cyclohexanol, 3,3,5-trimethylcyclohexanol, 4-(2,6,6-trimethyl-2-cyclohexen-1-yl)butan-2-ol, 4-(2,6,6-trimethyl-1-cyclohexen-1-yl)-3-buten-2-ol (beta-ionol), (E)-4-(2,6,6-trimethyl-2-cyclohexen-1-yl)-3-buten-2-ol (alpha-ionol), (2,4,6-trimethylcyclohex-3-enyl)methanol, 1-(2,2,6-trimethyl-1-cyclohexyl)hexan-3-ol, 5-(2,2,3-trimethyl-3-cyclopentenyl)-3-methylpentan-2-ol, 4,7,9-trimethyldecan-2-ol, 4,6,8-trimethyldecan-2-ol, 3,8,9-trimethyldecan-2-ol, 3,7,11-trimethyl-2,6,10-dodecatrienol (farnesol), 3,7,11-trimethyl-1,6,10-dodecatrien-3-ol (nerolidol), 3,3,5-trimethylhexanol, undecanol, undecan-2-ol, 10-undecenol, (6E)-N-[(4-hydroxy-3-methoxyphenyl)methyl]-8-methylnon-6-enamide (capsaicin), 2-Isopropyl-5-methylphenol (thymol), 5-isopropyl-2-methylphenol (carvacrol), 2-(4-methylcyclohex-3-en-1-yl)propan-2-ol (α-terpineol), p-allylphenol (chavicol), 2H-1,3-Benzodioxol-5-ol (sesamol), butan-2-yl 2-(2-hydroxyethyl)piperidine-1-carboxylate (picaridin) and 2-(2-hydroxypropan-2-yl)-5-methylcyclohexan-1-ol (p-menthane-3,8-diol, PMD); more preferably selected from 4-allyl-2-methoxyphenol (eugenol), (E)-3,7-dimethyl-2,6-octadienol (geraniol), (Z)-3,7-dimethyl-2,6-octadienol (nerol), 3,7-dimethyl-1,6-octadien-3-ol (linalool), 3,7-dimethyloct-6-enol (citronellol), 4-hydroxy-3-ethoxybenzaldehyde (ethylvanillin), 4-hydroxy-3-methoxybenzaldehyde (vanillin), 4-(4-hydroxy-1-phenyl)butan-2-one (raspberry ketone), p-menthan-3-ol (menthol), (4-methoxyphenyl) methanol (anisyl alcohol), 2-isopropyl-5-methylphenol (thymol), 5-isopropyl-2-methylphenol (carvacrol), 2-(4-methylcyclohex-3-en-1-yl)propan-2-ol (α-terpineol), butan-2-yl 2-(2-hydroxyethyl)piperidine-1-carboxylate (picaridin) and 2-(2-hydroxypropan-2-yl)-5-methylcyclohexan-1-ol (p-menthane-3,8-diol, PMD); more preferably selected from E-3,7-dimethyl-2,6-octadienol (geraniol), 2-methoxy-4-(2-propenyl)phenol (eugenol), butan-2-yl 2-(2-hydroxyethyl) piperidine-1-carboxylate (picaridin), 5-methyl-2-(propan-2-yl)cyclohexan-1-ol (menthol), 2-methyl-5-propan-2-ylphenol (carvacrol) and 2-(2-hydroxypropan-2-yl)-5-methylcyclohexan-1-ol (p-menthane-3,8-diol, PMD); excluding alcohols of formula R—OH selected from the group consisting of methanol, ethanol, isopropanol, 4-methoxyphenol, n-octanol (1-octanol), 2-propenyl alcohol (allyl alcohol), benzyl alcohol, phenol, 4-nitrophenol, 4-(3-hydroxybutyl)phenol, allyl 2-(hydroxymethyl)benzoate, benzyl 2-(hydroxymethyl)benzoate, 4-hydroxyphenol, 2-(hydroxymethyl)phenol, 1H-indol-3-ol, 4-(2-hydroxyethyl)benzene-1,2-diol, 2-(trimethylsilyl)ethan-1-ol, 5-(hydroxymethyl)furan-2-carbaldehyde, tert-butyldimethylsilanol, cyclohexanol, n-hexanol (1-hexanol), prop-2-yn-1-ol, pent-4-en-1-ol, p-cresol, 4,7-bis(hydroxymethyl)-1,4a,5,6,7, 7a-hexahydrocyclopenta[c]pyran-1-yl 3-methylbutanoate, and 4,7-bis(hydroxymethyl)-1,4a,5,7a-tetrahydrocyclopenta [c]pyran-1-yl 3-methylbutanoate and (2,3-dimethylbutan-2-yl)dimethylsilanol.

Most of those alcohols are "volatile alcohol", which as referred to herein denotes an alcohol that when applied to a surface, such as, for example, the skin of a user, and the coupling between the alcohol and the sugar moiety is cleaved, then the alcohol easily evaporates at ambient temperatures. The alcohol can then provide an odorant vapour layer or vapour zone adjacent to the surface, such as the skin of the user.

The above listed alcohols are commercially available, as disclosed in WO-A-2014/202416.

The determination of the boiling point of the alcohols may be carried out using standard methods disclosed in prior art, which are well-known to the person skilled in the art, for example, as disclosed in J. Vilarrasa, *Introducción al análisis orgánico*, page 44, Eunibar, Barcelona, 1975.

Alcohol E-3,7-dimethyl-2,6-octadienol is also known as geraniol and corresponds to the following structure:

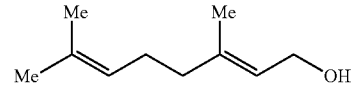

In another embodiment, the alcohol rest is E-3,7-dimethyl-2,6-octadienol (geraniol).

Alcohol 2-methoxy-4-(2-propenyl)phenol is also known as eugenol, and corresponds to the following structure:

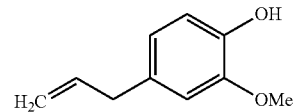

In another embodiment, the alcohol rest is 2-methoxy-4-(2-propenyl)phenol (eugenol).

In an embodiment, the alcohol rest is one or more stereoisomers of butan-2-yl 2-(2-hydroxyethyl)piperidine-1-carboxylate (Icaridin or picaridin), and corresponds to the following structure, wherein * denotes the stereogenic centers:

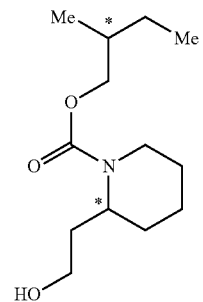 [SMILES: CCC(C)COC(=O)N1CCCCC1CCO]

Alcohol 5-methyl-2-(propan-2-yl)cyclohexan-1-ol is also known as menthol. One preferred isomer is L-menthol or (−)-menthol, and corresponds to the following structure:

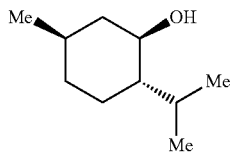

Additional isomers of menthol are available: (+)-menthol, (+)- and (−)-isomenthol, (+)- and (−)-neomenthol, and (+)- and (−)-neoisomenthol.

In another embodiment, the alcohol rest is 5-methyl-2-(propan-2-yl)cyclohexan-1-ol (menthol), preferably L-menthol.

In another embodiment, the alcohol rest is 2-methyl-5-propan-2-ylphenol (carvacrol), and it corresponds to the following structure:

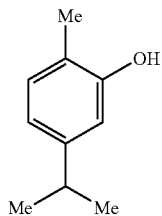

Alcohol 2-(2-hydroxypropan-2-yl)-5-methylcyclohexan-1-ol is also known as p-menthane-3,8-diol (PMD), and it corresponds to the following structure:

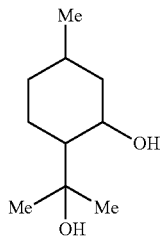

Different stereoisomers of PMD, alone, as racemic blends or diastereomeric mixtures, show a repellent effect, as disclosed in Barasa et al., J. Med. Entomol., 2002, 39, 736-741.

PMD can be attached to the sugar moiety by the secondary or tertiary hydroxyl group.

In an embodiment, the alcohol rest is one or more stereoisomers of 2-(2-hydroxypropan-2-yl)-5-methylcyclohexan-1-ol (PMD).

Eugenol, geraniol, picaridin, L-menthol and PMD have well-known insect repellent properties as disclosed in Carroll et al., J. Am. Mosquito Control Assoc., 2006, 22, 507-514) or Barnard et al., J. Med. Entomol., 2004, 41, 726-730. Carvacrol outperformed N,N-diethyl-m-methylbenzamide (DEET) against the mosquito *Culex pipiens pallens* as disclosed in Park et al., J. Am. Mosquito Control Assoc., 2005, 21, 80-83.

The compounds of formula (I) are capable of being effective insect repellents. As shown in the Examples section, these compounds are susceptible of releasing alcohols in different conditions of pH and temperature, both in the presence and absence of fresh skin washing solution.

Process for Preparing 3′-Ketoglycoside

The process for preparing a 3′-ketoglycoside compound of formula (I) is an aspect of the invention.

The process for preparing a 3′-ketoglycoside compound of formula (I) comprises the oxidation of glycoside compound of formula (II)

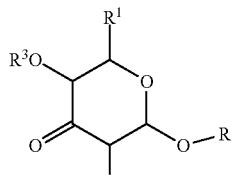

(I)

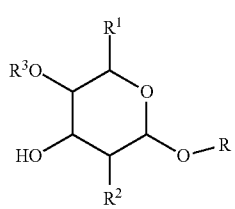

(II)

with an oxidizing agent, preferably selected from the group consisting of a quinone, oxygen, air, peroxide, peracid, and hydroperoxide, in the presence of [(2,9-dimethyl-1,10-phenanthroline)Pd(μ-OAc)]$_2$(OTf)$_2$ as catalyst, wherein the stereochemistry at positions 1′, 2′, 4′ and 5′ is independently selected from the α- or β-configuration; the sugar moiety is preferably selected from the group consisting of glucose, galactose, allose, altrose, mannose, gulose, idose, tallose, fucose, xylose, N-acetylglucosamine and 2-deoxyglucose; more preferably from D-glucose, D-galactose, D-allose, D-altrose, D-mannose, D-gulose, D-idose, D-tallose and D-N-acetylglucosamine and D-2-deoxyglucose; yet more preferably D-glucose, D-N-acetylglucosamine and D-2-deoxyglucose;

R represents substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl; wherein R is derived from an alcohol of formula R—OH having an initial boiling point less than or equal to 350° C. at a standard pressure of 101.3 kPa; preferably R is the rest of an alcohol of formula R—OH selected from the group consisting of 4-allyl-2-methoxyphenol (eugenol), 3-benzyl-3-pentanol, 4-cyclohexyl-2-methylbutan-2-ol, 2-cyclohexylpropanol, decanol, 9-decenol, (2,4-dimethylcyclohex-3-enyl)methanol, (2,4-dimethylcyclohexyl)methanol, 2-(1,1-dimethylethyl)-4-methylcyclohexanol, 2,6-dimethylheptan-2-ol, 3,7-dimethyl-7-hydroxyoctanal, 2,5-dimethyl-2-indanmethanol, 3,7-dimethyl-1,6-nonadien-3-ol, 6,8-dimethylnonan-2-ol, 4,8-dimethyl-7-nonen-2-ol, (E)-3,7-dimethyl-2,6-octadienol (geraniol), (Z)-3,7-dimethyl-2,6-octadienol (nerol), 3,7-dimethyl-3,6-octadienol, 3,7-dimethyl-1,6-octadien-3-ol (linalool), 3,7-dimethyloctane-1,7-diol (hydroxycitronellol), 3,7- dimethyloctanol, 2,6-dimethyloctan-2-ol (tetrahydromyrcenol), 3,7-dimethyloctan-3-ol, 3,7-dimethylocten-3-ol, 3,7-dimethyloct-6-enol (citronellol), 3,7-dimethyloct-7-enol, 2,6-dimethyloct-7-en-2-ol (dihydromyrcenol), (E)-3,3-dimethyl-5-(2,2,3-trimethyl-3-cyclopenten-1-yl)-4-penten-2-ol, dodecanol, 2-ethoxy-5-(1-propenyl)phenol, 2-ethyl-1-hexanol, ethyl 3-hydroxy hexanoate, 4-ethyl-2-methoxyphenol, 6-ethyl-3-methyl-5-octenol, 5-ethylnonan-2-ol, 2-ethyl-4-(2,2,3-trimethylcyclopent-3-enyl)but-2-enol, 1-heptanol, hexan-2-ol, 3-hexenol, 4-hexenol, 3-hydroxybutan-2-one, 4-hydroxy-3-ethoxybenzaldehyde (ethylvanillin), 4-hydroxy-3-methoxybenzaldehyde (vanillin), 4-(4-hydroxy-3-methoxyphenyl)butan-2-one, 2-(hydroxymethyl)nonan-2-one, 4-(4-hydroxy-1-phenyl)butan-2-one (raspberry ketone), 4-isopropyl-1-benzenemethanol, 4-isopropylcyclohexanol, 1-(4-isopropyl-1-cyclohexyl)ethanol, (4-isopropyl-1-cyclohexyl)methanol, 2-isopropyl-5-methylphenol, 5-isopropyl-2-methylphenol, (4-isopropylphenyl) methanol, 7-p-menthanol, p-menthan-3-ol (menthol), p-menthan-8-ol, p-menthen-4-ol, p-menthen-8-ol, p-menth-8-enol, p-menth-8-en-2-ol, p-menth-8-en-3-ol, 4-methoxy-1-benzenmethanol, 7-methoxy-3,7-dimethyloctan-2-ol, 2-methoxy-4-methylphenol, 2-methoxyphenol (Guaiacol), 2-methoxy-2-phenylethanol, (4-methoxyphenyl)methanol (anisyl alcohol), 2-methoxy-4-(1-propenyl)phenol (isoeugenol), 2-methoxy-4-propyl-1-cyclohexanol, 2-methoxy-4-propylphenol, 2-methoxy-4-vinylphenol, 3-(4-methylcyclohex-3-enyl)butanol, 4-methyl-3-decenol, 4-methyl-3-decen-5-ol, 4-(1-methylethyl)cyclohexylmethanol, 2-methyl-4-phenylbutan-2-ol, 3-methyl-4-phenylbutan-2-ol, 1-(4-methylphenyl)ethanol, 2-(2-methylphenyl)ethanol, 2-methyl-4-phenylpentanol, 2-methyl-5-phenylpentanol, 3-methyl-5-phenylpentanol, 4-methyl-1-phenylpentan-2-ol, 2-methyl-1-phenylpropan-2-ol, 2-(4-methyl phenyl)propan-2-ol, 3-methyl-5-(2,2,3-trimethyl-3-cyclopenten-1-yl)-4-penten-2-ol, 2-(2-methyl propyl)-4-hydroxy-4-methyl-tetrahydropyrane, 2-methyl-4-(2,3,3-trimethyl-2-cyclopenten-1-yl)-2-butenol, 3-methyl-5-(2,2,3-trimethyl-3-cyclopenten-1-yl)pentan-2-ol, 2-methyl-4-(2,2,3-trimethyl-3-cyclopenten-1-yl)pent-4-enol, 3-methyl-5-(2,2,3-trimethylcyclopentyl-3-enyl)pent-4-en-2-ol, 2,6-nonadienol, 1-nonanol, 6-nonenol, 1,2,3,4,4a,5,8,8a-octahydro-2,2,6,8-tetramethyl-1-naphthalenol, octahydro-2,5,5-trimethyl-2-naphthalenol, octan-2-ol, octan-3-ol, 1-octen-3-ol, 3,4,5,6,6-pentamethylheptan-2-ol, 2-pentyl-1-cyclopentanol, perhydro-4,8a-dimethyl-4a-naphthalenol, 2-phenoxyethanol, 4-phenylbutan-2-ol, 4-phenyl-3-buten-2-ol, 1-phenylethanol, 2-phenylethanol, 1-phenylhexan-2-ol, 1-phenylpentan-2-ol, 2-phenylpropanol, 2-phenylpropanol, 3-phenylpropanol, 1-phenylpropan-2-ol, 3-phenyl-2-propenol, 2-tert-butylcyclohexanol, 4-tert-butylcyclohexanol, 1-(2-tert-butyl-cyclohexyloxy)butan-2-ol, 2-tert-butyl-4-methyl-1-cyclohexanol, tetrahydro-2-isobutyl-4-methyl(2H)pyran-4-ol, 2-(tetrahydro-5-methyl-5-vinyl-2-furyl)propan-2-ol, 1-(2,2,3,6-tetramethylcyclohex-1-yl)hexan-3-ol, 2,4,6,8-tetramethylnonan-1-ol, 3,6,7-tetramethylnonan-1-ol, 2,6,10,10-tetramethyl-1-oxaspiro[4.5]decan-6-ol, 2,6,6,8-tetramethyltricyclo[5.3.1.0(1,5)]undecan-8-ol (cedrenol), (+)-(1R,2R)-1,3,3-trimethylbicyclo[2.2.1]heptan-2endo-ol (fenchol), (+)-(1R,2S)-1,7,7-trimethylbicyclo[2.2.1]heptan-2-ol (borneol), 2,6,6-trimethylbicyclo[3.1.1]heptan-3-ol, 3-(5,5,6-trimethylbicyclo[2.2.1]hept-2-yl)cyclohexanol, 4-(5,5,6-trimethylbicyclo[2.2.1]hept-2-yl)cyclohexanol, 3,3,5-trimethylcyclohexanol, 4-(2,6,6-trimethyl-2-cyclohexen-1-yl)butan-2-ol, 4-(2,6,6-trimethyl-1-cyclohexen-1-yl)-3-buten-2-ol (beta-ionol), (E)-4-(2,6,6-trimethyl-2-cyclohexen-1-yl)-3-buten-2-ol (alpha-ionol), (2,4,6-trimethylcyclohex-3-enyl)methanol, 1-(2,2,6-trimethyl-1-cyclohexyl)hexan-3-ol, 5-(2,2,3-trimethyl-3-cyclopentenyl)-3-methylpentan-2-ol, 4,7,9-trimethyldecan-2-ol, 4,6,8-trimethyldecan-2-ol, 3,8,9-trimethyldecan-2-ol, 3,7,11-trimethyl-2,6,10-dodecatrienol (farnesol), 3,7,11-trimethyl-1,6,10-dodecatrien-3-ol (nerolidol), 3,3,5-trimethylhexanol, undecanol, undecan-2-ol, 10-undecenol, (6E)-N-[(4-hydroxy-3-methoxyphenyl)methyl]-8-methylnon-6-enamide (capsaicin), 2-Isopropyl-5-methylphenol (thymol), 5-isopropyl-2-methylphenol (carvacrol), 2-(4-methylcyclohex-3-en-1-yl)propan-2-ol (α-terpineol), p-allylphenol (chavicol), 2H-1,3-Benzodioxol-5-ol (sesamol), butan-2-yl 2-(2-hydroxyethyl)piperidine-1-carboxylate (picaridin) and 2-(2-hydroxypropan-2-yl)-5-methylcyclohexan-1-ol (p-menthane-3,8-diol, PMD); more preferably selected from 4-allyl-2-methoxyphenol (eugenol), (E)-3,7-dimethyl-2,6-octadienol (geraniol), (Z)-3,7-dimethyl-2,6-octadienol (nerol), 3,7-dimethyl-1,6-octadien-3-ol (linalool), 3,7-dimethyloct-6-enol (citronellol), 4-hydroxy-3-ethoxybenzaldehyde (ethylvanillin), 4-hydroxy-3-methoxybenzaldehyde (vanillin), 4-(4-hydroxy-1-phenyl)butan-2-one (raspberry ketone), p-menthan-3-ol (menthol), (4-methoxyphenyl)methanol (anisyl alcohol), 2-isopropyl-5-methylphenol (thymol), 5-isopropyl-2-methylphenol (carvacrol), 2-(4-methylcyclohex-3-en-1-yl)propan-2-ol (α-terpineol), butan-2-yl 2-(2-hydroxyethyl)piperidine-1-carboxylate (picaridin) and 2-(2-hydroxypropan-2-yl)-5-methylcyclohexan-1-ol (p-menthane-3,8-diol, PMD); and more preferably selected from E-3,7-dimethyl-2,6-octadienol (geraniol), 2-methoxy-4-(2-propenyl)phenol (eugenol), butan-2-yl 2-(2-hydroxyethyl)piperidine-1-carboxylate (picaridin), 5-methyl-2-(propan-2-yl)cyclohexan-1-ol (menthol), 2-methyl-5-propan-2-ylphenol (carvacrol) and 2-(2-hydroxypropan-2-yl)-5-methylcyclohexan-1-ol (p-menthane-3,8-diol, PMD);

$R^1$ represents H, $CH_3$, $CH_2OH$, $CH_2OR^4$, $CH_2OCOR^4$, $CH_2OCOOR^4$, $CH_2OCONHR^4$, $CH_2OCONR^4_2$, $CH_2NHR^4$, $CH_2NR^4_2$, $CO_2X$, $CO_2R^4$, $CONH_2$, $CONHR^4$, $CONR^4_2$, $CH_2OPO_3X_2$, $CH_2OPO_3XR^4$, $CH_2OPO_3R^4_2$, $CH_2OPO_2XNHR^4$, $CH_2OPO(NHR^4)_2$, $CH_2OPO_2XR^4$, $CH_2OPOR^4_2$, $CH_2OSO_3X$, $CH_2OSO_3R^4$ or $CH_2OSO_2R^4$, where X represents hydrogen, an alkali metal ion, ammonium ion, or an organic counterion, and $R^4$ represents substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl; preferably $R^1$ is $CH_2OH$, $CH_2OSO_3X$, $CH_2OCOR^4$ or $CO_2R^4$, and more preferably $CH_2OH$;

$R^2$ represents H, OH, $OR^4$, $OCOR^4$, $OCO_2R^4$, $OCONHR^4$, $OCONR^4_2$, $NH_2$, $NHR^4$, $NR^4_2$, $NHCOR^4$, $NHOR^4$, $OPO_3X_2$, $OPO_3XR^4$, $OPO_3R^4_2$, $OPO_2XNHR^4$, $OPO(NHR^4)_2$, $OPO_2XR^4$, $OPOR^4_2$, $OSO_3X$, $OSO_3R^4$ or $OSO_2R^4$, where $R^4$ is as defined above; preferably $R^2$ is OH, $NHCOR^4$, H or $OCOR^4$, and more preferably $R^2$ is OH, $NHCOR^4$, or H;

$R^3$ is H or $R^4$—Z, where $R^4$ is as defined above, and Z represents a single bond or a functional group selected from ester, amine, amide, carbonate or carbamate; preferably $R^3$ is H;

with the proviso that compound of formula (I) does not encompass the compounds when R is the rest of an alcohol of formula R—OH selected from the group consisting of methanol, ethanol, propan-1-ol, isopropanol, 2-(hydroxymethyl)but-2-ene-1,4-diol, 4-methoxyphenol, n-octanol (1-octanol), 2-propenyl alcohol (allyl alcohol), benzyl alcohol, phenol, 4-nitrophenol, 4-(3-hydroxybutyl)phenol, allyl 2-(hydroxymethyl)benzoate, benzyl 2-(hydroxymethyl)benzoate, 4-hydroxyphenol, 2-(hydroxymethyl)phenol, 1H-indol-3-ol, 4-(2-hydroxyethyl)benzene-1,2-diol, 2-(trimethylsilyl)ethan-1-ol, 5-(hydroxymethyl)furan-2-carbaldehyde, tert-butyldimethylsilanol, cyclohexanol, n-hexanol (1-hexanol), prop-2-yn-1-ol, pent-4-en-1-ol, p-cresol, 4,7-bis(hydroxymethyl)-1,4a,5,6,7,7a-hexahydrocyclopenta[c]pyran-1-yl 3-methylbutanoate, and 4,7-bis(hydroxymethyl)-1,4a,5,7a-tetrahydrocyclopenta[c]pyran-1-yl 3-methylbutanoate, 7-methyl-5,6,7,7a-tetrahydrocyclopenta[c]pyran-1,4a,5,7(1H)-tetraol, 1,4a,5-trihydroxy-7-methyl-1,4a,5,6,7,7a-hexahydrocyclopenta[c]pyran-7-yl acetate, 1,4a,5-trihydroxy-7-methyl-1,4a,5,6,7,7a-hexahydrocyclopenta[c]pyran-7-yl cinnamate and (2,3-dimethylbutan-2-yl) dimethylsilanol.

Catalyst [(2,9-Dimethyl-1,10-phenanthroline)Pd(μ-OAc)]$_2$(OTf)$_2$ may be prepared using prior art methods, such as disclosed in, for example, Brink et al., Adv. Synth. Catal., 2003, 345, 1341-1352, and Conley et al., Organometallics, 2007, 26, 5447-5453.

The catalyst is preferably used in a molar ratio of from 0.01 to 10 mol %, preferably from 0.1 to 8 mol %, and more preferably 1-6 mol %, with respect to the glycoside substrate.

In the process of the invention, the oxidation reaction is usually performed in any suitable solvent or solvent mixture. Stirring is recommended. It may be performed in water, an organic solvent or a mixture thereof. Suitable organic solvents include DMSO, dimethylformamide (DMF), tetrahydrofuran (THF), dioxane, acetonitrile, hexamethylphosphoramide (HMPA), N-methyl-2-pyrrolidone (NMP) or any mixture thereof.

The process of the invention is performed usually at a temperature between 0° C. and 100° C., preferably between 10° C. and 70° C., more preferably at around room temperature. The total reaction time will depend on the specific circumstances. Usually, the reaction takes place in a period range from about 1-48 hr.

Glycosides used as starting compounds are either commercially available through, for example company Carbosynth Ltd., or may be prepared by prior art methods such as disclosed below.

Alkyl and aryl glycosides can be prepared using a variety of chemical synthetic methods such as the Koenigs-Knorr or Mitsunobu reaction that have been performed under a variety of different conditions and typically produce the kinetically favoured anomer either exclusively or as the predominant product depending on the alcohol, sugar, sugar protecting groups and reaction conditions used. Kobayashi et al., Chem. Pharm. Bull., 2016, 64, 1009-1018, nicely demonstrated some of these effects towards the synthesis of the low-affinity Na+-dependent glucose co-transporter SGLT2 inhibitor, Remogliflozin. The Koenigs-Knorr procedure requires the use of a fully protected sugar derivative containing a good leaving group at the anomeric position, whereas the Mitsunobu reaction requires a protected sugar containing a free hydroxyl substituent at the anomeric position. These starting materials can be accessed by a variety of different methods such as the pentaacetylation reported by Lee et al., Angew. Chemie, Int. Ed., 2016, 55, 12338-12342, followed by selective deprotection at the anomeric position as described by Yang et al., Bioorg. Chem., 2017, 72, 42-50, and activation as the trichloroacetimidate as described by Ikeuchi et al., Synlett., 2019, 30, 1308-1312.

To enhance the quantity of the thermodynamically stable glycoside resulting from a glycosylation procedure that favours the kinetic product, the protected glycosides can be anomerised under a variety of conditions. For example, protected alkyl glycosides can be anomerised using a variety of Lewis acids such as titanium tetrachloride as reported by Sakata et al., Agric. Biol. Chem., 1979, 43, 307, to give anomeric mixtures which can be separated chromatographically. Aryl glycosides are typically anomerically stable in the presence of Lewis acids, but can be anomerised under different conditions such as treatment with hot phenol and zinc chloride, as disclosed in Montgomery et al., J. Am. Chem. Soc., 1942, 64, 690-694.

An increasing number of alkyl and aryl glycosides can also be prepared using a variety of biosynthetic methods that have been substantially reviewed. Some examples of recent reviews on the enzymatic synthesis of glycosides include De Bruyn et al., Biotech. Adv., 2015, 33, 288-302 and Desmet et al., Chem. Eur. J., 2012, 18, 10786-10801.

Glycosides can be oxidised to their uronic acids under a variety of conditions such as 2,2,6,6-tetramethyl-1-piperidinyloxy free radical (TEMPO) catalyzed oxidation as reported by Lu et a., Molecules, 2016, 21, 1301. A variety of methods for the preparation of uronamides can be used such as the thioesterification of a 6'-tosylated glycoside and subsequent treatment with amine as reported by Lin et al., Eur. J. Org. Chem., 2016, 2653-2664.

The κ'-alcohol can alternatively be selectively functionalised as an ester, carbonate or carbamate using a variety of methods including enzymatic reverse hydrolysis (Gotor et al., J. Chem. Soc. Perkin Trans. I, 1991, 491-492; Pulando et al., J. Chem. Soc. Perkin Trans. 1, 1992, 2891-2898; Garcia-Alles et al., Tetrahedron, 1995, 51, 307-316). 6'-ether protected glycoside can be readily prepared by methods such as those reported for the tritylation of methyl-O-alpha-D-glucopyranoside by Hearon et al., J. Am. Chem. Soc., 1944, 66, 995-997, and 6'-amines via methods such as azide displacement used by de Souza et al., Carbohydr. Res., 2015, 410, 1-8.

The 6'-alcohol can also be selectively functionalised as the sulfate or phosphate monoester using procedures such as those reported by Liu et al., Eur. J. Med. Chem., 2017, 128, 274-286. The alcohol can alternatively be functionalised as sulfate diesters, phosphate di- or triesters, sulfonate monoesters, phosphonate mono- or diesters, diphosphonate monoesters, phosphoramidate or phosphonodiamidite using similar procedures that typically involve nucleophilic attack of an electrophilic sulfur of phosphorous atom by the 6'-alcohol resulting in displacement of a leaving group such as chloride. Examples of how such compounds may be constructed can be found in citations in the reviews of Simpson et al. J. Am. Chem. Soc., 2006, 128, 1605-1610 and Mehellou et al., Chem. Med. Chem., 2009, 4, 1779-1791.

In some cases, the phosphorous atom might be rendered chiral as is the case for phosphoramidates. Given that glycosides are also chiral, this can lead to diastereoisomeric mixtures and methods exist to favour the formation of one diastereomer or selectively isolate it. For example, Ross et al., J. Org. Chem., 2011, 76, 8311-8319, found that a nucleoside phosphoramidate could be prepared with a 3:1 excess of one diastereomer by careful optimisation of the reaction conditions. The major isomer could then be isolated pure by crystallisation.

A large variety of derivatives of the secondary alcohols at the 2'- and 4'-positions can also be prepared using similar methodologies to functionalise the 6'-position (where $R^1=CH_2OH$). This can sometimes be achieved selectively, but because the primary alcohol at the 6'-position is usually more reactive and because there is often more than one secondary alcohol group present, more usually through use of an appropriate protecting group strategy. Examples of how a protecting group strategy can be effectively used to sulfate a glycoside at different positions of the sugar ring have been demonstrated by Loft et al., Chem. Bio. Chem., 2009, 10, 565-576.

The preparation of compounds of formula (I), wherein the sugar moiety is a glycosylamine is disclosed, for example, in Zhang et al., J. Med. Chem., 2019, 62, 7857-7873.

In some embodiments, selective diacetylations of the hydroxyl groups of the sugar moiety may be carried out according to methods available in prior art, such as, for example those disclosed in MacManus et al., Carbohydrate Res., 1995, 279, 281-291.

Delivery of Compounds of Formula (I)

Another aspect of the object of the invention is the use of a 3'-ketoglycoside compound of formula (I),

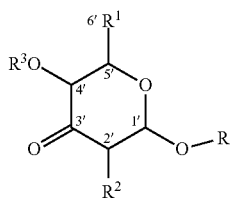

(I)

wherein
the stereochemistry at positions 1', 2', 4' and 5' is independently selected from the α- or β-configuration; the sugar moiety is preferably selected from the group consisting of glucose, galactose, allose, altrose, mannose, gulose, idose, tallose, fucose, xylose, N-acetylglucosamine and 2-deoxyglucose; more preferably from D-glucose, D-galactose, D-allose, D-altrose, D-mannose, D-gulose, D-idose, D-tallose and D-N-acetylglucosamine and D-2-deoxyglucose; yet more preferably D-glucose, D-N-acetylglucosamine and D-2-deoxyglucose;

R represents substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl; wherein preferably R is derived from an alcohol of formula R—OH having an initial boiling point less than or equal to 350° C. at a standard pressure of 101.3 kPa; more preferably R is the rest of an alcohol of formula R—OH selected from the group consisting of 4-allyl-2-methoxyphenol (eugenol), 3-benzyl-3-pentanol, 4-cyclohexyl-2-methylbutan-2-ol, 2-cyclohexylpropanol, decanol, 9-decenol, (2,4-dimethylcyclohex-3-enyl)methanol, (2,4-dimethylcyclohexyl)methanol, 2-(1,1-dimethylethyl)-4-methylcyclohexanol, 2,6-dimethylheptan-2-ol, 3,7-dimethyl-7-hydroxyoctanal, 2,5-dimethyl-2-indanmethanol, 3,7-dimethyl-1,6-nonadien-3-ol, 6,8-dimethylnonan-2-ol, 4,8-dimethyl-7-nonen-2-ol, (E)-3,7-dimethyl-2,6-octadienol (geraniol), (Z)-3,7-dimethyl-2,6-octadienol (nerol), 3,7-dimethyl-3,6-octadienol, 3,7-dimethyl-1,6-octadien-3-ol (linalool), 3,7-dimethyloctane-1,7-diol (hydroxycitronellol), 3,7-dimethyloctanol, 2,6-dimethyloctan-2-ol (tetrahydromyrcenol), 3,7-dimethyloctan-3-ol, 3,7-dimethylocten-3-ol, 3,7-dimethyloct-6-enol (citronellol), 3,7-dimethyloct-7-enol, 2,6-dimethyloct-7-en-2-ol (dihydromyrcenol), (E)-3,3-dimethyl-5-(2,2,3-trimethyl-3-cyclopenten-1-yl)-4-penten-2-ol, dodecanol, 2-ethoxy-5-(1-propenyl)phenol, 2-ethyl-1-hexanol, ethyl 3-hydroxy hexanoate, 4-ethyl-2-methoxyphenol, 6-ethyl-3-methyl-5-octenol, 5-ethylnonan-2-ol, 2-ethyl-4-(2,2,3-trimethylcyclopent-3-enyl)but-2-enol, 1-heptanol, hexan-2-ol, 3-hexenol, 4-hexenol, 3-hydroxybutan-2-one, 4-hydroxy-3-ethoxybenzaldehyde (ethylvanillin), 4-hydroxy-3-methoxybenzaldehyde (vanillin), 4-(4-hydroxy-3-methoxyphenyl)butan-2-one, 2-(hydroxymethyl)nonan-2-one, 4-(4-hydroxy-1-phenyl)butan-2-one (raspberry ketone), 4-isopropyl-1-benzenemethanol, 4-isopropylcyclohexanol, 1-(4-isopropyl-1-cyclohexyl)ethanol, (4-isopropyl-1-cyclohexyl)methanol, 2-isopropyl-5-methylphenol, 5-isopropyl-2-methylphenol, (4-isopropylphenyl)methanol, 7-p-menthanol, p-menthan-3-ol (menthol), p-menthan-8-ol, p-menthen-4-ol, p-menthen-8-ol, p-menth-8-enol, p-menth-8-en-2-ol, p-menth-8-en-3-ol, 4-methoxy-1-benzenmethanol, 7-methoxy-3,7-dimethyloctan-2-ol, 2-methoxy-4-methylphenol, 2-methoxyphenol (Guaiacol), 2-methoxy-2-phenylethanol, (4-methoxyphenyl)methanol (anisyl alcohol), 2-methoxy-4-(1-propenyl)phenol (isoeugenol), 2-methoxy-4-propyl-1-cyclohexanol, 2-methoxy-4-propylphenol, 2-methoxy-4-vinylphenol, 3-(4-methylcyclohex-3-enyl)butanol, 4-methyl-3-decenol, 4-methyl-3-decen-5-ol, 4-(1-methylethyl)cyclohexylmethanol, 2-methyl-4-phenylbutan-2-ol, 3-methyl-4-phenylbutan-2-ol, 1-(4-methylphenyl)ethanol, 2-(2-methylphenyl)ethanol, 2-methyl-4-phenylpentanol, 2-methyl-5-phenylpentanol, 3-methyl-5-phenylpentanol, 4-methyl-1-phenylpentan-2-ol, 2-methyl-1-phenylpropan-2-ol, 2-(4-methyl phenyl)propan-2-ol, 3-methyl-5-(2,2,3-trimethyl-3-cyclopenten-1-yl)-4-penten-2-ol, 2-(2-methyl propyl)-4-hydroxy-4-methyl-tetrahydropyrane, 2-methyl-4-(2,3,3-trimethyl-2-cyclopenten-1-yl)-2-butenol, 3-methyl-5-(2,2,3-trimethyl-3-cyclopenten-1-yl)pentan-2-ol, 2-methyl-4-(2,2,3-trimethyl-3-cyclopenten-1-yl)pent-4-enol, 3-methyl-5-(2,2,3-trimethylcyclopentyl-3-enyl)pent-4-en-2-ol, 2,6-nonadienol, 1-nonanol, 6-nonenol, 1,2,3,4,4a,5,8,8a-octahydro-2,2,6,8-tetramethyl-1-naphthalenol, octahydro-2,5,5-trimethyl-2-naphthalenol, octan-2-ol, octan-3-ol, 1-octen-3-ol, 3,4,5,6,6-pentamethylheptan-2-ol, 2-pentyl-1-cyclopentanol, perhydro-4,8a-dimethyl-4a-naphthalenol, 2-phenoxyethanol, 4-phenylbutan-2-ol, 4-phenyl-3-buten-2-ol, 1-phenylethanol, 2-phenylethanol, 1-phenylhexan-2-ol, 1-phenylpentan-2-ol, 2-phenylpropanol, 2-phenylpropanol, 3-phenylpropanol, 1-phenylpropan-2-ol, 3-phenyl-2-propenol, 2-tert-butylcyclohexanol, 4-tert-butylcyclohexanol, 1-(2-tert-butyl-cyclohexyloxy)butan-2-ol, 2-tert-butyl-4-methyl-1-cyclohexanol, tetrahydro-2-isobutyl-4-methyl(2H)pyran-4-ol, 2-(tetrahydro-5-methyl-5-vinyl-2-furyl)propan-2-ol, 1-(2,2,3,6-tetramethylcyclohex-1-yl)hexan-3-ol, 2,4,6,8-tetramethylnonan-1-ol, 3,6,7-tetramethylnonan-1-ol, 2,6,10,10-tetramethyl-1-oxaspiro[4.5]decan-6-ol, 2,6,6,8-tetramethyltricyclo[5.3.1.0(1,5)]undecan-8-ol (cedrenol), (+)-(1R,2R)-1,3,3-trimethylbicyclo[2.2.1]heptan-2endo-ol (fenchol), (+)-(1R,2S)-1,7,7-trimethylbicyclo[2.2.1]heptan-2-ol (borneol), 2,6,6-trimethylbicyclo[3.1.1]heptan-3-ol, 3-(5,5,6-trimethylbicyclo[2.2.1]hept-2-yl)cyclohexanol, 4-(5,5,6-trimethylbicyclo[2.2.1]hept-2-yl)cyclohexanol, 3,3,5-trimethylcyclohexanol, 4-(2,6,6-trimethyl-2-cyclohexen-1-yl)butan-2-ol, 4-(2,6,6-trimethyl-1-cyclohexen-1-yl)-3-buten-2-ol (beta-ionol), (E)-4-(2,6,6-trimethyl-2-cyclohexen-1-yl)-3-buten-2-ol (alpha-ionol), (2,4,6-trimethylcyclohex-3-enyl)methanol, 1-(2,2,6-trimethyl-1-cyclohexyl)hexan-3-ol, 5-(2,2,3-trimethyl-3-cyclopentenyl)-3-methylpentan-2-ol, 4,7,9-trimethyldecan-2-ol, 4,6,8-trimethyldecan-2-ol, 3,8,9-trimethyldecan-2-ol, 3,7,11-trimethyl-2,6,10-dodecatrienol (farnesol), 3,7,11-trimethyl-1,6,10-dodecatrien-3-ol (nerolidol), 3,3,5-trimethylhexanol, undecanol, undecan-2-ol, 10-undecenol, (6E)-N-[(4-hydroxy-3-methoxyphenyl)methyl]-8-methylnon-6-enamide (capsaicin), 2-Isopropyl-5-methylphenol (thymol), 5-isopropyl-2-methylphenol (carvacrol), 2-(4-methylcyclohex-3-en-1-yl)propan-2-ol (α-terpineol), p-allylphenol (chavicol), 2H-1,3-Benzodioxol-5-ol (sesamol), butan-2-yl 2-(2-hydroxyethyl)piperidine-1-carboxylate (picaridin) and 2-(2-hydroxypropan-2-yl)-5-methylcyclohexan-1-ol (p-menthane-3,8-diol, PMD); more preferably selected from 4-allyl-2-methoxyphenol (eugenol), (E)-3,7-dimethyl-2,6-octadienol (geraniol), (Z)-3,7-dimethyl-2,6-octadienol (nerol), 3,7-dimethyl-1,6-octadien-3-ol (linalool), 3,7-dimethyloct-6-enol (citronellol), 4-hydroxy-3-ethoxybenzaldehyde (ethylvanillin), 4-hydroxy-3-methoxybenzaldehyde (vanillin), 4-(4-hydroxy-1-phenyl)butan-2-one (raspberry ketone), p-menthan-3-ol (menthol), (4-methoxyphenyl)methanol (anisyl alcohol), 2-isopropyl-5-methylphenol (thymol), 5-isopropyl-2-methylphenol (carvacrol), 2-(4-methylcyclohex-3-en-1-yl)propan-2-ol (α-terpineol), butan-2-yl 2-(2-hydroxyethyl)piperidine-1-carboxylate (picaridin) and 2-(2-hydroxypropan-2-yl)-5-methylcyclohexan-1-ol (p-menthane-3,8-diol, PMD); and more preferably selected from E-3,7-dimethyl-2,6-octadienol (geraniol), 2-methoxy-4-(2-propenyl)phenol (eugenol), butan-2-yl 2-(2-hydroxyethyl)piperidine-1-carboxylate (picaridin), 5-methyl-2-(propan-2-yl)cyclohexan-1-ol (menthol), 2-methyl-5-propan-2-ylphenol (carvacrol) and 2-(2-hydroxypropan-2-yl)-5-methylcyclohexan-1-ol (p-menthane-3,8-diol, PMD);

$R^1$ represents H, $CH_3$, $CH_2OH$, $CH_2OR^4$, $CH_2OCOR^4$, $CH_2OCOOR^4$, $CH_2OCONHR^4$, $CH_2OCONR^4_2$, $CH_2NHR^4$, $CH_2NR^4_2$, $CO_2X$, $CO_2R^4$, $CONH_2$, $CONHR^4$, $CONR^4_2$, $CH_2OPO_3X_2$, $CH_2OPO_3XR^4$, $CH_2OPO_3R^4_2$, $CH_2OPO_2XNHR^4$, $CH_2OPO(NHR^4)_2$, $CH_2OPO_2XR^4$, $CH_2OPOR^4_2$, $CH_2OSO_3X$, $CH_2OSO_3R^4$ or $CH_2OSO_2R^4$, where X represents hydrogen, an alkali metal ion, ammonium ion, or an organic counterion, and $R^4$ represents substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl; preferably $R^1$ is $CH_2OH$, $CH_2OSO_3X$, $CH_2OCOR^4$ or $CO_2R^4$, and more preferably $CH_2OH$;

$R^2$ represents H, OH, $OR^4$, $OCOR^4$, $OCO_2R^4$, $OCONHR^4$, $OCONR^4_2$, $NH_2$, $NHR^4$, $NR^4_2$, $NHCOR^4$, $NHOR^4$, $OPO_3X_2$, $OPO_3XR^4$, $OPO_3R^4_2$, $OPO_2XNHR_4$, $OPO(NHR_4)_2$, $OPO_2XR^4$, $OPOR^4_2$, $OSO_3X$, $OSO_3R^4$ or $OSO_2R^4$, where $R^4$ is as defined above; preferably $R^2$ is OH, $NHCOR^4$, H or $OCOR^4$, and more preferably $R^2$ is OH, $NHCOR^4$, or H;

$R^3$ is H or $R^4$—Z, where $R^4$ is as defined above, and Z represents a single bond or a functional group selected from ester, amine, amide, carbonate or carbamate; preferably $R^3$ is H;

for the controlled release of an alcohol, preferably for the controlled release of an alcohol having an insect repellent effect.

In a preferred embodiment, $R^1$ is $CH_2OH$, $CH_2OSO_3X$, $CH_2OCOR^4$ or $CO_2R^4$, more preferably $R^1$ is $CH_2OH$.

In a preferred embodiment, $R^2$ is OH, $NHCOR^4$, H or $OCOR^4$.

In a preferred embodiment, $R^2$ is OH.

In a preferred embodiment, $R^2$ is $NHCOR^4$ or H.

In a preferred embodiment, $R^3$ is H.

In a preferred embodiment, the 3'-ketoglycoside compound of formula (I) it is selected from a β-3'-ketoglucoside, α-3'-ketoglucoside, β-3'-keto-N-acetylglucosaminoside and 2'-deoxy-3'-ketoglucoside.

In a preferred embodiment, the 3'-ketoglycoside compound of formula (I) is selected from a β-3'-ketoglucoside and a α-3'-ketoglucoside.

In a preferred embodiment, the 3'-ketoglycoside compound of formula (I) is selected from β-3'-keto-N-acetylglucosaminoside and 2'-deoxy-3'-ketoglucoside.

In an embodiment, the use of compound of formula (I) is a combination of said compound and a compound selected from an alcohol of formula R—OH as defined above, and an insect active compound.

An insect active compound, under the scope of this description, is a compound that is active in front of insects, causing, for example, a repellent effect or an attractant effect.

In a preferred embodiment, the insect active compound is selected, for example, from an insect repellent or an insect attractant. In a more preferred embodiment, the insect active compound is selected from a terpene, a terpenoid, a pyrethrin, a pyrethrinoid, N,N-diethyl-3-methylbenzamide (DEET), ethyl 3-[acetyl(butyl)amino]propanoate (IR3535), and mixtures thereof.

Terpene and terpenoids are well-known insect repellent, as disclosed, for example, in Boncan et al., Int. J. Mol. Sci., 2020, 21, doi:10.3390/ijms21197382.

Pyrethroids and pyrethrins are well-known insect repellents, as disclosed, for example, in Bowman et al., PLOS One, 2018, 13(5): e0196410, and in R. L. Metcalf, Ullmann's Encyclopedia of Industrial Chemistry, 2012, DOI: 10.1002/14356007.a14_263.

The insect repellent effect of the alcohol suitable according to the invention may be easily determined by known methods disclosed in the prior art, such as, in Barnard et al., op. cit.

Another aspect of the invention is a composition comprising at least a 3'-ketoglycoside compound of formula (I) and a carrier.

In an embodiment, the composition further comprises an alcohol of formula R—OH as disclosed above. That combination is suitable to manage the effect of the released alcohol.

The delivery of one or more compounds of formula (I) is generally achieved by a variety of formulations and devices that are widely used and known to those skilled in the art. Non-limiting examples include solutions, creams, pastes, powders, sprays, lotions, films or impregnated into or onto materials such as wipes, masks and sticks, medical devices or surfaces.

In a preferred embodiment the composition is in the form of solutions, creams, pastes, powders, sprays, lotions, films or impregnated into or onto materials such as wipes, masks and sticks, medical devices or surfaces.

Compositions according to the invention comprise a carrier, which usually is an aqueous solvent comprising water.

Usually, the composition further comprises a component selected from co-solvents, emulsifiers, humectants, astringents, buffers, emollients, antioxidants, preservatives, cosmetic oils, plant extracts, essential oils, such as, for example, *eucalyptus* oil, citronella, tea tree oil, neem oil, pine oil, and mixtures thereof. In a preferred embodiment, the essential oil is selected from *eucalyptus* oil, neem oil, citronella, tea tree oil, pine oil, and mixtures thereof.

The 3'-ketoglycoside compound may also form imine, oxime, hemiacetal, hemiaminal, bisulfite adduct or similar adducts in the presence of alternative nucleophiles that might be commonly present in a given formulation (polyol like polysaccharides, such as chitosan; sodium bisulfite, etc.) and which would be expected to further modulate its physicochemical properties such as stability.

The breakdown of compounds of formula (I) is primarily pH dependent and in an embodiment compounds of formula (I) are stabilised for storage prior to application and that the surface pH is suitably modulated to provide the correct rate of breakdown once applied.

The compounds of formula (I) are stable as solids, and mostly stable on dissolution in distilled water and/or in aqueous acidic media. In an embodiment, these compounds can be formulated in non-aqueous mixtures for hydration by water on the surface to be applied.

Generally, the stability of compounds of formula (I) in aqueous solutions is controlled by adjusting them to pH values such as, for example, from about 4.5 to about 7.0, preferably from about 4.5 to about 5.5. In an embodiment, the application of this solution is accompanied by the application of an alkaline solution to elevate the pH to the alkaline region triggering the release of the alcohol from compound of formula (I) at a suitable rate. In another embodiment, the application of this solution is accompanied by the application of an acidic solution that spontaneously increases in pH on application (for example use of a carbonate buffer, such as natural carbonated spring water that has been pH modulated with an acid like citric acid, that releases carbon dioxide. Compounds of formula (I), wherein R is alkyl, show generally greater stability than aryl derivatives.

In a preferred embodiment, the delivery of one or more compounds of formula (I) is achieved by a formulation selected from, for example, solutions, creams, pastes, powders, sprays, lotions, and films, or devices selected, for example, from wipes, masks and sticks, and medical devices.

These can be applied to the treatment of a variety of indications such as repulsion of a broad range of, for example, mosquitos, ticks, mites, midges, no-see-ums, and head lice.

In a preferred embodiment, insects are selected from mosquitos, ticks, mites, midges, no-see-ums, and head lice.

It forms also part of the invention a method of use of compounds of formula (I), which comprises the application of a composition comprising a 3'-ketoglycoside compound of formula (I) and a carrier onto a surface.

Compound of formula (I) may be applied to any surface such as soft surfaces such as skin, hair, clothes, plants, crops, or grain storage, or hard surfaces such as wood, synthetic materials, or ceramic materials.

In an embodiment, the soft surface is selected from skin, hair, clothes, plants, crops, and grain storage.

In an embodiment, the hard surface is selected from wood, synthetic materials, and ceramic materials.

Release of Alcohols

Compound of formula (I) is capable or releasing the alcohol linked to the sugar moiety through an α- or β-glycosidic linkage, or a mixture of both.

Compound of formula (I), in particular when the alcohol rest R proceeds from an alcohol R—OH, such as eugenol, geraniol, picaridin, carvacrol, menthol (preferably L-menthol) or PMD, is capable of being an effective insect repellent, in particular when in contact with the human skin. As shown in the Examples section, these compounds are susceptible to release of an insect repellent when incubated at physiological pH and temperature in the presence or absence of skin washing from the human body.

The compounds are stable in water or at low pH and can be tuned to release alcohol at different rates by modulation of the formulation concentration and pH applied to the skin.

The in vitro model used in the examples is designed to determine the suitability of compounds of formula (I) as slow release insect repellents.

Compounds of formula (I), wherein R is alkyl or aryl, provide surprisingly an advantage over the state-of-the-art corresponding to O-glycosides, because they break down to release their respective alcohols at a far greater rate. This breakdown allows the controlled release of a greater concentration of alcohol over a period, longer than the duration of the free alcohol, suitable to provide an insect repellent effect, over a wider range of surfaces, such as skin zones or clothes or plants.

Glycosides derived from the same alcohols as compounds of formula (I), and tested at similar concentrations under the same conditions are hydrolysed significantly slower and to very different extents.

The rate of alcohol release in buffer solutions is usually dependent on aglycone, ketosugar, 3'-ketoglycoside concentration, pH and temperature, and can be adjusted conveniently to a suitable rate by the skilled person. Thus, the 3'-ketoglycosides of formula (I) are substantially broken down in 0.1M sodium phosphate buffer in $D_2O$, pH 7.0, after 60 h, but remain relatively stable in deionised water and at lower pH. As shown in the examples, other substances in addition to phosphate buffers, may be used to control the rate of alcohol release, such as, for example, arginine.

The methyl-O-α-D-3'-ketoglucopyranoside (compound of formula (III)) also slowly liberates methanol when heated to 37° C. in 0.1M sodium phosphate buffer in $D_2O$, pH 7.0 after 36 h, but again remained stable in deionised water and relatively stable at acidic pH.

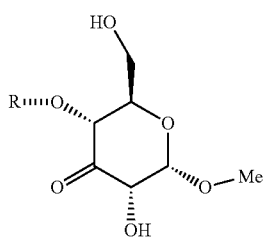

(III)

Reaction of methyl-O-α-D-3'-ketoglucopyranoside (III) in the presence of skin washings at the same temperature and pH resulted in the release of significantly more methanol than had been observed in buffer alone.

The difference in phenol release from phenyl-O-β-D-3'-ketoglucopyranoside (IV) in the presence of skin washing compared to buffer alone is less pronounced, but undergoes complete release of phenol after 60 h in the former case, but a small quantity of conjugate remained in the latter.

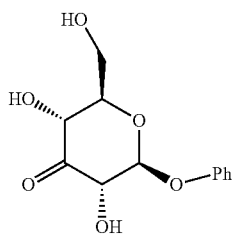

(IV)

These data on these model compounds clearly demonstrated that alcohol release is significantly much higher in the presence and absence of skin at 37° C. and neutral pH. Also, many of the compounds were stable in water alone and partially stable at pH 5.7.

Surprisingly, compound (V), geranyl-O-β-D-3'-ketoglucoside, which contains a primary allylic alcohol in the p-configuration, was degraded significantly faster than compound (III), methyl-O-α-D-3'-ketoglucoside, being approximately 50% degraded after 3 days. The rate of release can be further tuned by modulation of the sugar. For example, surprisingly, geraniol can be released at a faster rate by use of the 3'-ketoglycoside of N-Ac-glucosamine or 2'-deoxyglucose in place of glucose.

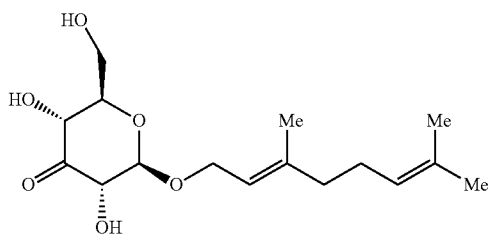

(V)

Furthermore, the extent of conversion was concentration independent, with a 5 mg/mL or 20 mg/mL mixture providing similar conversions. In the latter case, on opening the stoppered reaction vessel after 3 d, a very pungent aroma of geraniol was immediately noticeable that was not present using the corresponding glucoside: geranyl-O-β-D-glucopyranoside.

Formulations containing one or more compounds of formula (I) can be applied to skin, hair, plants, and even to stored crop and grains, alone or in combination with, for example, microbial crop spays.

In the following examples, specific features of the compounds of the invention and comparative examples are shown.

EXAMPLES $^1$H- and $^{13}$C NMR spectra were obtained on a Varian Mercury 300 (300 MHz), Varian Mercury 400 (400.1 Mz for $^1$H and 100.6 MHz for $^{13}$C) or Bruker AVIII-500 (PA-BBO probe) (500 MHz) in deuterated chloroform, deuterated water, deuterated methanol or deuterated dimethylsulfoxide. Chemical shifts (d) were reported in parts per million (ppm) with reference to tetramethylsilane (TMS) as internal standard and coupling constants (J) were reported in Hertz (Hz). The following abbreviations were used for the $^1$H multiplicities: singlet (s), doublet (d), triplet (t), quartet (q), quintet (quint), septet (sept.), double doublet (dd), triple doublet (td), multiplet (m), broad singlet (brs), broad doublet (brd) and broad triplet (brt). High resolution mass spectra were acquired using an LC/MSD-TOF Mass Spectrometry Instrument (Agilent Technologies) or a Bruker micrOTOF-mass spectrometer.

Reaction courses and product mixtures were monitored by thin-layer chromatography (TLC) on commercial silica gel 60 plates or by $^1$H NMR using the above instruments. For chromatography, column grade silica gel (0.040-0.063 mm mesh size) was employed. Chemicals were purchased from Sigma-Aldrich (Merck) or Cymit Quimica unless otherwise stated.

Racemic cis-/trans-para-menthane-3,8-diol (PMD) of about 95% purity was purchased from Boc Sciences and the cis- and trans-isomers (about a 6:4 mixture) separated by column chromatography over silica using 1:3 ethyl acetate/hexane. The faster running cis-isomer was identical by $^1$H NMR to authentic (1S,2R,5R)-2-(1-hydroxy-1-methylethyl)-5-methylcyclohexanol purchased from Sigma-Aldrich (Merck).

Crude, lyophilised cell free extract (CFE) of the glycosyltransferase (YjiC) from *Bacillus licheniformis* DSM 13 was prepared by Prozomix Ltd from plasmid DNA using standard molecular biology techniques adapted from Bashyal et al., ACS Omega, 2019, 4, 9367-9375: codon optimised gene sequence (GenBank sequence accession no. AAU40842) with an N-terminal IMAC tag, pET28a vector, *E. coli* BL21 (DE3), TB media.

Lipase enzymes were purchased as a kit from Enzagen Ltd.

The non-IUPAC-based numbering used in the compounds prepared in the examples is for better understanding of spectral data.

Example 1: Preparation of (2R,3S,6R)-2-(((E)-3,7-dimethylocta-2,6-dien-1-yl)oxy)-3,5-dihydroxy-6-(hydroxymethyl)tetrahydro-4H-pyran-4-one (geranyl-O-β-D-3'-ketoglucopyranoside)

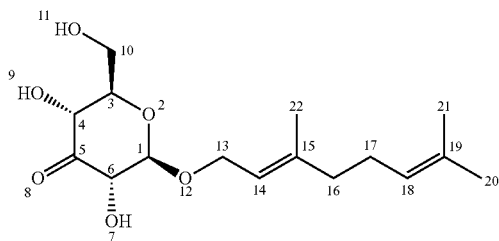

Geranyl-O-β-D-glucopyranoside (available from the company Carbosynth) (0.33 g, 1 mmol) and para-benzoquinone (0.34 g, 3 mmol) was suspended in acetonitrile (6.4 mL) and water (0.64 mL) and rapidly stirred at room temperature.

[(2,9-Dimethyl-1,10-phenanthroline)Pd(μ-OAc)]$_2$(OTf)$_2$ (0.025 g, 2.5 mol %) was added and stirring continued for 24 h after which all starting material had been converted to product based on TLC analysis on silica gel using 1:5 MeOH/dichloromethane as eluent and plate development using 10% concentrated sulfuric acid in ethanol followed by strong heating.

The mixture was concentrated by distillation under reduced pressure and purified by chromatography over silica using 3:1 ethyl acetate/hexanes as eluent to remove non-polar UV active impurities followed by 3:1 ethyl acetate/hexanes to afford the title compound as a clear colourless oil, 0.186 g (56% yield).

The obtained title compound was characterized by the following parameters:

$R_f$=0.46 (1:5 MeOH/dichloromethane);

$^1$H-NMR (400 MHz, CDCl$_3$): 1.57 (s, 3H), 1.65 (s, 6H), 1.97-2.11 (m, 4H), 3.30 (dt, J=10.0, 2.9 Hz, 1H), 3.89 (dd, J=12.2, 2.9, 1H), 3.98 (dd, J=12.2, 2.9, 1H), 4.22-4.30 (m, 2H), 4.33-4.44 (m, 3H), 5.01-5.08 (m, 1H) and 5.35 (t, J=6.8, 1H).

$^{13}$C-NMR (100.6 MHz, CDCl$_3$): 16.3, 17.6, 25.6, 26.2, 39.5, 61.7, 66.1, 72.1, 76.3, 76.7, 103.0, 119.1, 123.7, 131.7, 142.1, 206.5.

HRMS (ESI+). Calculated for [C$_{16}$H$_{26}$O$_6$+NH$_4$]$^+$ 332.2068. Found 332.2073.

Example 2: Preparation of sec-butyl 2-(2-(((2R,3S,5R,6R)-3,5-dihydroxy-6-(hydroxymethyl)-4-oxotetrahydro-2H-pyran-2-yl)oxy)ethyl) piperidine-1-carboxylate (picaridin-O-β-D-3'-ketoglucopyranoside)

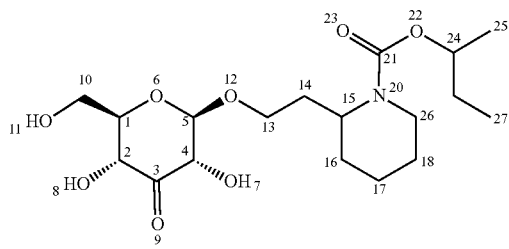

To a stirred solution of commercial glucose pentaacetate (60.0 g, 0.154 mol) in DMF (120 mL) at room temperature was added H$_2$N—NH$_2$·AcOH (20.2 g, 0.200 mol, 1.3 eq.) and the reaction mixture was vigorously stirred 2 h. TLC indicated complete consumption of starting material. The mixture was diluted with water (1 L) and extracted with AcOEt (10×100 mL). The organic phases were washed with water (4×50 mL), dried over anhydrous Na$_2$SO$_4$ and filtered. Then the solvent was removed to give the 2,3,4,6-tetra-O-acetyl-D-glucopyranose (47.7 g, 0.137 mol, 89%) as a pale-yellow oil.

To a stirred solution of the crude 2,3,4,6-tetra-O-acetyl-D-glucopyranose (7.42 g, 21.36 mmol) in dry dichloromethane (150 mL) at room temp. were added trichloroacetonitrile (6.5 mL, 64.1 mmol, 3.0 eq.) and anhydrous potassium carbonate (15.0 g, 107 mmol, 5.0 eq.). The reaction mixture was stirred for 3 h at room temp. The reaction mixture was filtered over Celite® and volatiles removed to give 2',3',4',6'-tetra-O-acetyl-D-glucopyranosyl trichloroacetimidate (10.06 g, 20.46 mmol, 96%) as a light-yellow solid. Data for this compound is available in Ikeuchi et al., Synlett., 2019, 30, 1308-1312.

To a solution of the crude 2',3',4',6'-tetra-O-acetyl-D-glucopyranosyl trichloroacetimidate (0.4 g, 0.81 mmol) in anhydrous CH$_2$Cl$_2$ (8 mL) at −78° C., racemic picaridin (0.18 g, 0.81 mmol) was added. After 5 minutes, TMSOTf (0.081 mmol) was added, and the resulting solution was stirred to 0° C. for 2 h. After that, TLC indicated the consumption of the starting material (EtOAc/Hexane, 1:1). The solvent was evaporated in vacuo, giving a residue that was subjected to silica gel chromatography (EtOAc/Hexane, 1:4 to 1:1) to give 178 mg (40% yield) of the tetraacetylated picaridin-β-glucoside.

The obtained tetraacetylated compound was characterized by the following parameters:

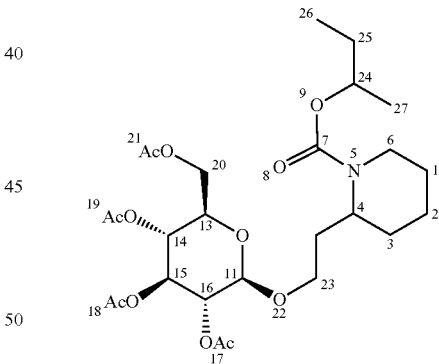

$^1$H NMR (500 MHz, CDCl$_3$) 0.94 (m, 3H), 1.27 (m, 4H), 1.64 (m, 9H), 2.08 (m, 12H), 2.84 (m, 1H), 3.53 (m, 1H), 3.70 (m, 2H), 3.92 (m, 1H), 4.15 (m, 2H), 4.25 (ddt, J=1.4, 4.7, 12.3, 1H), 4.47 (dd, J=8.0, 15.0, 1H), 4.79 (m, 1H), 4.96 (ddd, J=3.4, 8.0, 9.6, 1H), 5.06 (td, J=2.0, 9.8, 1H) and 5.18 (td, J=5.1, 9.5, 1H).

$^{13}$C NMR (500 MHz, CDCl$_3$) 9.80, 9.86, 19.06, 19.86, 20.68, 20.76, 20.81, 25.58, 28.64, 29.16, 30.00, 39.09, 48.04, 48.19, 62.01, 68.05, 68.43, 71.37, 71.83, 72.96, 100.91, 155.59, 169.39, 169.51, 170.37 and 170.77.

HRMS (ESI$^+$): Calculated for [C$_{26}$H$_{41}$NO$_{12}$+H]$^+$= 560.2705. found 560.2702.

To a solution of the tetraacetylated picaridin-β-glucoside (0.170 g, 0.308 mmol) in methanol (5 mL) NaOMe (25% in methanol) (10 µL) was added, and the resulting solution was stirred at room temperature for 3 h. After that, TLC indicated the consumption of the starting material (EtOAc). The reaction was quenched with amberlite (acid form) and then filtered. The solvent was evaporated in vacuo, giving a residue that was subjected to silica gel chromatography (EtOAc) to give 96 mg (81% yield) of unprotected picaridin-β-glucoside.

The obtained deacetylated compound was characterized by the following parameters:

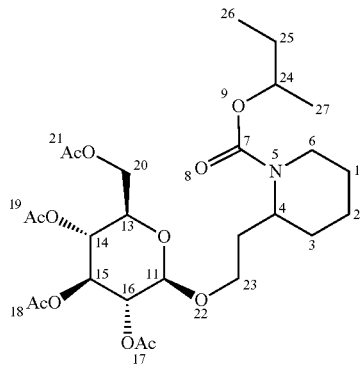 [SMILES: CCC(C)OC(=O)N1CCCCC1CCO[C@@H]1O[C@H](COC(C)=O)[C@@H](OC(C)=O)[C@H](OC(C)=O)[C@H]1OC(C)=O]

$^1$H NMR (500 MHz, D$_4$-MeOH) 0.89-0.98 (m, 3H), 1.21-1.29 (m, 3H), 1.41 (m, 1H), 1.56-1.70 (m, 7H), 1.81 (m, 1H), 2.07-2.16 (m, 1H), 2.94, tt, J=3.2, 13.6, 1H), 3.19 (ddd, J=3.4, 7.8, 9.2, 1H), 3.24-3.30 (m, 2H), 3.37 (d, J=2.0, 2H), 3.68 (dd, J=5.3, 11.9, 1H), 3.83-3.89 (m, 1H), 3.89-3.94 (m, 1H), 3.97-4.04 (m, 1H), 4.24 (dd, J=5.4, 7.9, 1H), 4.47 (d, J=30.2, 1H) and 4.68-4.76 (m, 1H).

$^{13}$C NMR (500 MHz, D$_4$-MeOH) 10.04, 10.10, 19.95, 20.14, 26.72, 29.65, 30.02, 30.06, 30.61, 40.04, 62.67, 67.96, 71.49, 74.59, 74.97, 77.80, 104.16 and 157.31.

HRMS (ESI$^+$): Calculated for $[C_{18}H_{33}NO_8+H]^+$= 392.2279. found 392.2279.

To a stirred solution of unprotected picaridin-β-glucoside (50 mg, 0.128 mmol) in MeCN/H$_2$O 9:1 (1.0 mL) was added benzoquinone (14 mg, 0.383 mmol, 3.0 eq.) and [(2,9-Dimethyl-1,10-phenanthroline)Pd(µ-OAc)]$_2$(OTf)$_2$ (7 mg, 0.006 mmol, 0.05 eq.) The reaction mixture was heated 1 h at 60° C. and absorbed on silica. The residue was purified by flash column chromatography on silica gel (EtOAc/hexanes 7:3) to give the diastereomeric title compound as a white foam (36 mg, 0.092 mmol, 72%).

The obtained title compound was characterized by the following parameters:

$^1$H-NMR (CDCl$_3$, 400.1 MHz): 0.88 (m, 3H), 1.18 (d, J=6.2, 3H), 1.31-1.78 (m, 7H), 2.02-2.16 (m, 1H), 2.67-2.93 (m, 2H), 3.27 (ddd, J=10.0, 4.5, 2.8, 1H), 3.17-3.76 (m, 2H), 3.87 (ddd, J=12.3, 4.6, 2.2, 1H), 3.93-4.00 (m, 2H), 4.00 (dd, J=12.1, 2.7, 1H), 4.17-4.38 (m, 3H), 4.46-4.78 (m, 2H).

$^{13}$C-NMR (CDCl$_3$, 100.6 MHz): 9.74 (CH3), 19.2 (CH2), 19.9 (CH3), 25.8 (CH2), 29.1 (CH2), 29.2 (CH2), 39.1 (CH2), 39.2 (CH2), 47.9 (CH), 62.1 (CH2), 67.7 (CH2), 72.6 (CH), 73.4 (CH), 76.8 (CH), 77.0 (CH), 104.8 (CH), 156.2 (C), 206.0 (C).

HRMS (ESI+): Calculated for $[C_{18}H_{31}NO_8+H]^+$ =390.2122. found 390.2134.

Example 3: Preparation of (2R,3S,4R)-6-(((E)-3,7-dimethylocta-2,6-dien-1-yl)oxy)-2-(hydroxymethyl)tetrahydro-2H-pyran-3,4-diol (geranyl-O-D-2-deoxy-3'-ketoglucopyranoside)

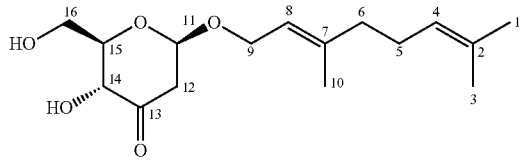 [SMILES: CC(C)=CCC/C(C)=C/CO[C@H]1CC(=O)[C@H](O)[C@@H](CO)O1]

To a stirred solution of 2-deoxy-D-glucose (1.0 g, 6.1 mmol, 1.0 equiv.) in anhydrous pyridine (12 mL) at 0° C. was added dropwise acetic anhydride (4.6 mL, 48.7 mmol, 8.0 equiv.). The reaction mixture was warmed slowly to room temperature then stirred for 15 h, whereby TLC analysis (hexanes/EtOAc, 7/3) indicated complete conversion of starting material to a less polar product (Rf=0.4). The reaction mixture was poured onto iced water (100 mL) and diluted with EtOAc (75 mL). The organic layer was separated, washed successively with 1.0 M HCl, saturated aqueous NaHCO$_3$ solution, water and brine (75 mL each). The aqueous layer was re-extracted with EtOAc (100 mL) and the combined organic layers dried (MgSO$_4$), filtered and concentrated under reduced pressure. The resultant oil was co-evaporated with toluene (3×20 mL) to afford 2-deoxy-1,3,4,6-tetra-O-acetyl-α/β-D-glucose as a white solid (2.02 g, 5.54 mmol, 100%). Data for this compound is available in Beswick et a., Carbohydrate Res., 2020, 488, 107896.

To a stirred solution of crude 2-deoxy-1,3,4,6-tetra-O-acetyl-α/β-D-glucose (2.01 g, 6.05 mmol) in anhydrous THF (75 mL) at 0° C. was added a methanolic ammonia saturated solution (25 mL) over 5 min. The reaction mixture was warmed slowly up to 40° C. and then stirred for 5 h, whereby TLC analysis (hexanes/EtOAc, 7:3) indicated complete conversion of starting material to a lower Rf spot (Rf=0.2). The reaction mixture was concentrated under reduced pressure, and the resultant orange oil was purified by flash column chromatography (hexanes/EtOAc 1:1) to afford 2-deoxy-3,4,6-tri-O-acetyl-α/β-D-glucose as a white solid (1.426 g, 4.916 mmol, 83%). $^1$H-NMR analysis shows a α/β mixture of 1:5. Data for this compound is available in Bucher et al., Angew. Chem. Int. Ed., 2010, 49, 8724-8728.

To a stirred solution of crude 2'-deoxy-3',4',6'-tri-O-acetyl-α/β-D-glucose (1.43 g, 4.93 mmol) in dry dichloromethane (60 mL) at 0° C. were added trichloroacetonitrile (4.9 mL, 49.3 mmol, 10 eq.) and DBU (74 µL, 0.493 mmol, 0.1 eq.). The reaction mixture was stirred overnight at room temperature and then and volatiles were removed to give crude 2'-deoxy-3',4',6'-tri-O-acetyl-α/β-D-glucopyranosyl trichloroacetimidate (2.14 g, 4.93 mmol, 100%) as an orange oil which is used without further purification. Data for this compound is available in Bucher et al., Angew. Chem. Int. Ed., 2010, 49, 8724-8728.

To a stirred solution of crude 2'-deoxy-3',4',6'-tri-O-acetyl-α/β-D-glucopyranosyl trichloroacetimidate (2.14 g, 4.93 mmol) and geraniol (2.57 mL, 14.85 mmol, 3.0 eq.) in dichloromethane (40 mL) was slowly added TMSOTf (16 µL, 88 µmol) at −78° C. The reaction mixture was gradually warmed to room temp. for the next 3 h and quenched with saturated aqueous solution of NaHCO$_3$ (10 mL), extracted with CH$_2$Cl$_2$ (2×50 mL), washed with 1M aqueous NaOH solution (20 mL), brine (50 mL), dried over Anhydrous Na$_2$SO$_4$ and filtered. After removal of solvent, the residue was purified by flash column chromatography on silica gel (hexanes/EtOAc 8:2) to give geranyl 3',4',6'-tri-O-acetyl-2'-deoxy-α/β-D-glucopyranoside (1.01 g, 2.37 mmol, 48%) as a yellowish oil (α/β mixture). One major isomer (R$_f$=0.25) was obtained.

The obtained triacetylated compound was characterized by the following parameters:

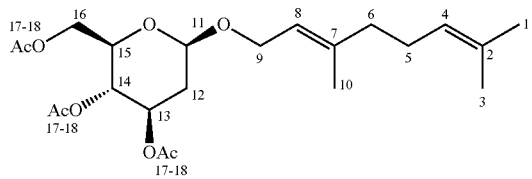

$^1$H-NMR (CDCl$_3$, 400 MHz): 1.60 (d, J=1.6, 3H, H3), 1.66 (d, J=1.6, 3H, H10), 1.68 (d, J=1.6, 3H, H1), 1.75 (ddd, J=12.6, 11.4, 9.8, 1H, H12), 2.01 (s, 3H, H17), 2.02 (s, 3H, H17), 2.07 (s, 3H, H17), 2.00-2.15 (m, 4H, H5+H6), 2.27 (ddd, J=12.6, 5.0, 2.0, 1H, H12), 3.57 (ddd, J=9.3, 5.1, 2.4, 1H, H15), 4.11 (dd, J=12.1, 2.4, 1H, H16), 4.19 (dd, J=11.8, 7.1, 1H, H9), 4.27 (ddd, J=11.8, 7.1, 0.8, 1H, H9), 4.27 (dd, J=12.1, 5.0, 1H, H16), 4.58 (dd, J=9.8, 2.0, 1H, H11), 5.01 (dd, J=9.3, 9.3, 1H, H14), 5.01 (ddd, J=9.3, 9.3, 5.0, 1H, H13), 5.10 (m, 1H, H4), 5.30 (tq, J=7.1, 1.6, 1H, H8).

$^{13}$C-NMR (100.6 MHz, CDCl$_3$): 16.4 (CH$_3$, C10), 17.8 (CH$_3$, C3), 20.9 (CH$_3$, C17), 20.9 (CH$_3$, C17), 21.0 (CH$_3$, C17), 25.8 (CH$_3$, C1), 26.4 (CH$_2$, C5), 36.3 (CH$_2$, C12), 39.7 (CH$_2$, C6), 62.7 (CH$_2$, C16), 65.2 (CH$_2$, C9), 69.4 (CH, C14), 70.9 (CH, C13), 72.1 (CH, C15), 97.7 (CH, C11), 119.4 (CH, C8), 123.9 (CH, C8), 131.9 (C, C2), 142.1 (C, C7), 169.9 (C, C18), 170.5 (C, C18), 170.9 (C, C18).

MS (ESI$^+$): Calculated for [C$_{22}$H$_{34}$O$_8$+NH$_4$]$^+$=444.2592. found 444.2579.

To a stirred solution of geranyl 3',4',6'-tri-O-acetyl-2'-deoxy-α/β-D-glucopyranoside (470 mg, 1.102 mmol) in dry methanol (10 mL) was added NaOMe (12 mg, 0.220 mmol, 0.2 eq.). The reaction mixture was stirred 3 h at room temp. and the reaction was quenched with 3 drops of AcOH. After removal of volatiles, the residue was purified by short flash column chromatography on silica gel (CH$_2$Cl$_2$/MeOH, 93:7) to give compound geranyl 2'-deoxy-β-D-glucopyranoside as a white solid (255 mg, 0.849 mmol, 77%).

The obtained deacetylated compound was characterized by the following parameters:

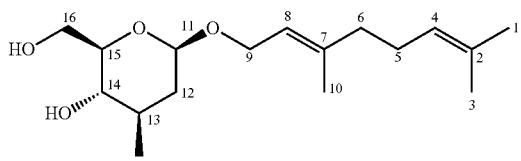

$^1$H-NMR (400 MHz, CDCl$_3$): 1.55-1.64 (m, 1H, H12), 1.57 (d, J=1.3, 3H, H3), 1.63 (d, J=1.3, 3H, H10), 1.65 (d, J=1.3, 3H, H1), 1.97-2.10 (m, 4H, H5+H6), 2.10-2.19 (m, 1H, H12), 3.15 (d, J=9.3, 1H, H15), 3.45 (dd, J=9.3, 9.3, 1H, H14), 3.53-3.66 (m, 1H, H13), 3.75-3.92 (m, 2H, H16), 4.12 (dd, J=12.0, 7.0, 1H, H9), 4.25 (dd, J=12.0, 7.0, 1H, H9), 4.52 (dd, J=9.7, 1.9, 1H, H11), 5.05 (t sept. J=6.8, 1.3, 1H, 1H).

$^{13}$C-NMR (100.6 MHz, CDCl$_3$): 16.4 (CH$_3$, C10), 17.7 (CH$_3$, C3), 25.7 (CH$_3$, C1), 26.3 (CH$_2$, C5), 38.8 (CH$_2$, C12), 39.6 (CH$_2$, C6), 61.6 (CH$_2$, C16), 65.3 (CH$_2$, C9), 71.4 (2×CH, C13+C14), 75.7 (CH, C15), 98.6 (CH, C11), 119.7 (CH, C8), 123.8 (CH, C8), 123.8 (CH, C4), 131.6 (C, C2), 141.3 (C, C7).

HRMS (ESI+) Calculated for [C$_{16}$H$_{28}$O$_5$+Na]$^+$=323.1829. Found 323.1824.

To a stirred solution of geranyl 2'-deoxy-β-D-glucopyranoside (124 mg, 0.413 mmol) in MeCN/H$_2$O 9:1 (4 mL) was added benzoquinone (134 mg, 1.239 mmol, 3.0 eq.) and [(2,9-Dimethyl-1,10-phenanthroline)Pd(μ-OAc)]$_2$(OTf)$_2$ (22 mg, 0.021 mmol, 0.05 eq.). The reaction mixture was stirred for 6 h at room temp. and absorbed on silica gel. The residue was purified by flash column chromatography on silica gel (CH$_2$Cl$_2$/MeOH 95:5) to give the title compound as a white solid (67 mg, 0.225 mmol, 54%).

The obtained title compound was characterized by the following parameters:

$^1$H-NMR (400 MHz, CDCl$_3$): 1.59 (s, 3H, H3), 1.67 (s, 6H, H1+H10), 1.97-2.15 (m, 4H, H5+H6), 2.73 (dd, J=14.2, 9.1, 1H, H12), 2.82 (dd, J=14.2, 2.7, 1H, H12), 3.30 (ddd, J=10.1, 4.5, 3.1, 1H, H15), 3.55 (d, J=3.1, 1H, H14), 3.85-3.95 (m, 1H, H16), 3.98-4.05 (m, 1H, H16), 4.17 (br d, J=10.1, 1H, OH), 4.22 (dd, J=11.8, 7.9, 1H, H9), 4.35 (dd, J=11.8, 6.4, 1H, H9), 4.73 (dd, J=9.1, 2.7, 1H, H11), 5.06 (t sept, J=6.9, 1.5, 1H, H4), 5.31 (tq, J=6.4, 1.5, 1H, H8).

$^{13}$C-NMR (100.6 MHz, CDCl$_3$): 16.5 (CH$_3$, C10), 17.8 (CH$_3$, C3), 25.8 (CH$_3$, C1), 26.4 (CH$_2$, C5), 39.7 (CH$_2$, C6), 48.8 (CH$_2$, C12), 62.7 (CH$_2$, C16), 65.7 (CH$_2$, C9), 73.4 (CH, C14), 76.4 (CH, C15), 99.3 (CH, C11), 119.2 (CH, C8), 123.8 (CH, C4), 132.0 (C, C2), 142.4 (C, C7), 205.9 (CO, C13).

HRMS (ESI+): Calculated for [C$_{16}$H$_{26}$O$_5$+NH$_4$]$^+$=316.2118. found 316.2125.

Example 4: Preparation of N-((2R,3S,5R,6R)-2-(((E)-3,7-dimethylocta-2,6-dien-1-yl)oxy)-5-hydroxy-6-(hydroxymethyl)-4-oxotetrahydro-2H-pyran-3-yl)acetamide (geranyl-O-β-D-2'-acetamido-2'-deoxy-3'-ketoglucopyranoside)

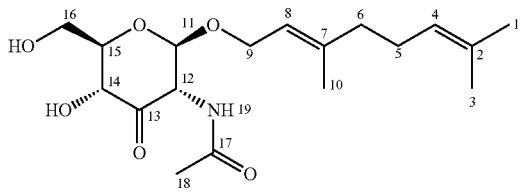

To a stirred solution of commercial 2-acetamido-1,3,4,6-tetra-O-acetyl-2-deoxy-D-glucopyranose (12.63 g, 32.44 mmol) in THF (60 mL) at room temp. was added piperazine (3.1 g, 35.68 mmol, 1.1 eq.) and the reaction mixture was vigorously stirred overnight. TLC indicated complete consumption of starting material (EtOAc; Rf=0.3). The mixture was diluted with EtOAc (400 mL) and washed with 0.5M aqueous solution of HCl (2×100 mL). Dried over anhydrous Na$_2$SO$_4$ and filtered. Then the solvent was removed to give 2-acetamido-3,4,6-tri-O-acetyl-2-deoxy-D-glucopyranose (7.58 g, 21.82 mmol, 67%) as a white foam that was used without further purification.

To a stirred solution of crude 2-acetamido-3,4,6-tri-O-acetyl-2-deoxy-D-glucopyranose (7.42 g, 21.36 mmol) in dry dichloromethane (150 mL) at room temp. were added trichloroacetonitrile (6.5 mL, 64.1 mmol, 3.0 eq.) and anhydrous potassium carbonate (15.0 g, 107 mmol, 5.0 eq.). The reaction mixture was stirred for 3 h at room temp. The reaction mixture was filtered over Celite® and volatiles removed to give crude 2'-acetamido-3',4',6'-tri-O-acetyl-2'-deoxy-D-glucopyranosyl trichloroacetimidate (10.06 g, 20.46 mmol, 96%) as a light yellow solid. Data for this compound is available in Zhang et al., J. Med. Chem., 2019, 62, 7857-7873.

To a stirred solution of compound crude 2'-acetamido-3',4',6'-tri-O-acetyl-2'-deoxy-D-glucopyranosyl trichloroacetimidate (432 mg, 0.879 mmol) and geraniol (0.456 mL, 2.636 mmol, 3.0 eq.) in dichloromethane (7 mL) was slowly added TMSOTf (16 μL, 88 μmol) at −20° C. The reaction mixture was stirred for 2 h at room temp. and quenched with saturated aqueous solution of NaHCO$_3$ (10 mL), extracted with CH$_2$Cl$_2$ (2×10 mL), washed with brine (10 mL), dried over anhydrous Na$_2$SO$_4$ and filtered. After removal of solvent, the residue was purified by flash column chromatography on silica gel (EtOAc) to give compound geranyl 3',4',6'-tri-O-acetyl-2'-deoxy-2'-acetamido-β-D-glucopyranoside (273 mg, 0.56 mmol, 65%) as a white solid.

The obtained compound was characterized by the following parameters:

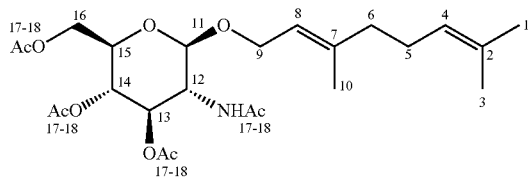

$^1$H-NMR (400 MHz, CDCl$_3$): 1.55 (s, 3H), 1.60 (s, 3H), 1.63 (s, 3H), 1.88 (s, 3H, H18), 1.97 (s, 3H, H18), 1.97 (s, 3H, H18), 2.02 (s, 3H, H18), 1.95-2.07 (m, 4H, H5+H6), 3.65 (ddd, J=10.0, 5.0, 2.5, 1H), 3.80 (dt, J=10.2, 8.6, 1H), 4.05-4.25 (m, 5H), 4.68 (d, J=8.4, 1H), 4.97-5.08 (m, 2H), 5.20-5.30 (m, 2H, H8), 5.83 (br s, 1H).

$^{13}$C-NMR (100.6 MHz, CDCl$_3$): 16.3, 17.7, 20.6, 20.6, 20.7, 23.2, 25.7, 26.3, 39.5, 54.7, 62.3, 65.1, 68.8, 71.7, 72.5, 98.9, 119.3, 123.7, 131.7, 141.9, 169.4, 170.2, 170.7, 170.8.

HRMS (ESI+): Calculated for [C$_{24}$H$_{37}$NO$_9$+H]$^+$= 484.2541. found 484.2539.

To a stirred solution of geranyl 3',4',6'-tri-O-acetyl-2'-deoxy-2'-acetamido-β-D-glucopyranoside (200 mg, 0.413 mmol) in dry methanol (4 mL) was added NaOMe (2.5 mg, 0.041 mmol, 0.1 eq.). The reaction mixture was stirred 3 h at room temp. and the reaction was quenched with 2 drops of AcOH. After removal of volatiles, the residue was purified by short flash column chromatography on silica gel (EtOAc/hexanes 1:1) to give compound geranyl 2'-deoxy-2'-acetamido-3-D-glucopyranoside as a white solid (148 mg, 0.413 mmol, 100%).

The obtained compound was characterized by the following parameters:

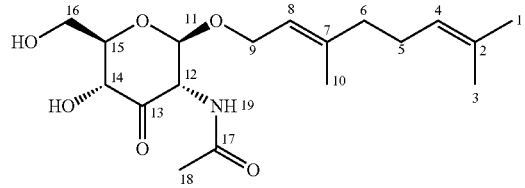

$^1$H-NMR (400 MHz, CD$_3$OD): 1.60 (s, 3H, H3), 1.66 (s, 6H, H1+H10), 1.96 (s, 3H, H18), 2.0-2.06 (m, 2H, H6), 2.06-2.15 (m, 2H, H5), 3.23 (ddd, J=9.7, 5.8, 2.3, 1H, H15), 3.30 (m, 1H, H14, 3.44 (dd, J=10.3, 8.5, 1H, H13), 3.61 (dd, J=10.3, 8.5, 1H, H12), 3.67 (dd, J=12.0, 5.8, 1H, H16), 3.87 (dd, J=12.0, 2.3, 1H, H16), 4.16 (dd, J=12.0, 6.2, 1H, H9), 4.28 (dd, J=12.0, 8.4, 1H, H9), 4.43 (d, J=8.4, 1H, H11), 5.09 (t sept, J=7.0, 1.5, 1H, H4), 5.28 (tq, J=6.2, 1.3, 1H, H8).

$^{13}$C-NMR (100.6 MHz, CD$_3$OD): 16.5 (CH$_3$, C10), 17.8 (CH$_3$, C3), 23.0 (CH$_3$, C18), 25.9 (CH, C1), 27.5 (CH$_2$, C5), 40.7 (CH$_2$, C6), 57.4 (CH, C12), 62.8 (CH$_2$, C16), 66.2 (CH$_2$, C9), 72.2 (CH, C13), 76.2 (CH, C14), 78.0 (CH, C15), 101.2 (CH, C11), 121.4 (CH, C8), 125.1 (CH, C4), 132.5 (C, C2), 142.0 (C, C7), 173.7 (C, C17).

HRMS (ESI$^+$) Calculated for [C$_{18}$H$_{31}$NO$_6$+Na]$^+$= 380.2044. Found 380.2048.

To a stirred solution of geranyl 2'-deoxy-2'-acetamido-β-D-glucopyranoside (50 mg, 0.140 mmol) in MeCN/H$_2$O 9:1 (1 mL) was added benzoquinone (45 mg, 0.420 mmol, 3.0 eq.) and [(2,9-Dimethyl-1,10-phenanthro-line)Pd(μ-OAc)]$_2$(OTf)$_2$ (7.5 mg, 0.007 mmol, 0.05 eq.) The reaction mixture was stirred 5 h at 50° C. and absorbed on silica gel. The residue was purified by flash column chromatography on silica gel (EtOAc/MeOH 98:2) to give the title compound as a white solid (22 mg, 0.062 mmol, 44%).

The obtained title compound was characterized by the following parameters:

$^1$H-NMR (400 MHz, CDCl$_3$): 1.58 (s, 3H, H3), 1.63 (s, 3H, H10), 1.66 (s, 3H, H1), 1.97-2.12 (m, 7H, H5+H6+H18), 3.39-3.53 (m, 1H, H15), 3.81-4.01 (m, 2H, H16), 4.14-4.26 (m, 1H, H9), 4.28-4.36 (m, 1H, H9), 4.42-4.55 (m, 1H, H14), 4.59-4.78 (m, 2H, H11+H12), 5.06 (t, J=6.5, 1H, H4), 5.26 (t, J=6.4, 1H, H8), 7.08 (br s, 1H, H19).

$^{13}$C-NMR (100.6 MHz, CDCl$_3$): 16.4 (CH$_3$, C10), 17.8 (CH$_3$, C3), 22.9 (CH$_3$, C18), 25.8 (CH$_3$, C1), 26.5 (CH$_3$, C5), 39.7 (CH$_2$, C6), 61.0 (CH, C12), 61.4 (CH$_2$, C16), 66.4 (CH$_2$, C9), 72.9 (CH, C14), 75.7 (CH, C15), 101.5 (CH, C11), 119.1 (CH, C8), 123.9 (CH, C4), 131.9 (CH, C2), 142.7 (C, C7), 172.1 (C, C17), 204.7 (C, C13).

HRMS (ESI$^+$) Calculated for [C$_{18}$H$_{31}$NO$_s$+Na]$^+$= 378.1887. Found 378.1885.

Example 5: Preparation of (2R,3R,5S,6R)-3,5-dihydroxy-2-(hydroxymethyl)-6-(((1S,2R,5R)-2-(2-hydroxypropan-2-yl)-5-methylcyclohexyl)-oxy)tetrahydro-4H-pyran-4-one (rac-cis-PMD-O-β-D-3'ketoglucose-pyranoside)

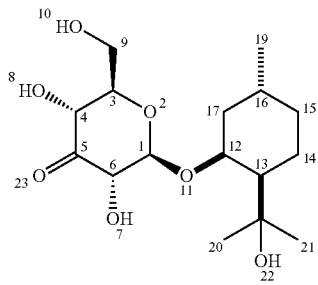

A mixture of cis-PMD (30 mg, 0.17 mmol), UDP-α-D-glucose disodium salt (100 mg, 0.16 mmol) and lyophilised crude cell free extract of the glycosyltransferase (YjiC) *Bacillus licheniformis* DSM 13 (100 mg) was diluted with 100 mM tris buffer, pH 7.4 (5 mL) and incubated at 30° C./80 rpm for 2 d. The resultant mixture was washed with hexanes (2×20 mL) then extracted into ethyl acetate (2×20 mL). The ethyl acetate portions were combined and concentrated by distillation under reduced pressure. To the residue was added para-benzoquinone (32 mg, 0.30 mmol) and [(2,9-Dimethyl-1,10-phenanthroline)Pd(μ-OAc)]$_2$(OTf)$_2$ (3 mg, approx. 2 mol %), the mixture suspended in acetonitrile (2 mL) and water (0.2 mL) and incubated at 25° C./80 rpm for 20 h. The solvent was removed by distillation under reduced pressure and the residue purified by chromatography over silica using 1:20 methanol/dichloromethane to afford the title compound as a clear colourless oil (10 mg, 17%).

The obtained title compound was characterized by the following parameters:

$^1$H-NMR (400 MHz, CDCl$_3$): 4.44 (d, J=8, 1H, H-1), 4.31 (m, 2H, H-4 and H12), 4.26 (dd, J=8 and 2, 1H, H-6), 4.02 (dd, J=12 and 3, 1H, 1×H-9), 3.90 (dd, J=12 and 5 Hz, 1H, 1×H-9), 3.37 (brs, 1H, OH), 3.33 (dd, J=10, 5 and 3, 1H, H-3), 2.12-1.50 (m, 8H, 1×H-13, 2×H-14, 2×H-15, 1×H-16 and 2×H-17), 1.25 (s, 6H, 3×H-20 and 3×H-21) and 0.89 (d, J=8, 3H, 3×H19).

$^{13}$C-NMR (100.6 MHz, CDCl$_3$): 21.9 (CH$_2$), 22.4 (CH$_3$), 28.5 (CH), 29.9 (2×CH$_3$), 34.9 (CH$_2$), 41.2 (CH$_2$), 50.0 (CH), 62.7 (CH$_2$), 72.4 (C), 72.7 (CH), 77.0 (CH), 77.4 (CH), 81.1 (CH), 106.5 (CH) and 205.6 (C).

HRMS (ESI$^+$): calculated for [C$_{16}$H$_{28}$O$_7$+Na]$^+$= 355.1727. found 355.1727.

Example 6: Preparation of (2R,3R,5S,6S)-3,5-dihydroxy-2-(hydroxymethyl)-6-((2-((S)-4-methylcyclohex-3-en-1-yl)propan-2-yl)oxy)tetrahydro-4H-pyran-4-one (S-alpha-terpineol-O-β-D-3'-ketoglucopyranoside)

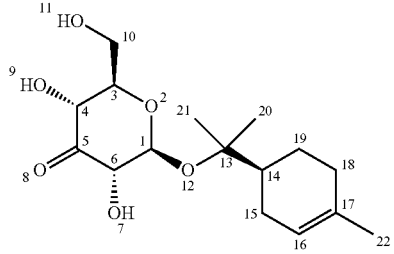 [SMILES: CC1=CC[C@@H](C(C)(C)O[C@@H]2O[C@H](CO)[C@@H](O)C(=O)[C@H]2O)CC1]

A mixture of (S)-α-terpineol (30 mg, 0.19 mmol), UDP-α-D-glucose disodium salt (100 mg, 0.16 mmol) and lyophilised crude cell free extract of the glycosyltransferase (YjiC) *Bacillus licheniformis* DSM 13 (100 mg) was diluted with 100 mM tris buffer, pH 7.4 (5 mL) and incubated at 30° C./80 rpm for 18 h. The resultant mixture was washed with hexanes (2×20 mL) then extracted into ethyl acetate (2×20 mL). The ethyl acetate portions were combined and concentrated by distillation under reduced pressure. To the residue was added para-benzoquinone (32 mg, 0.30 mmol) and [(2,9-Dimethyl-1,10-phenanthroline)Pd(μ-OAc)]$_2$(OTf)$_2$ (3 mg, approx. 2 mol %), the mixture suspended in acetonitrile (2 mL) and water (0.2 mL) and incubated at 25° C./80 rpm for 20 h. The solvent was removed by distillation under reduced pressure and the residue purified by chromatography over silica using 1:10 methanol/dichloromethane to afford the title compound as a clear colourless oil (27 mg, 44%).

The obtained title compound was characterized by the following parameters:

$^1$H-NMR (400 MHz, D$_4$-MeOH): 5.38 (d, J=3, 1H, H-16), 4.60 (d, J=8, 1H, H-1), 4.24 (dd, J=10 and 2, 1H, H-4), 4.08 (dd, J=8 and 2, 1H, H-6), 3.91 (dd, J=12 and 2, 1H, 1×H-10), 3.80 (dd, J=12 and 5, 1H, 1×H-10), 3.29 (ddd, J=10, 5 and 2, 1H, H-3), 2.15-1.65 (m, 6H), 1.30 (m, 1H), 1.65 (brs, 3H, 3×H-22), 1.27 (s, 3H, 3×H-20 or 21) and 1.22 (s, 3H, 3×H-20 or 21).

$^{13}$C-NMR (100.6 MHz, D$_4$-MeOH): 23.0 (CH$_3$), 23.6 (CH$_3$), 25.0 (CH$_2$), 25.1 (CH$_3$), 28.0 (CH$_2$), 32.1 (CH$_2$), 45.1 (CH), 62.7 (CH$_2$), 73.7 (CH), 77.7 (CH), 78.5 (CH), 81.8 (C), 100.2 (CH), 121.8 (CH), 134.8 (C) and 207.6 (C).

HRMS (ESI$^+$): calculated for [C$_{16}$H$_{26}$O$_e$+Na]$^+$= 337.1622. found 337.1611.

Example 7: Preparation of (2S,3S,5R,6R)-2-(4-allyl-2-methoxyphenoxy)-3,5-dihydroxy-6-(hydroxymethyl)tetrahydro-4H-pyran-4-one (Eugenyl-O-β-D-3'-ketoglucopyranoside)

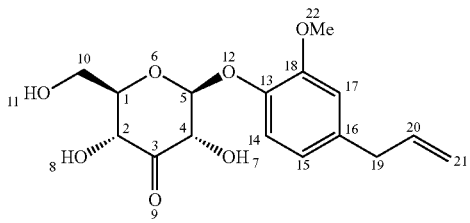

A solution of commercial 2,3,4,6-Tetra-O-acetyl-α-D-glucopyranosyl bromide (500 mg, 1.216 mmol) in acetone (4 mL) was added to a solution of eugenol (0.56 mL, 3.648 mmol, 3.0 eq.) in 1.0 M LiOH solution (2 mL) and the green suspension formed stirred for 2 h at room temp. The completion of reaction was monitored by TLC (EtOAc/hexanes 8:2; Rf=0.25). Acetone was removed and the resulting suspension was extracted with dichloromethane (3×15 mL). The crude product was washed with 10% sodium hydroxide (3×10 mL), water and dried by anhydrous $Na_2SO_4$. After filtration and removal of the solvent under reduced pressure, the crude product was purified by flash column chromatography, affording tetraacetylated eugenyl-α-glucoside (500 mg, 1.01 mmol, 83%) as a white solid.

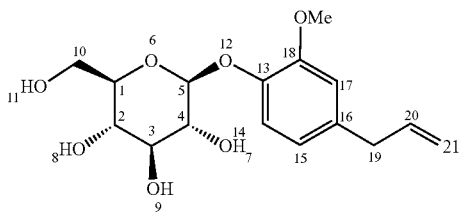

Data for this compound is available in Mulkens et al., J. Natural Prod., 1988, 51, 496-498.

To a stirred solution of protected eugenyl glucoside (330 mg, 0.666 mmol) in dry methanol (20 mL) was added NaOMe (7 mg, 0.133 mmol, 0.2 eq.). The reaction mixture was stirred 1 h at room temperature and the reaction was quenched with 2 drops of AcOH. After removal of volatiles, the residue was purified by short flash column chromatography on silica gel ($CH_2Cl_2$/MeOH, 9:1) to give eugenyl-β-glucoside as a white solid (172 mg, 0.527 mmol, 79%).

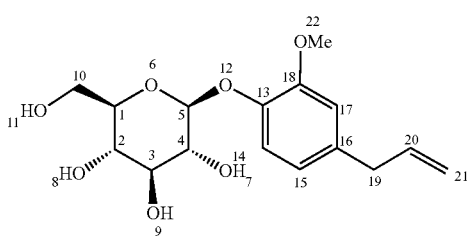 [SMILES: C=CCc1ccc(O[C@@H]2O[C@H](CO)[C@@H](O)[C@H](O)[C@H]2O)c(OC)c1]

Data for this compound is available in Vijayakumar et al., Biotechnol. Lett., 2007, 29, 575-584.

To a stirred solution of unprotected eugenyl glucoside (30 mg, 0.092 mmol) in MeCN/$H_2O$ 9:1 (1.5 mL) was added benzoquinone (30 mg, 0.276 mmol, 3.0 eq.) and [(2,9-Dimethyl-1,10-phenanthroline)Pd(μ-OAc)]$_2$(OTf)$_2$ (5 mg, 0.005 mmol, 0.05 eq.) The reaction mixture was heated 1 h at 60° C. and absorbed on silica. The residue was purified by flash column chromatography on silica gel ($CH_2Cl_2$/MeOH, 95:5) to give titled compound as a white solid (22 mg, 0.068 mmol, 74%).

The obtained title compound was characterized by the following parameters:

$^1$H-NMR (400.6 MHz, CDCl$_3$): 1.88 (dd, 6.7, 1.6, 2H, H3), 3.34-3.41 (m, 1H, H15), 3.72-3.77 (m, 1H), 3.89 (s, 3H, H10), 3.92 (dd, J=11.8, 4.2, 1H, H16), 4.06 (dd, J=11.8, 2.6, 1H, H16), 4.39 (d, J=9.5, 1H, H14), 4.55 (d, J=7.5, 1H, H12), 4.86 (d, J=7.5, 1H, H11), 6.17 (dd, J=15.3, 6.6, 1H, H1), 6.35 (dd, J=15.3, 1.6, 1H, H1), 6.86 (dd, J=8.3, 1.8, 1H, H9), 6.91 (d, J=1.8, 1H, H5), 7.05 (d, J=8.3, 1H, H8).

$^{13}$C-NMR (100.1 MHz, CDCl$_3$): 18.4 (CH2, C3), 56.0 (CH3, C10), 62.2 (CH2, C16), 72.3 (CH, C14), 76.9 (CH, C12), 77.1 (CH, C15), 104.7 (CH, C11), 110.0 (CH, C5), 118.6 (CH, C9), 120.0 (CH, C8), 125.9 ( ), 130.2 ( ), 135.4 (C, C4), 144.3 (C, C7), 150.4 (C, C6), 204.8 (C, C13).

HRMS (ESI$^+$): Calculated for [$C_{16}H_{20}O_7$+NH$_4$]$^+$= 342.1547. Found 342.1544.

Example 8: Preparation of (2R,3R,5S,6S)-3,5-dihydroxy-2-(hydroxymethyl)-6-(5-isopropyl-2-methylphenoxy)tetrahydro-4H-pyran-4-one (Carvacrol-O-β-D-3'-ketoglucopyranoside)

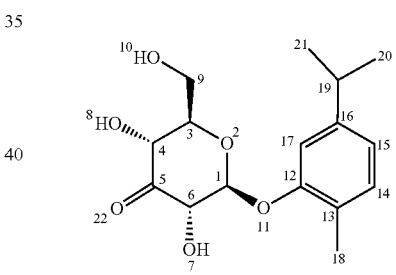

A mixture of carvacrol (30 mg, 0.20 mmol), UDP-α-D-glucose disodium salt (100 mg, 0.16 mmol) and lyophilised crude cell free extract of the glycosyltransferase (YjiC) *Bacillus licheniformis* DSM 13 (100 mg) was diluted with 100 mM tris buffer, pH 7.4 (5 mL) and incubated at 30° C./80 rpm for 18 h. The resultant mixture was washed with hexanes (2×20 mL) then extracted into ethyl acetate (2×20 mL). The ethyl acetate portions were combined and concentrated by distillation under reduced pressure. To the residue was added para-benzoquinone (32 mg, 0.30 mmol) and [(2,9-Dimethyl-1,10-phenanthroline)Pd(μ-OAc)]$_2$ (OTf)$_2$ (3 mg, approx. 2 mol %), the mixture suspended in acetonitrile (2 mL) and water (0.2 mL) and incubated at 25° C./80 rpm for 14 d. Reaction was not complete and so further [(2,9-Dimethyl-1,10-phenanthroline)Pd(μ-OAc)]$_2$ (OTf)$_2$ (3 mg, approx. 2 mol %) was added. After a further 2 d, reaction was almost complete and so the solvent was removed by distillation under reduced pressure and the residue purified by chromatography over silica using 1:10 methanol/dichloromethane to afford the title compound as a clear colourless oil (20 mg, 32%).

The obtained title compound was characterized by the following parameters:

$^1$H-NMR (400 MHz, D$_4$-MeOH) 6.99-7.08 (m, 2H), 6.85-6.77 (m, 1H), 4.96 (t, J=8, 1H, H-1), 4.45 (dd, J=8 and 2, 1H, H-6), 4.36 (dd, J=10 and 2, 1H, H-4), 3.99 (dd, J=12 and 2, 1H, 1×H-9), 3.85 (dd, J=12 and 5, 1H, 1×H-9), 3.50 (ddd, J=10, 5 and 2, 1H, H-3), 2.86 (qq, J=7, 1H, H-19), 2.26 (s, 1H, 3×H-18), 1.24 (dd, J=7 and 2, 3H, 3×H-20 or H-21) and 1.23 (dd, J=7 and 2, 3H, 3×H-20 or H-21).

$^{13}$C-NMR (100.6 MHz, D$_4$-MeOH) 16.04 (CH$_3$), 24.4 (CH$_3$), 24.5 (CH$_3$), 35.2 (CH), 62.5 (CH$_2$), 73.7 (CH), 78.2 (CH), 78.4 (CH), 104.4 (CH), 115.0 (CH), 121.7 (CH), 126.4 (C), 131.5 (CH), 149.2 (C), 156.9 (C) and 206.9 (C).

HRMS (ESI$^+$): calculated for [C$_{16}$H$_{22}$O$_6$+NH$_4$]$^+$= 328.1755. found 328.1752.

Example 9: Preparation of ((2R,3R,5S,6R)-5-acetoxy-6-(((E)-3,7-dimethylocta-2,6-dien-1-yl)oxy)-3-hydroxy-4-oxotetrahydro-2H-pyran-2-yl)methyl acetate (2',6'-Diacetyl-geranyl-O-β-D-3'-ketoglucopyranoside)

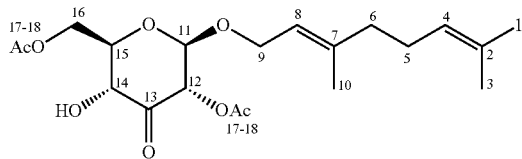

A mixture of geranyl-@-3'-ketoglucoside (100 mg), prepared as in Example 1 and lipase from *Pseudomonas cepacia* (ENZA-05) (50 mg) was suspended in vinyl acetate (5 mL) and incubated at 32° C./80 rpm. After 5 d, the mixture was filtered through a plug of celite and concentrated by distillation under reduced pressure to afford the title compound as a light yellow solid (0.118 g, 63%).

The obtained title compound was characterized by the following parameters:

$^1$H-NMR (400 MHz, CDCl$_3$) 1.53 (d, J=1.1, 3H, H3), 1.60 (d, J=1.1, 3H, H1), 1.62 (d, J=1.1, 3H, H10), 1.96-2.07 (m, 4H, H5+H6), 2.05 (s, 3H, H17), 2.13 (s, 3H, H17), 3.36 (ddd, J=10.2, 5.5, 2.2, 1H, H15), 4.19 (dd, J=10.2, 1.6, 1H, H14), 4.23-4.27 (m, 2H, H9), 4.28 (dd, J=12.1, 5.5, 1H, H16), 4.48 (dd, J=12.1, 2.2, 1H, H16), 4.58 (d, J=8.1, 1H, H11), 5.00 (t sept, J=7.0, 1.1, 1H, H4), 5.17 (dd, J=8.1, 1.6, 1H, H12), 5.25 (tq, J=7.1, 1.2, 1H, H8).

$^{13}$C-NMR (100.6 MHz, CDCl$_3$) 16.4 (CH$_3$, C10), 17.8 (CH$_3$, C3), 20.5 (CH$_3$, C17), 20.9 (CH$_3$, C17), 25.8 (CH$_3$, C1), 26.3 (CH$_2$, C5), 39.6 (CH$_2$, C6), 63.2 (CH$_2$, C16), 65.6 (CH$_2$, C9), 73.1 (CH, C14), 74.5 (CH, C15), 76.9 (CH, C12), 99.9 (CH, C11), 118.8 (CH, C18), 123.7 (CH, C4), 132.0 (C, C2), 143.1 (C, C7), 169.4 (C, C18), 170.8 (C, C18), 200.6 (C, C13).

HRMS (ESI$^+$): calculated for [C$_{26}$H$_{30}$O$_8$+NH$_4$]$^+$= 416.2279. found 416.2276.

Example 10: Preparation of ((2R,3R,5S,6S)-5-acetoxy-3-hydroxy-4-oxo-6-phenoxytetrahydro-2H-pyran-2-yl)methyl acetate (2',6'-diacetyl-phenyl-O-β-D-3'-ketoglucopyranoside)

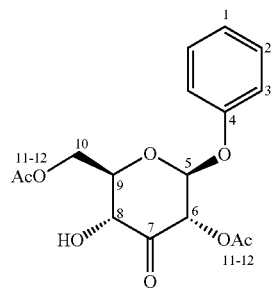 [SMILES: CC(=O)OC[C@H]1O[C@@H](Oc2ccccc2)[C@H](OC(C)=O)C(=O)[C@@H]1O]

Phenyl-O-β-D-3'-ketoglucopyranoside (prepared as shown in Comparative Example 1) was used to prepare the title compound following a substantially analogous process of Example 11.

The obtained title compound was characterized by the following parameters:

$^1$H-NMR (400 MHz, CDCl$_3$): 2.11 (s, 3H, H11), 2.22 (s, 3H, H11), 3.64 (ddd, J=10.2, 5.9, 2.3, 1H, H9), 4.34 (dd, J=10.2, 1.6, 1H, H8), 4.41 (dd, J=12.1, 5.9, 1H, H10), 4.55 (dd, J=12.1, 2.3, 1H, H10), 5.19 (d, J=8.0, 1H, H5), 5.52 (dd, J=8.0, 1.6, 1H, H6), 7.04 (dd, J=8.7, 1.0, 2H, H3), 7.11 (tt, J=7.4, 1.0, 1H, H1), 7.32 (dd, J=8.6, 7.4, 2H, H2).

$^{13}$C-NMR (100.6 MHz, CDCl$_3$): 20.5 (CH3, C11), 20.9 (CH3, C11), 63.2 (CH2, C10), 73.2 (CH, C8), 74.7 (CH, C9), 77.6 (CH, C6), 100.2 (CH, C5), 117.3 (CH, C3), 123.9 (CH, C1), 129.8 (CH, C2), 156.7 (C, C4), 169.4 (C, C12), 170.7 (C, C12), 199.9 (C, C7).

HRMS (ESI$^+$): calculated for [C$_{16}$H$_{18}$O$_8$+NH$_4$]$^+$= 356.1340. found 356.1341.

Example 11: Preparation of ((2R,3R,5S,6S)-3,5-dihydroxy-4-oxo-6-phenoxytetrahydro-2H-pyran-2-yl)methyl hydrogen sulfate pyridinium salt (phenyl-O-β-D-3'-keto-6'-sulphatoglucopyranoside pyridinium salt

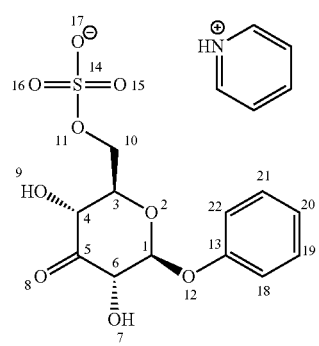

To a stirred solution of phenyl-O-β-D-3'-ketoglucopyranoside (prepared as shown in Comparative Example 1) (10 mg, 0.039 mmol) in D6-DMSO (0.7 mL) was added SO3·py (19 mg, 3 equiv.). After stirring 15 min at room temperature the solution was analysed by TLC which showed complete conversion to a single much more polar compound.

Without further treatment, the obtained title compound was characterized by the following parameters:

$^1$H-NMR (DMSO-De, 400.1 MHz): 3.72 (ddd, J=10.2, 5.9, 1.7, 1H, H9), 3.89 (dd, J=11.1, 5.9, 1H, H10), 4.11 (dd, J=11.1, 1.7, 1H, H10), 4.12 (dd, J=10.2, 1.7, 1H, H8), 4.27 (dd, J=7.9, 1.7, 1H, H6), 5.02 (d, J=7.9, 1H, H5), 7.00 (t, J=7.4, 1H, H1), 7.04 (d, J=7.7, 2H, H3), 7.27 (dd, J=7.7, 7.4, 2H, H2), 8.07 (dd, J=7.9, 7.3, 2H, py), 8.59 (tt, J=7.9, 1.6, 1H, py), 8.92 (dd, J=7.3, 1.6, 2H, py).

$^{13}$C-NMR (DMSO-D$_6$, 100.6 MHz): 65.9 (CH2, C10), 72.8 (CH, C8), 74.8 (CH, C9), 77.8 (CH, C6), 101.4 (CH, C5), 116.7 (CH, C3), 122.7 (CH, C1), 127.7 (CH, py), 129.9 (CH, C2), 142.8 (CH, py), 146.7 (CH, py), 157.4 (C, C4), 205.6 (CO, C7).

HRMS (ESI–): Calculated for $[C_{12}H_{14}O_9S-H]^-$= 333.0286. found 333.0280.

Example 12: Preparation of (2R,3S,6R)-2-(((E)-3,7-dimethylocta-2,6-dien-1-yl)oxy)-3,5-dihydroxy-6-(hydroxymethyl)tetrahydro-4H-pyran-4-one (rac-menthyl-O-β-D-3'ketoglucopyranoside)

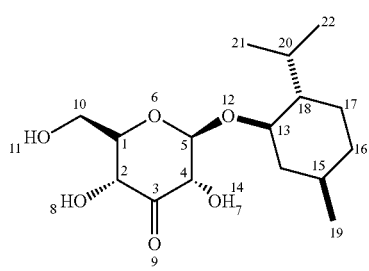

To a solution of 2',3',4',6'-tetra-O-acetyl-D-glucopyranosyl trichloroacetimidate (0.4 g, 0.81 mmol), prepared as shown in Example 2, in anhydrous $CH_2CO_2$ (8 mL) at 0° C., (+/−)-menthol (0.12 g, 0.81 mmol) was added. After 5 minutes, TMSOTf (0.081 mmol) was added, and the resulting solution was stirred to 0° C. for 2 h. After that, TLC indicated the consumption of the starting material (EtOAc/Hexane 1:2 r.f.=0.6). The solvent was evaporated in vacuo, giving a residue that was subjected to silica gel chromatography (EtOAc/Hexane 1:4 to 1:1 Rf=0.7) to give 200 mg of the crude tetraacetylated menthyl-R-glucoside.

To a solution of the crude tetraacetylated menthyl-β-glucoside (0.200 g, 0.412 mmol) in methanol (5 mL) NaOMe (25% in methanol) (20 µL) was added, and the resulting solution was stirred at room temperature for 3 h. After that, TLC indicated the consumption of the starting material (EtOAc, Rf=0.9). The reaction was quenched with amberlite (acid form) and then filtered. The solvent was evaporated in vacuo, giving a residue that was subjected to silica gel chromatography (EtOAc Rf=0.1) to give 50 mg (20% global yield from the 2',3',4',6'-tetra-O-acetyl-D-glucopyranosyl trichloroacetimidate over two steps) of menthyl-β-glucopyranoside. Data for this compound is available in Choi et al., AMB Expr., 2017, 7, 167.

A mixture of menthyl-β-glucopyranoside (72 mg, 0.23 mmol) para-benzoquinone (74 mg, 0.68 mmol, 3 eq.) and catalyst, [(2,9-Dimethyl-1,10-phenanthroline)Pd(µ-OAc)]$_2$(OTf)$_2$ (6 mg, approx. 2.5 mol %) was suspended in acetonitrile (6 mL) and water (0.6 mL) and stirred at room temp. for 19 h. Analysis by TLC (MeOH/dichloromethane, 1:5) displayed the formation of a new spot at Rf=0.7, but mainly starting material (Rf=0.5). Further catalyst (15 mg, approx. 6.25 mol %) was added and the mixture stirred for a further 4 d. Reaction had progressed further but was still incomplete and so further catalyst (15 mg, approx. 6.25 mol %) added and the mixture stirred for a further 6 d. No starting material remained and so the mixture was concentrated by distillation under reduced pressure and the residue purified by chromatography over silica using 1:20 methanol/dichloromethane to afford the diastereomeric title compound as a clear colourless oil (10 mg, 17%).

The obtained title compound was characterized by the following parameters:

$^1$H-NMR (400 MHz, D$_4$-MeOH): 4.44 (d, J=8, 1H), 4.44 (d, J=8, 1H), 4.35 (m, 1H), 4.33 (m, 1H), 4.24 (d, J=8, 1H), 4.20 (d, J=8, 1H), 4.03 (m, 2H), 3.90 (m, 2H), 3.52 (ddd, J=11, 11 and 4, 1H), 3.45 (ddd, J=11, 11 and 4, 1H), 3.30 (m, 4H), 2.32 (m, 2H), 2.12 (m, 2H), 2.02 (d, J=m, 2H), 1.66 (m, 4H), 1.35 (m, 4H), 1.00 (m, 2H), 0.93 (m, 6H), 0.91 (m, 6H), 0.81 (d, J=7, 3H), 0.77 (d, J=7, 3H).

HRMS (ESI$^+$): calculated for $[C_{16}H_{28}O_6+NH_4]^+$= 334.2224. found 334.2230.

Comparative Example 1: Preparation of (2R,5S,6S)-3,5-dihydroxy-2-(hydroxymethyl)-6-phenoxytetrahydro-4H-pyran-4-one (phenyl-O-β-D-3'-ketoglucopyranoside)

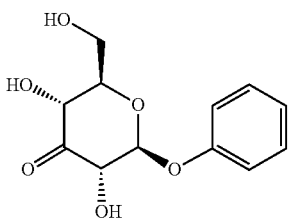 [SMILES: O=C1[C@@H](O)[C@H](Oc2ccccc2)O[C@H](CO)[C@H]1O]

Phenyl-O-β-D-glucopyranoside (available from the company Sigma-Aldrich) (0.3 g, 1.2 mmol) and para-benzoquinone (0.38 g, 3.5 mmol) was suspended in acetonitrile (6.4 mL) and water (0.64 mL) and rapidly stirred at room temperature.

[(2,9-Dimethyl-1,10-phenanthroline)Pd(µ-OAc)]$_2$(OTf)$_2$ (0.03 g, 2.5 mol %) was added and stirring continued for 18 h after which almost all starting material had been converted to product based on TLC analysis on silica gel using 1:5 MeOH/dichloromethane as eluent and plate development using 10% concentrated sulfuric acid in ethanol followed by strong heating. The mixture was concentrated by distillation under reduced pressure and purified by chromatography over silica using 3:1 ethyl acetate/hexanes as eluent to remove non-polar UV active impurities followed by 3:1 ethyl acetate/hexanes to afford the title compound as a clear colourless oil, 0.186 g (52% yield).

The obtained title compound was characterized by the following parameters:

Rf=0.5 (1:5 MeOH/dichloromethane);

$^1$H-NMR (400 MHz, DMSO-d6): 3.49 (dd, J=9.9, 4.5, 1H), 3.60 (m, 1H), 3.75 (dd, J=11.8, 4.5, 1H), 4.18 (dd, J=9.9, 5.6, 1H), 4.27 (m, 1H), 4.89 (br t, J=4.5, 1H), 5.04 (d, J=7.9, 1H), 5.48 (d, J=5.6, 1H), 5.70 (d, J=6.1, 1H), 6.98-7.09 (m, 3H), 7.31 (t, J=7.7, 2H).

$^{13}$C-NMR (100.6 MHz, DMSO-d6): δ0.6, 72.1, 76.4, 76.7, 101.1, 116.3, 122.3, 129.6, 157.0, 205.9.

HRMS (ESI+). Calculated for $[C_{12}H_{14}O_6+NH_4]^+$ 272.1129. Found 272.1136.

Comparative Example 2: Preparation of (2R,5S, 6S)-3,5-dihydroxy-2-(hydroxymethyl)-6-(4-nitrophenoxy)tetrahydro-4H-pyran-4-one (4-nitrophenyl-O-β-D-3'-ketoglucopyranoside)

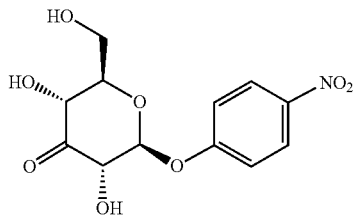 [SMILES: O=C1[C@@H](O)[C@H](Oc2ccc([N+](=O)[O-])cc2)O[C@H](CO)[C@H]1O]

4-Nitrophenyl-O-β-D-glucopyranoside (available from the company Sigma-Aldrich) was used to prepare the title compound following a substantially analogous process of Comparative Example 1. Data for this compound is available in Sedmera et al., Tetrahedron Lett., 2004, 45, 8677-8680.

Comparative Example 3: Preparation of (2R,5S, 6S)-3,5-dihydroxy-2-(hydroxymethyl)-6-(4-nitrophenoxy)tetrahydro-4H-pyran-4-one (4-nitrophenyl-O-α-D-3'-ketoglucopyranoside)

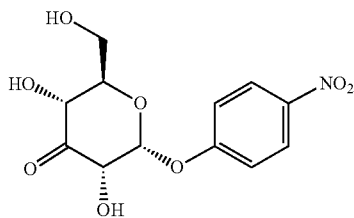 [SMILES: O=C1[C@@H](O)[C@@H](Oc2ccc([N+](=O)[O-])cc2)O[C@H](CO)[C@H]1O]

4-Nitrophenyl-O-α-D-glucopyranoside (available from the company Sigma-Aldrich) was used to prepare the title compound following a substantially analogous process of Comparative Example 1. Data for this compound is available in Takeuchi et al., J. Biochem., 1985, 98, 1631-1638.

Comparative Example 4: Preparation of (2R,3R,5S, 6S)-3,5-dihydroxy-2(hydroxy-methyl)-6-methoxytetrahydro-4H-pyran-4-one (methyl-O-β-D-3'-ketoglucopyranoside)

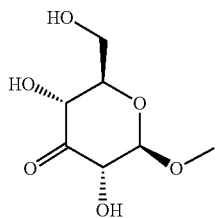

Methyl-O-β-D-glucopyranoside (available from the company Sigma-Aldrich) was used to prepare the title compound following a substantially analogous process of Comparative Example 1. Data for this compound is available in Jager et al., Angew. Chem. Int. Ed., 2013, 52, 7809-7812.

Comparative Example 5: Preparation of (2R,3R,5R, 6S)-3,5-dihydroxy-2-(hydroxy-methyl)-6-methoxytetrahydro-4H-pyran-4-one (methyl-O-α-D-3'-ketomannopyranoside)

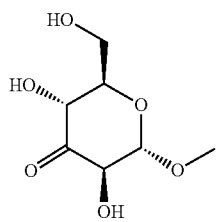

Methyl-O-α-D-mannopyranoside (available from the company Sigma-Aldrich) was used to prepare the title compound following a substantially analogous process of Comparative Example 1. Data for this compound is available in Chung et al., ACS Catal., 2016, 6, 4653-4659.

Comparative Example 6: Preparation of methyl (2S,3R,5S,6S)-3,5-dihydroxy-6-methoxy-4-oxotetrahydro-2H-pyran-2-carboxylate (methyl-O-β-D-3'-ketoglucuronide methyl ester)

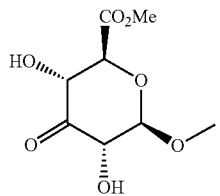

Methyl-α-D-glucopyranoside (available from the company Sigma-Aldrich) (1.0 g, 5.1 mmol) was dissolved in acetonitrile (10 mL) and water (10 mL) and the stirred solution cooled to 0° C. 2,2,6,6-Tetramethylpiperidine 1-oxyl (TEMPO) (0.24 g, 1.5 mmol), iodobenzene diacetate (3.6 g, 11.2 mmol) and sodium bicarbonate (0.43 g, 5.1 mmol) were added. The mixture was allowed to warm to room temp. after 1 h and allowed to stir overnight. Ethanol (10 mL) was added and the solvent removed by distillation under reduced pressure. The residue was dissolved in water 10 mL), washed with ethyl acetate (2×10 mL) and the aqueous portion concentrated by distillation under reduced pressure to afford the crude methyl-α-D-glucuronide as its sodium salt as a white solid (1.40 g). Data for this compound is available in Lu et al., Molecules, 2016, 21, 1301.

Crude methyl-α-D-glucuronide as its sodium salt (0.165 g) was suspended in methanol (3 mL), 3 drops of conc. sulfuric acid were added and the mixture stirred at 70° C. overnight. The mixture was subsequently cooled, quenched with solid sodium bicarbonate, filtered through celite and the filtrate concentrated by distillation under reduced pressure to afford the crude methyl-α-D-glucuronide methyl ester (0.209 g).

Crude methyl-α-D-glucuronide methyl ester was used to prepare the title compound following a substantially analogous process of Comparative Example 1 in 52% yield over 3 steps from methyl-alpha-glucopyranoside. Data for this compound are available in Eisink et al., ACS Catal., 2017, 7, 1438-1445.

Example 13: Release of the Electron Poor, Para-Substituted Aromatic Alcohol, p-nitrophenol from its β-3'-ketoglucopyranoside vs β-Glucopyranoside in Aqueous Solution at Room Temperature and Varying pH From 4-nitrophenyl-O-β-D-3'-ketoglucopyranoside prepared in Comparative Example 2.

In this example, 4-nitrophenyl-O-β-D-3'-ketoglucopyranoside and 4-nitrophenyl-O-beta-D-glucopyranoside were used as model compounds to determine the rate of release of an aromatic alcohol (4-nitrophenol) under different conditions.

Rate of release of 4-nitrophenol from (2R,3R,5S,6S)-3,5-dihydroxy-2-(hydroxymethyl)-6-(4-nitrophenoxy)tetrahydro-4H-pyran-4-one (4-nitrophenyl-O-β-D-3'-ketoglucopyranoside) was determined in comparison to (2R,3S,4S,5R,6S)-2-(hydroxymethyl)-6-(4-nitrophenoxy)tetrahydro-2H-pyran-3,4,5-triol (para-nitrophenyl-O-β-D-glucopyranoside) in 0.1 M deuterated phosphate buffer solutions of differing pH containing 10% $D_6$-DMSO or in water containing 10% $D_6$-DMSO at room temperature.

1 M Stock solutions of sodium dihydrogen phosphate and disodium hydrogen phosphate were prepared in deuterated water ($D_2O$). Stock solutions of 25 mg of 4-nitrophenyl-O-β-D-3'-ketoglucopyranoside (substrate A), 25 mg of 4-nitrophenyl-O-β-D-glucopyranoside (substrate B) in 0.5 mL of $D_6$-DMSO were each prepared and a stock solution of 11 mg of 4-nitrophenol in the same volume of $D_6$-DMSO for visual comparison.

Solutions of pH 4.5, 5.8, 7.4 and 9.5 were prepared by dilution of the appropriate individual or mixture of stock phosphate salt solutions to 0.1 M using a calibrated pH meter.

To ten parallel reaction vials was added 0.05 mL of one of the glycoside substrate stock solutions in $D_6$-DMSO, 0.5 mL of the appropriate deuterated buffer solution or 0.5 mL of water were indicated in Table I below. The reaction vials were allowed to stand at room temperature and the colour of the solutions recorded by visual observation relative to the colour of authentic 4-nitrophenol solutions diluted in the same way, as shown in Table I:

TABLE I

| Reaction | Substrate | pH | \multicolumn{5}{c}{Observation Time} |
|---|---|---|---|---|---|---|---|

| Reaction | Substrate | pH | 3 mins | 30 mins | 1 h | 19 h | 26 h |
|---|---|---|---|---|---|---|---|
| 1 | A | Water | − | − | − | − | + |
| 2 | A | 4.5 | − | − | − | − | − |
| 3 | A | 5.8 | − | − | + | +++ | ++++ |
| 4 | A | 7.4 | ++ | +++++ | +++++ | +++++ | +++++ |
| 5 | A | 9.5 | ++++ | +++++ | +++++ | +++++ | +++++ |
| 6 | B | Water | − | − | − | − | − |
| 7 | B | 4.5 | − | − | − | − | − |
| 8 | B | 5.8 | − | − | − | − | − |
| 9 | B | 7.4 | − | − | − | − | + |
| 10 | B | 9.5 | − | − | − | − | + |

+++++ = same strength colour as observed in 4-nitrophenyl solution at the same pH indicating complete reaction
− = no colour was observed After approximately 26 h, reactions 2 to 5 were all analysed by $^1$H-NMR using 128 scans on a 400 MHz instrument. By observation of the aromatic signals, reaction 2 contained only starting material, reaction 3 contained a mixture to starting material and 4-nitrophenol and reactions 4 and 5 contained almost entirely 4-nitrophenol with a trace of starting material. The 4-nitrophenol signals were observed to move in the solutions of differing pH due to different extents of ionization and were compared to the 4-nitrophenol solutions prepared at the same pH and by spiking experiments.

The experiment clearly demonstrates that by altering solution pH the rate of 4-nitrophenyl-O-β-D-3'-ketoglucopyranoside degradation can be modulated from no release at low pH to the delivery of μg quantities of 4-nitrophenol per minute from 0.5 mL of aqueous solution under physiologically relevant conditions, which is a relevant concentration for insect repellent requirements that would translate to the quantity released per cm$^2$ of skin on the application of 0.5 mL of an aqueous formulation. Furthermore, the corresponding glucopyranoside, 4-nitrophenyl-O-β-D-glucopyranoside, releases virtually no 4-nitrophenol under the same conditions.

Example 14: Release of the Electron Rich, Ortho- and Para-Disubstituted Aromatic Alcohol, Eugenol (Insect Repellent Alcohol) from its β-3'-Ketoglucopyranoside in Aqueous Solution at 32° C. and Varying pH From eugenyl-β-3'-ketoglucopyranoside prepared in Example 7.

In this example the rate of release of eugenol from (2S,3S,5R,6R)-2-(4-allyl-2-methoxyphenoxy)-3,5-dihydroxy-6-(hydroxymethyl)tetrahydro-4H-pyran-4-one (eugenyl-O-β-D-3'-ketoglucopyranoside) in 0.1 M deuterated phosphate buffer solutions of differing pH containing 33% $D_6$-DMSO was determined.

0.1 M of pH 5.8 and 7.4 stock buffered solutions of sodium dihydrogen phosphate and disodium hydrogen phosphate were prepared in deuterated water ($D_2O$).

A stock solution of 15 mg of eugenyl-O-β-D-3'-ketoglucopyranoside in 1.0 mL of $D_6$-DMSO were prepared.

To three parallel reaction vials, where indicated in the reaction table below, was added 0.20 mL of the glycoside substrate solutions in $D_6$-DMSO and 0.40 mL of low or high pH 0.1M phosphate buffer in $D_2O$ or $D_2O$ and the mixtures incubated by shaking at 32° C. After times indicated in table below, the mixtures where analysed by $^1$H-NMR in a 400 MHz instrument. The results are shown in Table II:

TABLE II

| Reaction | Ketoglycoside stock solution/mL | 0.1M buffer in D$_2$O, pH 5.8/mL | 0.1M buffer in D$_2$O, pH 7.4/mL | D$_2$O/mL | % Conversion by $^1$H-NMR* | | | |
|---|---|---|---|---|---|---|---|---|
| | | | | | 1 h | 5 h | 23 h | 69 h |
| 1 | 0.20 | 0.40 | 0 | 0 | 3 | 3 | 5 | 5 |
| 2 | 0.20 | 0 | 0.40 | 0 | 3 | 8 | 60 | 80 |
| 3 | 0.20 | 0 | 0 | 0.40 | 3 | 3 | 5 | 10 |

NR = Not run
*Reactions were followed by increase in the signal at 6.77 ppm (free eugenol) relative to the signal at 6.91 ppm (starting material).

At 32° C. eugenyl-O-β-D-3'-ketoglucopyranoside only slowly degraded at pH 5.8, but releases eugenol at a significantly higher rate at pH 7.4. This demonstrates that alcohol can be released from electron rich, ortho- and para-disubstituted aromatic-O-β-D-3'-ketoglucopyranosides at physiological temperature and pH in addition to electron poor aryl derivatives.

Example 15: Release of the Electron Rich, Ortho- and Meta-Disubstituted Aromatic Alcohol, Carvacrol (Insect Repellent Alcohol) from its β-3'-Ketoglucopyranoside in Aqueous Solution at 32° C. and Varying pH From carvacrol-β-3'-ketoglucopyranoside prepared in Example 8.

In this example the rate of release of carvacrol from ((2R,3R,5S)-3,5-dihydroxy-2-(hydroxymethyl)-6-(5-isopropyl-2-methylphenoxy)tetrahydro-4H-pyran-4-one (carvacrol-O-β-D-3'-ketoglucopyranoside) in 0.1 M deuterated phosphate buffer solutions of differing pH containing 20% D$_6$-DMSO was determined. 0.1 M of pH 5.8 and 7.4 stock buffered solutions of sodium dihydrogen phosphate and disodium hydrogen phosphate were prepared in deuterated water (D$_2$O).

A stock solution of 15 mg of carvacrol-O-β-D-3'ketoglucopyranoside in 1.0 mL of D$_6$-DMSO were prepared.

To two parallel reaction vials, where indicated in the reaction table below, was added 0.20 mL of the glycoside substrate solutions in D$_6$-DMSO and 0.50 mL of low or high pH 0.1M phosphate buffer in D$_2$O or D$_2$O and the mixtures incubated by shaking at 32° C. After times indicated in table below, the mixtures where analysed by $^1$H-NMR in a 400 MHz instrument. The results are shown in Table III:

Example 16: Release of the Allylic Alcohol, Geraniol (Insect Repellent Alcohol) from its β-3'-Ketoglucopyranoside in Aqueous Solution at 37° C. And Varying pH From geranyl-β-3'-ketoglucopyranoside prepared in Example 1.

In this example the rate of release of geraniol from (2R,3S,6R)-2-(((E)-3,7-dimethylocta-2,6-dien-1-yl)oxy)-3,5-dihydroxy-6-(hydroxymethyl)tetrahydro-4H-pyran-4-one (geranyl-O-β-D-3'-ketoglucopyranoside) in 0.1 M deuterated phosphate buffer solutions of differing pH containing 10% D$_6$-DMSO or in D$_2$O containing 10% D$_6$-DMSO at 37° C. in the presence and absence of fresh skin wash was determined.

1 M Stock solutions of sodium dihydrogen phosphate and disodium hydrogen phosphate were prepared in deuterated water (D$_2$O).

A stock solution of 25 mg of geranyl-O-β-D-3'-ketoglucopyranoside in 0.5 mL of D$_6$-DMSO were prepared.

In a typical experiment, a stock solution of fresh skin wash suspension was prepared by swabbing a 25 cm$^2$ areas of cheek skin of a human volunteer by robustly rubbing the area with a cotton wool gauze (5×5 cm$^2$) soaked in D$_2$O (12.5 mL) for 1 minute and then resuspending the gauze in the D$_2$O solution, rapidly shaking and removing the gauze after squeezing out as much liquid as possible with a spatula. 1 M Stock solutions phosphate buffer, pH 5.7 and 7.0 were prepared by appropriately mixing 1 M stock phosphate salts solutions to the correct pH as determined using a calibrated pH meter.

TABLE III

| Reaction | Ketoglycoside stock solution/mL | 0.1M buffer in D$_2$O, pH 5.8/mL | 0.1M buffer in D$_2$O, pH 7.4/mL | D$_2$O/mL | % Conversion by $^1$H-NMR* | | | |
|---|---|---|---|---|---|---|---|---|
| | | | | | 1 h | 5 h | 23 h | 69 h |
| 1 | 0.20 | 0.50 | 0 | 0 | 2 | <5 | <5 | <5 |
| 2 | 0.20 | 0 | 0.50 | 0 | 8 | 14 | 83 | 100 |

*Reactions were followed by increase in the singlet at 1.99 ppm relative to the singlet at 2.08 ppm.

At 32° C. carvacrol-β-3'-ketoglucopyranoside is only slowly degraded at pH 5.8, but releases carvacrol at a significantly higher rate at pH 7.4. This demonstrates that alcohol can be released from electron rich, ortho- and meta-disubstituted aromatic-O-β-D-3'-ketoglucopyranosides at physiological temperature and pH in addition to electron poor and electron rich, ortho- and para-disubstituted aryl derivatives.

Half of each buffer stock solution was diluted ten times with D$_2$O and the other with the above skin washing stock solution to give a 0.1 M phosphate buffer in D$_2$O with a final pH of 5.7, 0.1 M phosphate buffer in D$_2$O with a final pH of 7.0, a 0.1 M phosphate buffer in skin wash solution with a final pH of 5.7 and a 0.1 M phosphate buffer in skin wash solution with a final pH of 7.0.

To three parallel reaction vials, where indicated in the reaction table below, was added 0.45 mL of low or high pH 0.1 M phosphate buffer in $D_2O$ or 0.45 mL of low or high pH 0.1M phosphate buffer in skin wash solution followed by 0.05 mL of the glycoside substrate solutions in $D_6$-DMSO and the mixtures incubated by shaking at 37° C. After times indicated in table below, the mixtures where analysed by $^1$H-NMR with 128 scans using a 400 MHz instrument. The results are shown in Table IV:

TABLE IV

| Reaction | Substrate stock solution/mL | 0.1M buffer in $D_2O$/mL | 0.1M buffer in skin wash solution/mL | Final pH | % Conversion by $^1$H-NMR* | | |
|---|---|---|---|---|---|---|---|
| | | | | | 19 h | 41 h | 72 h |
| 1 | 0.05 | 0.45 | 0 | 5.7 | 3 | 6 | 10 |
| 2 | 0.05 | 0 | 0.45 | 7.0 | 10 | 31 | 48 |
| 3 | 0.05 | 0.45 | 0 | 7.0 | 9 | 28 | 51 |

*Reactions were followed by increase in the multiplet at 1.71 ppm relative to the singlet at 1.67 ppm. Due to peak overlap, relative heights were compared to authentic mixtures of geranyl-O-β-D-3'-ketoglucopyranoside and geraniol.

At 37° C. geranyl-β-3'-ketoglucopyranoside is only slowly degraded at pH 5.8, but releases geraniol at a significantly higher rate at pH 7.4 that is unchanged in the presence or absence of skin wash. This demonstrates that alcohol can be released from allylic-O-β-D-3'-ketoglucopyranosides at physiological temperature and pH in addition to aryl derivatives.

Example 17: Release of the Allylic Alcohol, Geraniol (Insect Repellent Alcohol) from its β-3'-Ketoglucopyranoside at Higher Concentration From geranyl-β-3'-ketoglucopyranoside prepared in Example 1.

In this example the rate of release of geraniol from a 40 mg/mL suspension of (2R,3S,6R)-2-(((E)-3,7-dimethylocta-2,6-dien-1-yl)oxy)-3,5-dihydroxy-6-(hydroxymethyl)tetrahydro-4H-pyran-4-one (geranyl-O-β-D-3'-ketoglucopyranoside) in 0.1 M deuterated phosphate buffer solution, pH 7, containing 10% DMSO at 37° C. was determined.

In a stoppered glass vial, geranyl-O-β-D-3'-ketoglucopyranoside (20 mg) was dissolved in $D_6$-DMSO (0.05 mL) then diluted with 0.1 M sodium phosphate buffer, pH 7.0 (0.45 mL) and the resultant suspension incubated by shaking at 37° C. After 3 d the mixture was transferred to an NMR tube at which point a strong smell of geraniol was observed. The mixture was analysed by $^1$H-NMR using a 400 MHz instrument and showed the same extent of conversion to geraniol (approximately 50%) as observed from the more dilute sample from reaction 2 in Example 16. NMR data showed that conversion increased significantly further after this time point, but conversion data could not be accurately quantified.

Example 18: Release of the Primary Aliphatic Alcohol, Picaridin (Insect Repellent Alcohol) from its β-3'-Ketoglucopyranoside at 32° C. and Varying pH From picaridin-β-3'-ketoglucopyranoside prepared in Example 2.

In this example the rate of release of picaridin from a solution of sec-butyl 2-(2-(((2R,3S,5R,6R)-3,5-dihydroxy-6-(hydroxymethyl)-4-oxotetrahydro-2H-pyran-2-yl)oxy)ethyl)piperidine-1-carboxylate (picaridin-O-β-D-3'-ketoglucopyranoside) different pH aqueous buffers was determined.

Parallel mixtures containing 250 μM picaridin-O-β-D-3'-ketoglucopyranoside in 0.05M $K_2HPO_4$ 0.95M/$KH_2PO_4$, pH=8.5 buffer (Reaction 1), 0.17M $Na_2HPO_4$/0.02M citric acid, pH=7 buffer (Reaction 2), 0.12M $Na_2HPO_4$/0.04M citric acid buffer, pH=5.8 (Reaction 3) and 0.04M sodium citrate/0.06M citric acid buffer, pH=4 (Reaction 4) were incubated at 32° C. Aliquots of 10 μl were periodically taken, diluted with MeCN (90 μl) and analysed by UPLC using the following instrument and conditions:

Stationary phase: Acquity UPLC® BEH C18 1.7 μm (2.1 mm×50 mm) (Waters)

Mobile phase: A: water+0.1% formic acid; B: acetonitrile+0.1% formic acid

The chromatographic equipment employed was an UPLC QSM Waters Acquity.

Gradient conditions:

| Time (min) | A | B |
|---|---|---|
| 0 | 95% | 5% |
| 0.1 | 95% | 5% |
| 1 | 0% | 100% |
| 2.5 | 0% | 100% |
| 2.6 | 95% | 5% |
| 3 | 95% | 5% |

Flow Rate(mL/min) 0.6
Source Temperature (° C.) 150
Desolvation Temperature (° C.) 500
Cone Gas Flow (L/Hr) 50
Desolvation Gas Flow (L/Hr) 900
Target Column Temperature 35° C.
Target Sample Temperature 8.0° C.

The quantity of picaridin released at different time points is shown in Table V:

TABLE V

| Reaction | Picaridin released/μM | | | |
|---|---|---|---|---|
| | 0 h | 7 h | 24 h | 50 h |
| 1 | 1 | 2 | 7 | 15 |
| 2 | 1 | 1 | 2 | 4 |
| 3 | 0.25 | 0.75 | 1 | 2 |
| 4 | 0.25 | 0.75 | 1 | 1.75 |

At 32° C. picaridin-O-β-D-3'-ketoglucopyranoside degraded at increasing rate between pH 4 and pH 8.5. This demonstrates that alcohol can be released from primary alkyl-O-β-D-3'-ketoglucopyranosides containing heterocyclic functionality at physiological temperature and pH in addition to aryl and allyl derivatives.

Example 19: Release of the Secondary Aliphatic Alcohol, Cis-PMD (Insect Repellent Alcohol) from its β-3'-Ketoglucopyranoside in Aqueous Solution at 32° C. and Varying pH From cis-PMD-O-β-D-3'-ketoglucopyranoside prepared in Example 5.

In this example the rate of release of cis-PMD from (2R,3R,5S)-3,5-dihydroxy-2-(hydroxymethyl)-6-((5-(2-hydroxypropan-2-yl)-2-methylcyclohexyl)oxy)tetrahydro-4H-pyran-4-one (cis-PMD-O-β-D-3'-ketoglucopyranoside) in 0.1 M deuterated phosphate buffer solutions of differing pH containing 33% $D_6$-DMSO was determined. 0.1 M of pH 5.8 and 7.4 stock buffered solutions of sodium dihydrogen phosphate and disodium hydrogen phosphate were prepared in deuterated water ($D_2O$).

A stock solution of 10 mg of cis-PMD-O-β-D-3'ketoglucopyranoside in 0.5 mL of $D_6$-DMSO were prepared.

To two parallel reaction vials, where indicated in the reaction table below, was added 0.20 mL of the glycoside substrate solutions in $D_6$-DMSO and 0.50 mL of low or high pH 0.1M phosphate buffer in $D_2O$ and the mixtures incubated by shaking at 32° C. After times indicated in table below, the mixtures where analysed by $^1$H-NMR in a 400 MHz instrument. The results are shown in Table VI:

TABLE VI

| Reaction | Ketoglycoside stock solution/mL | 0.1M buffer in $D_2O$, pH 5.8/mL | 0.1M buffer in $D_2O$, pH 7.4/mL | $D_2O$/mL | % Conversion by $^1$H-NMR* | | | | |
|---|---|---|---|---|---|---|---|---|---|
| | | | | | 0 h | 3 h | 20 h | 95 h | 167 h |
| 1 | 0.20 | 0.40 | 0 | 0 | 0 | 0 | 0 | <5 | NR |
| 2 | 0.20 | 0 | 0.40 | 0 | 0 | 12 | 39 | 45 | 85 |

*Reactions were followed by integration in the singlet at 1.29 ppm (starting material + free PMD) relative to the doublet at 4.25 ppm (starting material).

At 32° C. cis-PMD-O-β-D-3'-ketoglucopyranoside is only slowly degraded at pH 5.8, but releases cis-PMD at a significantly higher rate at pH 7.4. This demonstrates that alcohol can be released from secondary alkyl-O-β-D-3'-ketoglucopyranosides at physiological temperature and pH in addition to aryl, allyl and primary alkyl derivatives.

Example 20: Release of the Tertiary Aliphatic Alcohol, (S)-α-Terpineol from its β-3'-Ketoglucopyranoside in Aqueous Solution at 32° C. and Varying pH From (S)-α-terpineol-β-3'-ketoglucopyranoside prepared in Example 6.

In this example the rate of release of (S)-α-terpineol from (2R,3R,5S)-3,5-dihydroxy-2-(hydroxymethyl)-6-((5-(2-hydroxypropan-2-yl)-2-methylcyclohexyl)oxy) tetrahydro-4H-pyran-4-one ((S)-α-terpineol-O-β-D-3'-ketoglucopyranoside) in 0.1 M deuterated phosphate buffer solutions of differing pH containing 33% $D_6$-DMSO was determined.

0.1 M of pH 5.8 and 7.4 stock buffered solutions of sodium dihydrogen phosphate and disodium hydrogen phosphate were prepared in deuterated water ($D_2O$).

A stock solution of 10 mg of (S)-α-terpineol-O-β-D-3'-ketoglucopyranoside in 0.5 mL of $D_6$-DMSO were prepared.

To two parallel reaction vials, where indicated in the reaction table below, was added 0.20 mL of the glycoside substrate solutions in $D_6$-DMSO and 0.40 mL of low or high pH 0.1M phosphate buffer in $D_2O$ and the mixtures incubated by shaking at 32° C. After times indicated in table below, the mixtures where analysed by $^1$H-NMR in a 400 MHz instrument. The results are shown in Table VII:

TABLE VII

| Reaction | Ketoglycoside stock solution/mL | 0.1M buffer in $D_2O$, pH 5.8/mL | 0.1M buffer in $D_2O$, pH 7.4/mL | $D_2O$/mL | % Conversion by $^1$H-NMR* | | | | |
|---|---|---|---|---|---|---|---|---|---|
| | | | | | 0 h | 3 h | 20 h | 95 h | 167 |
| 1 | 0.15 | 0.50 | 0 | 0 | 0 | 0 | 0 | 0 | NR |
| 2 | 0.15 | 0 | 0.50 | 0 | 0 | 5 | 28 | 77 | 85 |

*Reactions were followed by careful integration in the multiplet at 1.50 ppm (starting material + free terpineol) relative to the multiplet at 3.26 ppm (starting material).

At 32° C. (S)-α-terpineol-O-β-D-3'-ketoglucopyranoside is only slowly degraded at pH 5.8, but releases (S)-α-terpineol at a significantly higher rate at pH 7.4. This demonstrates that alcohol can be released from tertiary alkyl-O-β-D-3'-ketoglucopyranosides at physiological temperature and pH in addition to aryl, allyl and primary and secondary alkyl derivatives.

Example 21: Release of a Primary Aliphatic Alcohol, Methanol from its α-3'-Ketoglucopyranoside vs α-Glucopyranoside in Aqueous Solution at Room Temperature then 37° C. and Varying pH From methyl-beta-3'-ketoglucopyranoside prepared in Comparative Example 4.

In this example, methyl-O-α-D-3'-ketoglucopyranoside and methyl-O-α-D-glucopyranoside were used as model compounds to determine the rate of release of an aliphatic alcohol (methanol) under different conditions.

1 M Stock solutions of sodium dihydrogen phosphate and disodium hydrogen phosphate were prepared in deuterated water ($D_2O$). Stock solutions of 15 mg of methyl-O-α-D-3'-ketoglucopyranoside (substrate A) and methyl-O-α-D-glucopyranoside (substrate B) were each prepared by dissolving in 0.3 mL of $D_6$-DMSO.

Solutions of pH 4.5, 5.8 and 7.4 were prepared by dilution of the appropriate individual or mixture of stock phosphate salt solutions to 0.1 M using a calibrated pH meter.

To eight parallel reaction vials was added 0.05 mL of one of the glycoside substrate solutions in $D_6$-DMSO, 0.5 mL of the appropriate deuterated buffer solution or 0.5 mL of water were indicated in the table below and the mixtures analysed by $^1$H-NMR with 128 scans using a 400 MHz instrument to give an initial time reading.

The mixtures were then analysed in the same way after allowing to stand at room temperature for a further 22 h.

The mixtures were then incubated by shaking at 37° C. for a further 44 h and analysed in the same way. At this point, only reaction 4 displayed any change and so the other reactions were discarded and reaction 4 was analysed in the same way after a further 72 h.

Table VIII shows the results:

TABLE VIII

| Reaction | Substrate | pH | % Conversion by $^1$H NMR* | | | |
|---|---|---|---|---|---|---|
| | | | Time zero | 22 h | 66 h | 138 h |
| 1 | A | Water | 0 | 0 | 0 | NR |
| 2 | A | 4.5 | 0 | 3 | 0 | NR |
| 3 | A | 5.8 | 0 | 0 | NR | NR |
| 4 | A | 7.4 | 0 | 0 | 6 | 10 |
| 5 | B | Water | 0 | NR | 0 | NR |
| 6 | B | 4.5 | 0 | NR | 0 | NR |

TABLE VIII-continued

| Reaction | Substrate | pH | % Conversion by $^1$H NMR* | | | |
|---|---|---|---|---|---|---|
| | | | Time zero | 22 h | 66 h | 138 h |
| 7 | B | 5.8 | 0 | NR | 0 | NR |
| 8 | B | 7.4 | 0 | NR | 0 | NR |

*Reactions 1 to 4 followed by the percentage increase in the singlet at 3.35 ppm (3 protons of MeOH) relative to the doublet at 5.20 ppm (anomeric proton of methyl-O-α-D-3'ketoglucopyranoside). Corrected for the 3% MeOH determined to be present in starting material using the same method.
*Reactions 5 to 8 followed by the percentage increase in the singlet at 3.35 ppm (3 protons of MeOH) relative to the doublet at 3.88 ppm (proton of methyl-O-α-D-glucopyranoside). Corrected for the 7% MeOH determined to be present in starting material using the same method.
NR = not run At 37° C. methyl-O-α-D-glucopyranoside remains stable over the pH range tested and in water whereas methyl-O-α-D-3'-ketoglucopyranoside is stable at pH 4.5 and 5.8, but very slowly generates methanol at pH 7.4. This demonstrates that alcohol can be released from simple primary aliphatic-O-α-D-3'-ketoglucopyranosides at physiological temperature and pH in addition to primary aliphatic-O-α-D-3'-ketoglucopyranosides, but that simple primary alkyl-O-α-D-glucopyranosides remain stable and don't release the alcohol rest.

Example 22: Comparative Rate of Release of Para-Nitrophenol from its β- vs. α-3'-Ketoglucopyranoside from Aqueous Solution at 32° C.

Materials prepared in Comparative Examples 2 and 3.

In this example the competitive rate of release of para-nitrophenol from an approximately equimolar solution of (2R,5S,6S)-3,5-dihydroxy-2-(hydroxymethyl)-6-(4-nitrophenoxy)tetrahydro-4H-pyran-4-one (4-nitrophenyl-O-β-D-3'-ketoglucopyranoside) and (2R,5S,6S)-3,5-dihydroxy-2-(hydroxymethyl)-6-(4-nitrophenoxy)tetrahydro-4H-pyran-4-one (4-nitrophenyl-O-α-D-3'-ketoglucopyranoside) in $D_2O$ containing 1.5% $D_6$-DMSO or in 0.1 M deuterated phosphate buffer, pH 5.8 containing 1.5% $D_6$-DMSO or in $D_2O$ was determined.

A solution containing approximately 2 mg each of 4-nitrophenyl-O-β-D-3'-ketoglucopyranoside and 4-nitrophenyl-O-α-D-3'-ketoglucopyranoside was prepared in 1 mL of $D_2O$ containing 3.3% v/v $D_6$-DMSO. To two 0.375 mL portions of the resultant solution was added either $D_2O$ (0.5 mL) or 0.1M sodium phosphate buffer, pH 5.8 (0.5 mL) to given reactions 1 and 2 respectively. The resultant mixtures were analysed by $^1$H NMR directly following preparation then incubated at 32° C./80 rpm and periodically analysed by $^1$H NMR at recorded time points.

The change in the ratio between the integrals of the anomeric protons of each ketoglucoside and between the were sum of the anomeric protons and the anomeric protons of each ketoglucoside with time are shown in Table IX:

TABLE IX

| | Change in the ratio of α-/β-ketoglucoside proton integrals with time[1] | | | | Change in the ratio of the sum of aromatic/α-ketoglucoside proton integrals with time[2] | | | | Change in the ratio of the sum of aromatic/β-ketoglucoside proton integrals with time[3] | | | |
|---|---|---|---|---|---|---|---|---|---|---|---|---|
| Reaction | 0 h | 20 h | 45 h | 72 h | 0 h | 20 h | 45 h | 143 h | 0 h | 20 h | 45 h | 143 h |
| 1 | 1.0 | 1.2 | 1.3 | 1.3 | 6.9 | 7.1 | 6.8 | 6.2 | 6.8 | 8.3 | 8.8 | 8.3 |
| 2 | 1.2 | 0.8 | 0.7 | 0.35 | 5.7 | 9.3 | 14.2 | 30.2 | 6.6 | 7.2 | 9.7 | 10.6 |

[1]Ratio between the intregrals of the doublet at 6.01 ppm and the doublet of doublets at 5.19 ppm of $^1$H NMR spectra.
[2]Ratio between the sum of the intregrals of the signals at 8.09, 8.02, 7.11 and 6.81 ppm and the doublet at 6.01 ppm of $^1$H NMR spectra taken at each time point.
[3]Ratio between the sum of the integrals of the signals at 8.09, 8.02, 7.11 and 6.81 ppm and the doublet of doublets at 5.19 ppm of $^1$H NMR spectra taken at each time point.

At 32° C. both 4-nitrophenyl-O-α-D-ketoglucopyranosides and O-β-D-ketoglucopyranosides underwent slow degradation with the α-ketoglucopyranoside degrading approximately six times faster than the β-ketoglucoside. Both ketoglucosides remained stable in D$_2$O. This demonstrates that alcohol can be released from α-3'-ketoglucopyranosides at a faster rate than from β-3'-ketoglucopyranosides at physiological temperature and pH.

Example 23: Release of a Primary Aliphatic Alcohol, Methanol from its α-3'-Ketomannopyranoside vs α-Mannopyranoside in Aqueous Solution at 32° C. and Varying pH From methyl-O-α-D-3'-ketomannopyranoside prepared in Comparative Example 5.

In this example the rate of release of methanol from (2R,3R,5R,6S)-3,5-dihydroxy-2-(hydroxymethyl)-6-methoxytetrahydro-4H-pyran-4-one (methyl-O-α-D-3'-ketomannopyranoside) vs. (2R,3S,4S,5S,6S)-2-(hydroxymethyl)-6-methoxytetrahydro-2H-pyran-3,4,5-triol (methyl-O-α-D-mannopyranoside) in D$_2$O containing 15% D$_6$-DMSO or in 0.1 M deuterated phosphate buffer solutions of differing pH containing 15% D$_6$-DMSO or in D$_2$O was determined.

0.1 M of pH 5.8 and 7.4 stock buffered solutions of sodium dihydrogen phosphate and disodium hydrogen phosphate were prepared in deuterated water (D$_2$O).

A stock solution of 25 mg of methyl-O-α-D-3'-ketoglucomannoside in 1.0 mL of D$_6$-DMSO were prepared.

To five parallel reaction vials, where indicated in the reaction table below, was added 0.10 mL of the glycoside substrate solutions in D$_6$-DMSO and 0.50 mL of low or high pH 0.1M phosphate buffer in D$_2$O and the mixtures incubated by shaking at 33° C. After times indicated in table below, the mixtures where analysed by $^1$H-NMR in a 400 MHz instrument. The results are shown in Table X:

At 32° C. methyl-O-α-D-mannopyranoside remains stable at pH 7.4 and in water whereas methyl-O-α-D-3'-ketomannopyranoside generates methanol at both pH 5.8 and pH 7.4. This demonstrates that alcohol can be released from simple primary aliphatic-O-α-D-3'-ketomannopyranosides at physiological temperature and pH in addition to primary aliphatic-O-α-D-3'-ketoglucopyranosides and primary aliphatic-O-β-D-3'-ketoglucopyranosides, but that simple primary alkyl-O-α-D-mannopyranosides remain stable and don't release the alcohol rest.

Example 24: Release of the Allylic Alcohol, Geraniol from its 3'-Keto-2'-Deoxyglucopyranoside Vs 2'-Deoxyglucopyranoside in Aqueous Solution at 32° C. and Varying pH From geranyl-3'-keto-2'-deoxyglucopyranoside prepared in Example 3.

In this example the rate of release of geraniol from (2R,3R)-6-(((E)-3,7-dimethylocta-2,6-dien-1-yl)oxy)-3-hydroxy-2-(hydroxymethyl)tetrahydro-4H-pyran-4-one in (geranyl-3'-keto-2'-deoxyglucopyranoside) 0.1 M deuterated phosphate buffer solutions of differing pH containing 50% D$_6$-DMSO was determined.

0.1 M of pH 5.8 and 7.4 stock buffered solutions of sodium dihydrogen phosphate and disodium hydrogen phosphate were prepared in deuterated water (D$_2$O).

A stock solution of 15 mg of geraniol-O-β-D-3'-keto-2'-deoxyglucopyranoside in 1.5 mL of D$_6$-DMSO were prepared.

To four parallel reaction vials, where indicated in the reaction table below, was added 0.35 mL of the glycoside substrate solutions in D$_6$-DMSO and 0.35 mL of low or high pH 0.1M phosphate buffer in D$_2$O and the mixtures incubated by shaking at 33° C. After times indicated in table below, the mixtures where analysed by $^1$H-NMR in a 400 MHz instrument. The results are shown in Table XI:

TABLE X

| Reaction | Ketoglycoside stock solution/mL | Glycoside stock solution/mL | 0.1M buffer in D$_2$O, pH 5.8/mL | 0.1M buffer in D$_2$O, pH 7.4/mL | D$_2$O/mL | % Conversion by $^1$H-NMR* | | | |
|---|---|---|---|---|---|---|---|---|---|
| | | | | | | 0 h | 22 h | 96 h | 192 h |
| 1 | 0.10 | 0 | 0.60 | 0 | 0 | 0 | 71 | 78 | 78 |
| 2 | 0.10 | 0 | 0 | 0.60 | 0 | 0 | 54 | 74 | 88 |
| 3 | 0.10 | 0 | 0 | 0 | 0.60 | 0 | 0 | NR | NR |
| 4 | 0 | 0.05 | 0 | 0.60 | 0 | 0 | 0 | 0 | 0 |
| 5 | 0 | 0.05 | 0 | 0 | 0.60 | 0 | 0 | 0 | NR |

NR = Not run
*Reactions 1 to 3 were followed by a decrease in the signal of starting material (3-ketoglycoside) at 3.35 ppm relative to D$_6$-DMSO. Reactions 4 and 5 were followed by comparing the integration of the 3.38 ppm singlet of formed methanol versus the 4.75 ppm anomeric signal of starting material.

TABLE XI

| Reaction | Ketoglycoside stock solution/mL | Glycoside stock solution/mL | 0.1M buffer in D$_2$O, pH 5.8/mL | 0.1M buffer in D$_2$O, pH 7.4/mL | D$_2$O/mL | % Conversion by $^1$H-NMR* | | | | |
|---|---|---|---|---|---|---|---|---|---|---|
| | | | | | | 0 h | 1 h | 72 h | 144 h | 288 h |
| 1 | 0.35 | 0 | 0.35 | 0 | 0 | 0 | 5 | 32 | 38 | 47 |
| 2 | 0.35 | 0 | 0 | 0.35 | 0 | 0 | 6 | 57 | 88 | 100 |
| 3 | 0.35 | 0 | 0 | 0 | 0.35 | 0 | 0 | <5 | <5 | NR |
| 4 | 0 | 0.35 | 0 | 0.35 | 0 | 0 | 0 | 0 | 0 | 0 |

NR = Not run
*Reactions were followed by increase in the doublet at 3.91 ppm (geraniol) relative to the doublet at 3.98 ppm (starting material).

At 32° C. geranyl-O-2'-deoxyglucopyranoside remains stable at pH 7.4 whereas geranyl-3'-keto-2'-deoxyglucopyranoside generates geraniol at both pH 5.8 and pH 7.4. This demonstrates that alcohol can be released from 3'-keto-2'-deoxyglucopyranosides at physiological temperature and pH in addition to 3'-ketoglucopyranosides and 3'-ketomannopyranosides, but that 2'-deoxyglucopyranosides remain stable and don't release the alcohol rest. In addition, the rate of geraniol release from geranyl-3'-keto-2'-deoxyglucopyranoside is greater than observed from geranyl-O-β-D-3'-ketoglucopyranoside under similar conditions (Example 17).

Example 25: Release of the Allylic Alcohol, Geraniol from its β-2'-Acetamido-2'-Deoxy-3'-Keto-Glucopyranoside Vs 13-2'-Acetamido-2'-Deoxy-Glucopyranoside in Aqueous Solution at 32° C. and Varying pH From geranyl-O-β-D-2'-acetamido-2'-deoxy-3'-keto-glucopyranoside prepared in Example 4.

In this example the rate of release of geraniol from N-((2R,3S,5R,6R)-2-(((E)-3,7-dimethylocta-2,6-dien-1-yl)oxy)-5-hydroxy-6-(hydroxymethyl)-4-oxotetrahydro-2H-pyran-3-yl)acetamide (geranyl-O-β-D-2'-acetamido-2'-deoxy-3'-keto-glucopyranoside) vs. N-((2R,3R,4R,5S,6R)-2-(((E)-3,7-dimethylocta-2,6-dien-1-yl)oxy)-4,5-dihydroxy-6-(hydroxymethyl)tetrahydro-2H-pyran-3-yl)acetamide (geranyl-R-2'-acetamido-2'-deoxy-glucopyranoside) in D$_2$O containing 33% D$_6$-DMSO or in 0.1 M deuterated phosphate buffer solutions of differing pH containing 33% D$_6$-DMSO or in D$_2$O was determined.

0.1 M of pH 5.8 and 7.4 stock buffered solutions of sodium dihydrogen phosphate and disodium hydrogen phosphate were prepared in deuterated water (D$_2$O).

A stock solution of 25 mg of geranyl-O-β-D-2'-acetamido-2'-deoxy-3'-keto-glucopyranoside in 1.0 mL of D$_6$-DMSO were prepared.

To four parallel reaction vials, where indicated in the reaction table below, was added 0.20 mL of the glycoside substrate solutions in D$_6$-DMSO and 0.40 mL of low or high pH 0.1M phosphate buffer in D$_2$O and the mixtures incubated by shaking at 32° C. After times indicated in table below, the mixtures where analysed by $^1$H-NMR in a 400 MHz instrument. The results are shown in Table XII.

TABLE XII

| Reaction | Ketoglycoside stock solution/mL | Glycoside stock solution/mL | 0.1M buffer in D$_2$O, pH 5.8/mL | 0.1M buffer in D$_2$O, pH 7.4/mL | D$_2$O/mL | % Conversion by $^1$H-NMR* | | | | |
|---|---|---|---|---|---|---|---|---|---|---|
| | | | | | | 0 h | 1.5 h | 22 h | 48 h | 216 h |
| 1 | 0.45 | 0 | 0.45 | 0 | 0 | 0 | 5 | 25 | 32 | 39 |
| 2 | 0.45 | 0 | 0 | 0.45 | 0 | 0 | 5 | 88 | 100 | 100 |
| 3 | 0.45 | 0 | 0 | 0 | 0.45 | 0 | 0 | 0 | 0 | 0 |
| 4 | 0 | 0.45 | 0 | 0.45 | 0 | 0 | 0 | 0 | 0 | 0 |

NR = Not run
*Reactions were followed by an increase in the doublet at 3.91 ppm (geraniol) relative to the doublet at 4.15 ppm (starting material). Reaction 4 was monitored by analysing the formation of the free geraniol doublet at 4.12 (not observed) relative to the doublet at 4.57 ppm (starting material).

At 32° C. geranyl-β-2'-acetamido-2'-deoxy-glucopyranoside remains stable at pH 7.4 whereas geranyl-O-β-D-2'-acetamido-2'-deoxy-3'-keto-glucopyranoside generates geraniol at both pH 5.8 and pH 7.4. This demonstrates that alcohol can be released from 2'-acetamido-2'-deoxy-3'-keto-glucopyranosides at physiological temperature and pH in addition to 3'-ketoglucopyranosides and 3'-ketomannopyranosides and 3'-keto-2'-deoxyglucopyranosides, but that 2'-acetamido-2'-deoxy-glucopyranosides remain stable and don't release the alcohol rest. In addition, the rate of geraniol release from geranyl-O-β-D-2'-acetamido-2'-deoxy-3'-keto-glucopyranoside is greater than observed from geranyl-3'-keto-2'-deoxyglucopyranoside (Example 25) or geranyl-O-β-D-3'-ketoglucopyranoside (Example 17) under similar conditions.

Example 26: Release of the Allylic Alcohol, Geraniol from its 2',6'-Diacetylated β-3'-Ketoglucopyranoside in Aqueous Solution at 32° C. and Varying pH From 2',6'-Diacetyl-geranyl-O-β-D-3'-ketoglucopyranoside prepared in Example 9.

In this example the rate of release of geraniol from (((2R,3R,5S)-5-acetoxy-6-(((E)-3,7-dimethylocta-2,6-dien-1-yl)oxy)-3-hydroxy-4-oxotetrahydro-2H-pyran-2-yl) methyl acetate (2',6'-Diacetyl-geranyl-O-β-D-3'-ketoglucopyranoside) in 0.1 M deuterated phosphate buffer solutions of differing pH containing 50% D$_6$-DMSO was determined.

0.1 M of pH 5.8 and 7.4 stock buffered solutions of sodium dihydrogen phosphate and disodium hydrogen phosphate were prepared in deuterated water ($D_2O$).

A stock solution of 15 mg of 2',6'-diacetyl-geranyl-O-β-D-3'-ketoglucopyranoside in 1.5 mL of $D_6$-DMSO were prepared.

To two parallel reaction vials, where indicated in the reaction table below, was added 0.35 mL of the glycoside substrate solutions in $D_6$-DMSO and 0.35 mL of low or high pH 0.1M phosphate buffer in $D_2O$ and the mixtures incubated by shaking at 32° C. After times indicated in table below, the mixtures where analysed by $^1$H-NMR in a 400 MHz instrument. The results are shown in Table XIII:

TABLE XIII

| Reaction | Ketoglycoside stock solution/mL | 0.1M buffer in $D_2O$, pH 5.8/mL | 0.1M buffer in $D_2O$, pH 7.4/mL | $D_2O$/mL | % Conversion by $^1$H-NMR* | | | | | | |
|---|---|---|---|---|---|---|---|---|---|---|---|
| | | | | | 0 h | 5 h | 24 h | 48 h | 120 h | 19 | 480 h |
| 1 | 0.35 | 0.35 | 0 | 0 | 0 | 10 | 20 | 39 | 43 | 62 | 92 |
| 2 | 0.35 | 0 | 0.35 | 0 | 0 | 6 | 25 | 33 | 37 | 55 | 85 |

NR = Not run

*Reactions were followed by increase in the doublet at 3.91 ppm (geraniol) relative to the doublet at 4.00 ppm (starting material).

At 32° C. 2',6'-diacetyl-geranyl-O-β-D-3'-ketoglucopyranoside generates geraniol at both pH 5.8 and pH 7.4. This demonstrates that alcohol can be released from 2',6'diprotected 3'-ketoglucopyranosides at physiological temperature and pH in addition to unprotected 3'-ketoglucopyranosides.

Example 27: Release of the Aromatic Alcohol, Phenol from its 2',6'-Diacetylated β-3'-Ketoglucopyranoside in Aqueous Solution at 32° C. and Varying pH From 2',6'-diacetyl-phenyl-O-β-D-3'-ketoglucopyranoside prepared in Example 10.

In this example the rate of release of geraniol from ((2R,3R,5S)-5-acetoxy-3-hydroxy-4-oxo-6-phenoxytetrahydro-2H-pyran-2-yl)methyl acetate (2',6'-diacetyl-phenyl-O-β-D-3'-ketoglucopyranoside) in 0.1 M deuterated phosphate buffer solutions of differing pH containing 33% $D_6$-DMSO was determined.

0.1 M of pH 5.8 and 7.4 stock buffered solutions of sodium dihydrogen phosphate and disodium hydrogen phosphate were prepared in deuterated water ($D_2O$).

A stock solution of 25 mg of 2',6'-diacetyl-phenyl-O-β-D-3'-ketoglucopyranoside in 1.0 mL of $D_6$-DMSO were prepared.

To three parallel reaction vials, where indicated in the reaction table below, was added 0.20 mL of the glycoside substrate solutions in $D_6$-DMSO and 0.40 mL of low or high pH 0.1M phosphate buffer in $D_2O$ and the mixtures incubated by shaking at 32° C. After times indicated in table below, the mixtures where analysed by $^1$H-NMR in a 400 MHz instrument. The results are shown in Table XIV:

TABLE XIV

| Reaction | Ketoglycoside stock solution/mL | 0.1M buffer in $D_2O$, pH 5.8/mL | 0.1M buffer in $D_2O$, pH 7.4/mL | $D_2O$/mL | % Conversion by $^1$H-NMR* | | | | | |
|---|---|---|---|---|---|---|---|---|---|---|
| | | | | | 0 h | 4 h | 22 h | 52 h | 120 h | 432 h |
| 1 | 0.20 | 0.40 | 0 | 0 | 14 | 18 | 24 | 26 | 36 | 54 |
| 2 | 0.20 | 0 | 0.40 | 0 | 19 | 43 | 74 | 81 | 93 | 100 |
| 3 | 0.20 | 0 | 0 | 0.40 | 0 | 0 | 10 | 21 (70 h) | NR | NR |

NR = Not run

*Reactions were followed by increase in the triplet at 7.14 ppm (phenol) relative to the triplet at 7.26 ppm (starting material) (D6-DMSO signal at 2.50 ppm as a reference).

At 32° C. 2',6'-diacetyl-phenyl-O-β-D-3'-ketoglucopyranoside generates phenol at both pH 5.8 and pH 7.4 and in $D_2O$. This again demonstrates that alcohol can be released from 2',6'diprotected 3'-ketoglucopyranosides at physiological temperature and pH in addition to unprotected 3'-ketoglucopyranosides.

Example 28: Release of the Primary Aliphatic Alcohol, Methanol from its 0-3'-Ketoglucuronide Methyl Ester in Aqueous Solution at 32° C. and Varying pH From glucuronide methyl ester prepared in Comparative Example 6.

In this example the rate of release of methanol from methyl (2R,3R,5S,6S)-3,5-dihydroxy-6-methoxy-4-oxotetrahydro-2H-pyran-2-carboxylate (methyl-β-3'-ketoglucuronide methyl ester) in $D_2O$ containing 10% $D_6$-DMSO or in 0.1 M deuterated phosphate buffer solutions of differing pH containing 10% $D_6$-DMSO or in $D_2O$ was determined.

0.1 M of pH 5.8 and 7.4 stock buffered solutions of sodium dihydrogen phosphate and disodium hydrogen phosphate were prepared in deuterated water ($D_2O$).

A stock solution of 20 mg of methyl-β-3'-ketoglucuronide methyl ester in 0.25 mL of $D_6$-DMSO were prepared.

To two parallel reaction vials, where indicated in the reaction table below, was added 0.05 mL of the glycoside substrate solutions in $D_6$-DMSO and 0.55 mL of low or high pH 0.1M phosphate buffer in $D_2O$ and the mixtures incubated by shaking at 32° C. After times indicated in table below, the mixtures where analysed by $^1$H-NMR in a 400 MHz instrument. The results are shown in Table XV:

TABLE XV

| Reaction | Ketoglucuronide stock solution/mL | Glucuronide stock solution/mL | 0.1M buffer in $D_2O$, pH 5.8/mL | 0.1M buffer in $D_2O$, pH 7.4/mL | $D_2O$/mL | % Conversion by $^1$H-NMR* | | | |
|---|---|---|---|---|---|---|---|---|---|
| | | | | | | 0 h | 5 h | 20 h | 72 h |
| 1 | 0.05 | 0 | 0.45 | 0 | 0 | 0 | 2 | 7 | 23 (163 h) |
| 2 | 0.05 | 0 | 0 | 0.45 | 0 | 0 | 15 | 38 | 100 |

NR = not run
*Reactions were followed by increase in the singlet at 3.74 ppm (product methyl ester) relative to the singlet at 3.79 ppm (starting material methyl ester).

At 32° C. methyl-β-3'-ketoglucuronide methyl ester generates methanol at both pH 5.8 and pH 7.4. This demonstrates that alcohol can be released from 3'-ketoglucuronates at physiological temperature and pH.

Example 29: Release of the Aromatic Alcohol, Phenol from its 6'-Sulfated β-3'-Ketoglucopyranoside in Aqueous Solution at 32° C. and Varying pH From phenyl-O-β-D-3'-keto-6'-sulphatoglucopyranoside pyridinium salt prepared in Example 11.

In this example the rate of release of phenol from ((2R,3R,5S,6S)-3,5-dihydroxy-4-oxo-6-phenoxytetrahydro-2H-pyran-2-yl)methyl hydrogen sulfate pyridinium salt (phenyl-O-β-D-3'-keto-6'-sulphatoglucopyranoside pyridinium salt) in 0.1 M deuterated phosphate buffer solutions of differing pH containing 15% $D_6$-DMSO was determined.

0.1 M of pH 5.8 and 7.4 stock buffered solutions of sodium dihydrogen phosphate and disodium hydrogen phosphate were prepared in deuterated water ($D_2O$).

A stock solution of 20 mg of phenyl-O-β-D-3'-keto-6'-sulphatoglucopyranoside in 0.5 mL of $D_6$-DMSO were prepared.

To two parallel reaction vials, where indicated in the reaction table below, was added 0.10 mL of the glycoside substrate solutions in $D_6$-DMSO and 0.60 mL of low or high pH 0.1M phosphate buffer in $D_2O$ and the mixtures incubated by shaking at 32° C. After times indicated in table below, the mixtures where analysed by $^1$H-NMR in a 400 MHz instrument. The results are shown in Table XVI:

TABLE XVI

| Reaction | Ketoglycoside stock solution/mL | Glycoside stock solution/mL | 0.1M buffer in D$_2$O, pH 5.8/mL | 0.1M buffer in D$_2$O, pH 7.4/mL | D$_2$O/mL | % Conversion by $^1$H-NMR* | | | |
|---|---|---|---|---|---|---|---|---|---|
| | | | | | | 0 h | 5 h | 20 h | 100 h |
| 1 | 0.10 | 0 | 0.60 | 0 | 0 | 1 | 2 | 2 | 2 |
| 2 | 0.10 | 0 | 0.60 | 0 | 0 | 4 | 15 | 38 | 84 |

Reactions were followed by increase in the triplet at 7.14 ppm (phenol) relative to the triplet at 7.26 ppm (starting material).

At 32° C. phenyl-O-β-D-3'-keto-6'-sulphatoglucopyranoside pyridinium salt generates phenol at pH 7.4. This demonstrates that alcohol can be released from 6'-sulphated 3'-ketoglucopyranosides at physiological temperature and pH.

Example 30: Comparative Rate of Release of Alcohol from 3'-Ketoglucopyranosides from Aqueous Solution at 37° C. and Varying pH in the Presence and in the Absence of Fresh Skin Wash In this example, phenyl-O-β-D-3'-ketoglucopyranoside, methyl-O-α-D-3'-ketoglucopyranoside, phenyl-O-β-D-glucopyranoside, methyl-O-α-D-glucopyranoside and 4-nitrophenyl-O-β-D-glucopyranoside were used as model compounds to determine the rate of release of their respective alcohol rests under different conditions.

The competitive rate of release of methanol or phenol and 4-nitrophenol from a 1:1 stoichiometric mixture of (2R,5S,6S)-3,5-dihydroxy-2-(hydroxymethyl)-6-phenoxytetrahydro-4H-pyran-4-one (phenyl-O-β-D-3'-ketoglucopyranoside) or (2R,3R,5S,6S)-3,5-dihydroxy-2-(hydroxymethyl)-6-methoxytetrahydro-4H-pyran-4-one (methyl-O-α-D-3'ketoglucopyranoside) and their respective 0-glucopyranosides against (2R,3S,4S,5R,6S)-2-(hydroxymethyl)-6-(4-nitrophenoxy)tetrahydro-2H-pyran-3,4,5-triol (4-nitrophenyl-O-β-D-glucopyranoside) in 0.1 M deuterated phosphate buffer solutions at pH 5.7 and 7.0 containing 10% D$_6$-DMSO at room temperature in the presence and absence of fresh skin washing solution was determined.

1 M Stock solutions of sodium dihydrogen phosphate and disodium hydrogen phosphate were prepared in deuterated water (D$_2$O).

4-Nitrophenyl-O-β-D-glucopyranoside (50 mg) was dissolved in D$_6$-DMSO (1 mL) and 0.2 mL of the resultant solution added to each of 10 mg of methyl-O-α-D-3'-ketoglucopyranoside, methyl-O-α-D-glucopyranoside, phenyl-O-β-D-3'-ketoglucopyranoside and phenyl-O-β-D-glucopyranoside to give substrate stock solutions A, B, C and D respectively.

In a typical experiment, a stock solution of fresh skin wash suspension was prepared by swabbing a 25 cm$^2$ area of cheek skin of a human volunteer by robustly rubbing the area with a cotton wool gauze (5×5 cm$^2$) soaked in D$_2$O (12.5 mL) for 1 minute and then resuspending the gauze in the D$_2$O solution, rapidly shaking and removing the gauze after squeezing out as much liquid as possible with a spatula.

1 M Stock solutions of phosphate buffer, pH 5.7 and 7.0 were prepared by appropriately mixing 1 M stock phosphate salts solutions to the correct pH as determined using a calibrated pH meter.

Half of each buffer stock solution was diluted ten times with D$_2$O and the other with the above skin washing stock solution to give a 0.1 M phosphate buffer in D$_2$O with a final pH of 5.7, 0.1 M phosphate buffer in D$_2$O with a final pH of 7.0, a 0.1 M phosphate buffer in skin wash solution with a final pH of 5.7 and a 0.1 M phosphate buffer in skin wash solution with a final pH of 7.0.

To sixteen parallel reaction vials, was added 0.45 mL of low or high pH 0.1M phosphate buffer in D$_2$O or 0.45 mL of low or high pH 0.1M phosphate buffer in skin wash solution followed by 0.05 mL of one of the glycoside substrate solutions in D$_6$-DMSO and the mixtures incubated by shaking at 37° C. After times indicated in the table below, the mixtures where analysed by $^1$H-NMR with 128 scans using a 400 MHz instrument and the colour observed visually, with the results shown in Table XVII:

TABLE XVII

| Reaction | Substrate stock solution | 0.1M buffer in skin wash solution/mL | 0.1M bufferin D$_2$O/mL | Final pH | % Conversion by $^1$H NMR* | | | Visual observation of colour | | |
|---|---|---|---|---|---|---|---|---|---|---|
| | | | | | 13 h | 27 h | 79 h | 13 h | 27 h | 79 h |
| 1 | A | 0.45 | 0 | 5.7 | 2 | 1 | 2 | − | − | − |
| 2 | A | 0 | 0.45 | 5.7 | 1 | 3 | 1 | − | − | − |
| 3 | A | 0.45 | 0 | 7.0 | 14 | 14 | nr | + | ++ | nr |
| 4 | A | 0 | 0.45 | 7.0 | 9 | 6 | 15 | + | ++ | ++ |
| 5 | B | 0.45 | 0 | 5.7 | 2 | 2 | nr | − | − | − |
| 6 | B | 0 | 0.45 | 5.7 | 0 | 1 | nr | − | − | − |
| 7 | B | 0.45 | 0 | 7.0 | 2 | 1 | nr | + | − | + |
| 8 | B | 0 | 0.45 | 7.0 | 2 | nr | nr | − | nr | nr |
| 9 | C | 0.45 | 0 | 5.7 | 4 | 10 | 21 | − | − | − |
| 10 | C | 0 | 0.45 | 5.7 | 5 | 11 | 17 | − | − | − |
| 11 | C | 0.45 | 0 | 7.0 | 41 | 69 | 97 | + | + + | ++ |
| 12 | C | 0 | 0.45 | 7.0 | 37 | 65 | 81 | + | + | + |
| 13 | D | 0.45 | 0 | 5.7 | 0 | 0 | nr | − | + | − |
| 14 | D | 0 | 0.45 | 5.7 | 0 | 0 | nr | − | − | − |

TABLE XVII-continued

| Reaction | Substrate stock solution | 0.1M buffer in skin wash solution/mL | 0.1M buffer in D$_2$O/mL | Final pH | % Conversion by $^1$H NMR* | | | Visual observation of colour | | |
|---|---|---|---|---|---|---|---|---|---|---|
| | | | | | 13 h | 27 h | 79 h | 13 h | 27 h | 79 h |
| 15 | D | 0.45 | 0 | 7.0 | 0 | 0 | nr | + | + | + |
| 16 | D | 0 | 0.45 | 7.0 | 0 | 0 | nr | – | – | – |

*Reactions 1 to 4 followed by increase in the singlet at 3.35 ppm (3 protons of MeOH) relative to the doublet at 5.20 ppm (anomeric proton of methyl-O-α-D-3'-ketoglucopyranoside). Corrected for the 3% MeOH determined to be present in starting material using the same method.
*Reactions 5 to 8 followed by increase in the singlet at 3.35 ppm (3 protons of MeOH) multiplet from 3.95-3.84 ppm. Corrected for the 7% MeOH determined to be present in starting material using the same method.
*Reactions 9 to 12 followed by increase in the doublet at 6.91 ppm (2 aromatic protons of phenol) relative to the multiplet at 7.42 ppm (2 aromatic protons of phenyl-O-β-D-3'-ketoglucopyranoside).
nr = not run
+++++ = same strength colour as observed in p-nitrophenyl solution indicating complete reaction
– = no colour was observed The results demonstrate that both 3'-ketoglucopyranosides release their respective alcohols in the presence and absence of skin washings at pH 7, but to a greater extent in the former. In contrast, no reaction is observed from the methyl-O-α-D-3'-ketoglucopyranoside at pH 5.7. At pH 5.7, the phenyl-O-β-D-3'-ketoglucopyranoside reacts slower than at pH 7 and to the same extent in the presence and absence of skin washing. Methyl and phenyl-O-D-glucopyranosides were stable under all conditions tested. The 4-nitrophenyl-O-β-D-glucoside, could be observed to release some 4-nitrophenol visually at pH 7 and typically to a greater extent in the presence of skin washings, but to such a low extent that no change was observed by NMR.

In a follow-up experiment, using the same reaction conditions but in the absence of 4-nitrophenyl-O-β-D-glucopyranoside, a small increase in the rate of alcohol release was observed from both methyl-O-α-D-3'-ketoglucopyranoside (Substrate A) and phenyl-O-β-D-3'-ketoglucopyranoside (Substrate B) in the presence of fresh skin washing compared to it its absence after 72 h at pH 7, as shown in Table XVIII:

TABLE XVIII

| Reaction | Substrate stock solution | 0.1M buffer in D$_2$O/mL | 0.1M buffer in skin wash solution/mL | Final pH | % Conversion by $^1$H NMR* 72 h |
|---|---|---|---|---|---|
| 1 | A | 0.45 | 0 | 5.7 | 4 |
| 2 | A | 0 | 0.45 | 7.0 | 15 |
| 3 | A | 0.45 | 0 | 7.0 | 12 |
| 4 | B | 0.45 | 0 | 5.7 | 20 |
| 5 | B | 0 | 0.45 | 7.0 | 87 |
| 6 | B | 0.45 | 0 | 7.0 | 81 |

*Reactions 1 to 3 followed by increase in the singlet at 3.35 ppm (3 protons of MeOH) relative to the doublet at 5.20 ppm (anomeric proton of methyl-O-α-D-3'-ketoglucopyranoside). Corrected for the 3% MeOH determined to be present in starting material using the same method.
*Reactions 9 to 12 followed by increase in the doublet at 6.91 ppm (2 aromatic protons of phenol) relative to the multiplet at 7.42 ppm (2 aromatic protons of phenyl-O-β-D-3'-ketoglucopyranoside).

*Reactions 9 to 12 followed by increase in the doublet at 6.91 ppm (2 aromatic protons of phenol) relative to the multiplet at 7.42 ppm (2 aromatic protons of phenyl-O-β-D-3'-ketoglucopyranoside).

Example 31: Stability of geranyl-O-β-D-3'-ketoglucopyranoside in D20

Geranyl-O-β-D-3'-ketoglucopyranoside, obtained according to Example 4 (5 mg) was added to D$_2$O (1 mL) and heated at 50° C. The resultant solution was analysed periodically by 1H NMR over a period of 2 weeks and no change in the resultant spectrum was observed, demonstrating that the ketoglucoside was stable.

Example 32: Release of geranyl-O-β-D-3'-Ketoglucopyranoside from a Porous Surface Geranyl-O-β-D-3'-ketoglucopyranoside, obtained according to Example 4, (50 mg) was dissolved in polyethylene glycol 200 (PEG200) (0.1 mL) with gentle heating. 0.1 mL of a solution of L-arginine (10 mg) dissolved in 0.1 mL of a 3:7 w/v solution of anhydrous calcium chloride in water was then added and thoroughly mixed. The resultant solution was spread over a 5 cm diameter paper kitchen towel disc and left to stand at room temperature. The smell of released geraniol evolved from the disc was then assessed with time as strong, medium or weak and reported in Table XIX:

TABLE XIX

| Time/h | Geraniol strength by smell |
|---|---|
| 0 | strong |
| 0.3 | strong |
| 2 | strong |
| 3 | strong |
| 4 | strong |
| 6 | strong |
| 11 | medium |
| 19 | medium |

After 19 h, the reaction mixture was dissolved in D4-MeOH and analysed by 1H NMR. The spectrum showed an approximately 1:1 mixture of starting ketoglucoside and geraniol as judged by the signals at 4.15 and 4.05 ppm respectively.

This example clearly demonstrates that geraniol is released slowly over time from the paper surface.

Example 33: In Vitro Mosquito Testing of Geranyl-O-β-D-3'-Ketoglucopyranoside

*Aedes albopictus* mosquitoes were reared and maintained at 26±2° C. temperature, ≥80%±10 relative humidity, with a 12 h:12 h (light:dark) photoperiod.

Populations of adult mosquitoes were allowed to feed on sugar solution (10%) but were not blood fed before tests.

Geranyl-O-β-D-3'-ketoglucopyranoside, obtained according to Example 4, (100 mg) was dissolved in polyethylene glycol 200 (PEG200) (0.2 mL) with gentle heating to give Solution 1. Then 200 mg of L-arginine was dissolved in 2 mL of a 3:7 w/v solution of anhydrous calcium chloride in water to give Solution 2. Solution 2 (0.2 mL) was added to all of Solution 1 to give Solution 3. The contents of Solution 3 were thoroughly mixed and half of the resultant solution was applied to parallel 5 cm diameter artificial Hemotek membranes covered with paper kitchen towel of equal diameter. Parallel duplicate membranes, covered with paper kitchen towel, were also each treated with 0.2 mL of a 1:1 v/v solution of PEG200/Solution 2 and a further two parallel membranes were left untreated.

The membranes were heated over a reservoir of sheeps' blood at 37° C. using a Hemotek system and periodically exposed to 5- to 7-day old active host-seeking female mosquitoes, selected and collected using an aspirator and organized into batches (15 females) in plastic test containers. The heating was switched off between exposures to maintain membrane integrity and switched on 5 minutes prior to each exposure. Each membrane was exposed to a fresh container of female mosquitos for 20 minutes immediately after membrane preparation and again after 2 h, 4 h, 6 h and 8 h. At each time point, the number of mosquitos landing on each membrane immediately after exposure and 5, 10 and 20 minutes after exposure was counted and the total number of landings over each 20-minute exposure summed and tabulated. Membranes containing conjugate displayed significantly fewer landings than observed with diluent treated or untreated membranes over 8 h as shown in Table XX:

TABLE XX

|  |  | 0 h | 2 h | 4 h | 6 h | 8 h |
|---|---|---|---|---|---|---|
| GS0010 50 mg | Landing | 0 | 3 | 3 | 4 | 0 |
| GS0010 50 mg | Landing | 2 | 0 | 0 | 3 | 0 |
| Control diluent GS0010 | Landing | 2 | 5 | 12 | 5 | 5 |
| Control diluent GS0010 | Landing | 2 | 0 | 3 | 6 | 7 |
| NEG | Landing | 9 | 12 | 28 | 10 | 20 |
| NEG | Landing | 29 | 7 | 25 | 16 | 16 |

It can be concluded that a repellent effect is provided by the geranyl-O-β-D-3'-ketoglucopyranoside of the invention.

The invention claimed is:
1. A 3'-ketoglycoside compound of formula (I) comprising a sugar moiety and R:

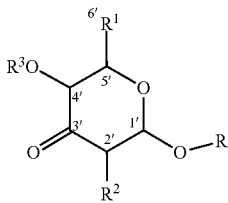

(I)

wherein
the stereochemistry at positions 1', 2', 4' and 5' is independently selected from the α- or -β configuration;
wherein the sugar moiety is selected from the group consisting of 3'-ketoglucose, wherein $R^1$ is $CH_2OH$, $R^2$ is OH and $R^3$ is H; 3'-ketogalactose, wherein $R^1$ is $CH_2OH$, $R^2$ is OH and $R^3$ is H); 3'-ketomannose, wherein $R^1$ is $CH_2OH$, $R^2$ is OH and $R^3$ is H); 3'-ketoidose, wherein $R^1$ is $CH_2OH$, $R^2$ is OH and $R^3$ is H; 3'-ketofucose, wherein $R^1$ is $CH_3$, $R^2$ is OH and $R^3$ is H; 3'-ketoxylose, wherein $R^1$ is H, $R^2$ is OH and $R^3$ is H); 3'-keto-N-acetylglucosamine, wherein $R^1$ is $CH_2OH$, $R^2$ is NHAc and $R^3$ is H); and 3'-keto-2-deoxyglucose, wherein $R^1$ is $CH_2OH$, $R^2$ is H and $R^3$ is H), and
wherein R is the rest of an alcohol of formula R—OH selected from the group consisting of 4-allyl-2-methoxyphenol (eugenol), 3-benzyl-3-pentanol, 4-cyclohexyl-2-methylbutan-2-ol, 2-cyclohexylpropanol, decanol, 9-decenol, (2,4-dimethylcyclohex-3-enyl) methanol, (2,4-dimethylcyclohexyl)methanol, 2-(1,1-dimethylethyl)-4-methylcyclohexanol, 2,6-dimethylheptan-2-ol, 3,7-dimethyl-7-hydroxyoctanal, 2,5-dimethyl-2-indanmethanol, 3,7-dimethyl-1,6-nonadien-3-ol, 6,8-dimethylnonan-2-ol, 4,8-dimethyl-7-nonen-2-ol, (E)-3,7-dimethyl-2,6-octadienol (geraniol), (Z)-3,7-dimethyl-2,6-octadienol (nerol), 3,7-dimethyl-3,6-octadienol, 3,7-dimethyl-1,6-octadien-3-ol (linalool), 3,7-dimethyloctane-1,7-diol (hydroxycitronellol), 3,7-dimethyloctanol, 2,6-dimethyloctan-2-ol (tetrahydromyrcenol), 3,7-dimethyloctan-3-ol, 3,7-dimethylocten-3-ol, 3,7-dimethyloct-6-enol (citronellol), 3,7-dimethyloct-7-enol, 2,6-dimethyloct-7-en-2-ol (dihydromyrcenol), (E)-3,3-dimethyl-5-(2,2,3-trimethyl-3-cyclopenten-1-yl)-4-penten-2-ol, dodecanol, 2-ethoxy-5-(1-propenyl)phenol, 2-ethyl-1-hexanol, ethyl 3-hydroxy hexanoate, 4-ethyl-2-methoxyphenol, 6-ethyl-3-methyl-5-octenol, 5-ethylnonan-2-ol, 2-ethyl-4-(2,2,3-trimethylcyclopent-3-enyl)but-2-enol, 1-heptanol, hexan-2-ol, 3-hexenol, 4-hexenol, 3-hydroxybutan-2-one, 4-hydroxy-3-ethoxybenzaldehyde (ethylvanillin), 4-hydroxy-3-methoxybenzaldehyde (vanillin), 4-(4-hydroxy-3-methoxyphenyl)butan-2-one, 2-(hydroxymethyl) nonan-2-one, 4-(4-hydroxy-1-phenyl)butan-2-one (raspberry ketone), 4-isopropyl-1-benzenemethanol, 4-isopropylcyclohexanol, 1-(4-isopropyl-1-cyclohexyl)ethanol, (4-isopropyl-1-cyclohexyl)methanol, (4-isopropylphenyl)methanol, 7-p-menthanol, p-menthan-3-ol (menthol), p-menthan-8-ol, p-menth-8-en-2-ol, p-menth-8-en-3-ol, 4-methoxy-1-benzenmethanol, 7-methoxy-3,7-dimethyloctan-2-ol, 2-methoxy-4-methylphenol, 2-methoxyphenol (Guaiacol), 2-methoxy-2-phenylethanol, (4-methoxyphenyl) methanol (anisyl alcohol), 2-methoxy-4-(1-propenyl) phenol (isoeugenol), 2-methoxy-4-propyl-1-cyclohexanol, 2-methoxy-4-propylphenol, 2-methoxy-4-vinylphenol, 3-(4-methylcyclohex-3-enyl)butanol, 4-methyl-3-decenol, 4-methyl-3-decen-5-ol, 4-(1-methylethyl)cyclohexylmethanol, 2-methyl-4-phenylbutan-2-ol, 3-methyl-4-phenylbutan-2-ol, 1-(4-methylphenyl)ethanol, 2-(2-methylphenyl)ethanol, 2-methyl-4-phenylpentanol, 2-methyl-5-phenylpentanol, 3-methyl-5-phenylpentanol, 4-methyl-1-phenylpentan-2-ol, 2-methyl-1-phenylpropan-2-ol, 2-(4-methyl phenyl)propan-2-ol, 3-methyl-5-(2,2,3-trimethyl-3-cyclopenten-1-yl)-4-penten-2-ol, 2-(2-methyl propyl)-4-hydroxy-4-methyl-tetrahydropyrane, 2-methyl-4-(2,3,3-trimethyl-2-cyclopenten-1-yl)-2-butenol, 3-methyl-5-(2,2,3-trimethyl-3-cyclopenten-1-yl)pentan-2-ol, 2-methyl-4-(2,2,3-trimethyl-3-cyclopenten-1-yl)pent-4-enol, 3-methyl-5-(2,2,3-trimethylcyclopentyl-3-enyl)pent-4-en-2-ol, 2,6-nonadienol, 1-nonanol, 6-nonenol, 1,2,3,4,4a,5,8,8a-octahydro-2,2,6,8-tetramethyl-1-naphthalenol, octahydro-2,5,5-trimethyl-2-naphthalenol, octan-2-ol, octan-3-ol, 1-octen-3-ol, 3,4,5,6,6-pentamethylheptan- 2-ol, 2-pentyl-1-cyclopentanol, perhydro-4,8a-dimethyl-4a-naphthalenol, 2-phenoxyethanol, 4-phenylbutan-2-ol, 4-phenyl-3-buten-2-ol, 1-phenylethanol, 2-phenylethanol, 1-phenylhexan-2-ol, 1-phenylpentan-2-ol, 2-phenylpropanol, 3-phenylpropanol, 1-phenylpropan-2-ol, 3-phenyl-2-propenol, 2-tert-butylcyclohexanol, 4-tert-butylcyclohexanol, 1-(2-tert-butylcyclohexyloxy)butan-2-ol, 2-tert-butyl-4-methyl-1-cyclohexanol, tetrahydro-2-isobutyl-4-methyl(2H)pyran-4-ol, 2-(tetrahydro-5-methyl-5-vinyl-2-furyl)propan-2-ol, 1-(2,2,3,6-tetramethylcyclohex-1-yl)hexan-3-ol, 2,4,6,8-tetramethylnonan-1-ol, 3,6,7-tetramethylnonan-1-ol, 2,6,10,10-tetramethyl-1-oxaspiro[4.5]decan-6-ol, 2,6,6,8-tetramethyltricyclo[5.3.1.0(1,5)]undecan-8-ol (cedrenol), (+)-(1R,2R)-1,3,3-trimethylbicyclo[2.2.1]heptan-2endo-ol (fenchol), (+)-(1R,2S)-1,7,7-trimethylbicyclo[2.2.1]heptan-2-ol (borneol), 2,6,6-trimethylbicyclo[3.1.1]heptan-3-ol, 3-(5,5,6-trimethylbicyclo[2.2.1]hept-2-yl)cyclohexanol, 4-(5,5,6-trimethylbicyclo[2.2.1]hept-2-yl)cyclohexanol, 3,3,5-trimethylcyclohexanol, 4-(2,6,6-trimethyl-2-cyclohexen-1-yl)butan-2-ol, 4-(2,6,6-trimethyl-1-cyclohexen-1-yl)-3-buten-2-ol (beta-ionol), (E)-4-(2,6,6-trimethyl-2-cyclohexen-1-yl)-3-buten-2-ol (alpha-ionol), (2,4,6-trimethylcyclohex-3-enyl)methanol, 1-(2,2,6-trimethyl-1-cyclohexyl)hexan-3-ol, 5-(2,2,3-trimethyl-3-cyclopentenyl)-3-methylpentan-2-ol, 4,7,9-trimethyldecan-2-ol, 4,6,8-trimethyldecan-2-ol, 3,8,9-trimethyldecan-2-ol, 3,7,11-trimethyl-2,6,10-dodecatrienol (farnesol), 3,7,11-trimethyl-1,6,10-dodecatrien-3-ol (nerolidol), 3,3,5-trimethylhexanol, undecanol, undecan-2-ol, 10-undecenol, (6E)-N-[(4-hydroxy-3-methoxyphenyl)methyl]-8-methylnon-6-enamide (capsaicin), 2-Isopropyl-5-methylphenol (thymol), 5-isopropyl-2-methylphenol (carvacrol), 2-(4-methylcyclohex-3-en-1-yl)propan-2-ol (α-terpineol), p-allylphenol (chavicol), 2H-1,3-Benzodioxol-5-ol (sesamol), butan-2-yl 2-(2-hydroxyethyl)piperidine-1-carboxylate (picaridin) and 2-(2-hydroxypropan-2-yl)-5-methylcyclohexan-1-ol (p-menthane-3,8-diol, PMD).

2. The 3-ketoglycoside compound according to claim 1, wherein R is the rest of an alcohol of formula R—OH selected from the group consisting of 4-allyl-2-methoxyphenol (eugenol), (E)-3,7-dimethyl-2,6-octadienol (geraniol), p-menthan-3-ol (menthol), butan-2-yl 2-(2-hydroxyethyl)piperidine-1-carboxylate (picaridin) and 2-(2-hydroxypropan-2-yl)-5-methylcyclohexan-1-ol (p-menthane-3,8-diol, PMD).

3. A process for preparing a 3'-ketoglycoside compound of formula (I) of claim 1, wherein it comprises the oxidation of glycoside compound of formula (II)

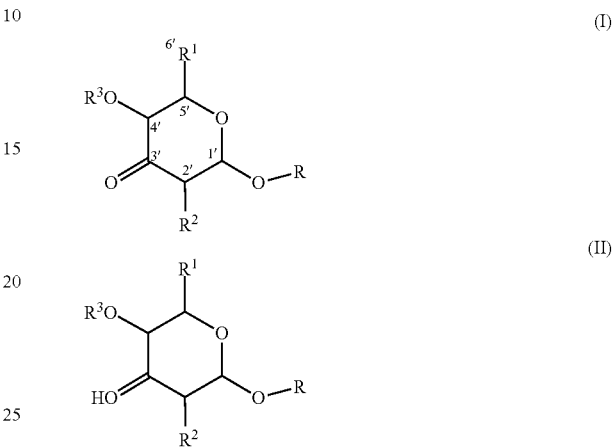

with an oxidizing in the presence of [(2,9-dimethyl-1,10-phenanthroline)Pd(μ-OAc)]$_2$(OTf)$^2$ as catalyst.

4. A composition comprising a 3'-ketoglycoside compound of formula (I) according to claim 1 and a carrier.

5. The composition according to claim 4, wherein it further comprises a compound selected from an alcohol of formula R—OH and an insect active compound.

6. The composition according to claim 5, wherein the insect active compound is selected from a terpene, a terpenoid, a pyrethrin, a pyrethrinoid, N,N-diethyl-3-methylbenzamide, ethyl 3-[acetyl(butyl)amino]propanoate, and mixtures thereof.

7. A method of use of compounds of formula (I), which comprises the application of a composition according to claim 4 onto a surface.

* * * * *